(12) United States Patent
Bordeleau et al.

(10) Patent No.: US 11,483,762 B2
(45) Date of Patent: Oct. 25, 2022

(54) VIRTUAL SERVICE NETWORKS

(71) Applicant: VMware, Inc., Palo Alto, CA (US)

(72) Inventors: Marc-Andre Bordeleau, Shawinigan (CA); Raja Kommula, Cupertino, CA (US); Jeremy Tidemann, Urbana, IL (US); Constantine Polychronopoulos, Saratoga, CA (US); Edward Choh, Richmond (CA); Ojas Gupta, Mountain View, CA (US); Georgios Oikonomou, Patras (GR); Robert Kidd, Champaign, IL (US)

(73) Assignee: VMWARE, INC., Palo Alto, CA (US)

( * ) Notice: Subject to any disclaimer, the term of this patent is extended or adjusted under 35 U.S.C. 154(b) by 334 days.

(21) Appl. No.: 16/443,810

(22) Filed: Jun. 17, 2019

(65) Prior Publication Data
US 2020/0275357 A1    Aug. 27, 2020

Related U.S. Application Data

(60) Provisional application No. 62/809,558, filed on Feb. 22, 2019.

(51) Int. Cl.
*H04W 48/18*    (2009.01)
*H04W 64/00*    (2009.01)
(Continued)

(52) U.S. Cl.
CPC ........ *H04W 48/18* (2013.01); *G06F 9/45558* (2013.01); *H04L 41/048* (2013.01);
(Continued)

(58) Field of Classification Search
CPC .................................................. H04W 48/18
See application file for complete search history.

(56) References Cited

U.S. PATENT DOCUMENTS

| 6,504,818 B1 | 1/2003 | Levine |
| 9,124,538 B2 | 9/2015 | Koponen et al. |

(Continued)

FOREIGN PATENT DOCUMENTS

| WO | 2019129374 A1 | 7/2019 |
| WO | 2019229492 A1 | 12/2019 |

(Continued)

OTHER PUBLICATIONS

Non-Published Commonly Owned Related International Patent Application PCT/US2020/016833 with similar specification, filed Feb. 5, 2020, 95 pages, VMware, Inc.

(Continued)

*Primary Examiner* — Nicholas P Celani
(74) *Attorney, Agent, or Firm* — Adeli LLP

(57) ABSTRACT

Some embodiments provide a method for establishing multiple virtual service networks over multiple datacenters. The method configures, for each virtual service network of the plurality of virtual service networks, a set of machines distributed across the datacenters to implement an ordered set of network services for the virtual service network. The method configures multiple service network selectors executing within the datacenters to receive a data message, select one of the virtual service networks for the data message based on analysis of contents of the data message, determine a location within the datacenters for a machine implementing a first network service of the ordered set of network services for the selected virtual service network, and transmit the data message to the machine implementing the first network service.

26 Claims, 29 Drawing Sheets

(51) Int. Cl.
*G06F 9/455* (2018.01)
*H04L 41/046* (2022.01)

(52) U.S. Cl.
CPC ... *H04W 64/003* (2013.01); *G06F 2009/4557* (2013.01); *G06F 2009/45595* (2013.01)

(56) References Cited

U.S. PATENT DOCUMENTS

| | | | |
|---|---|---|---|
| 9,438,491 | B1 | 9/2016 | Kwok et al. |
| 10,111,163 | B2 | 10/2018 | Vrzic et al. |
| 10,447,597 | B1 | 10/2019 | Kim et al. |
| 10,461,421 | B1 | 10/2019 | Tran et al. |
| 10,555,134 | B2 | 2/2020 | Shaw et al. |
| 10,609,530 | B1 | 3/2020 | Patil et al. |
| 10,708,143 | B2 | 7/2020 | Zhang et al. |
| 10,708,189 | B1 | 7/2020 | Agrawal et al. |
| 10,735,331 | B1 | 8/2020 | Li et al. |
| 10,834,669 | B2 | 11/2020 | Bordeleau et al. |
| 10,939,369 | B2 | 3/2021 | Bordeleau et al. |
| 11,009,372 | B2 | 5/2021 | Klimenko |
| 11,012,288 | B2 | 5/2021 | Kommula et al. |
| 11,024,144 | B2 | 6/2021 | Bordeleau et al. |
| 11,108,643 | B2 | 8/2021 | Kommula et al. |
| 11,146,964 | B2 | 10/2021 | Bordeleau et al. |
| 11,178,016 | B2 | 11/2021 | Kommula et al. |
| 2003/0026205 | A1 | 2/2003 | Mullendore et al. |
| 2006/0146712 | A1 | 7/2006 | Conner et al. |
| 2010/0322255 | A1* | 12/2010 | Hao ............. H04L 45/00 370/398 |
| 2013/0125230 | A1 | 5/2013 | Koponen et al. |
| 2013/0279504 | A1 | 10/2013 | Gulati et al. |
| 2014/0233385 | A1* | 8/2014 | Beliveau ............. H04L 47/122 370/235 |
| 2015/0074264 | A1 | 3/2015 | Izhak-Ratzin et al. |
| 2015/0163117 | A1 | 6/2015 | Lambeth et al. |
| 2015/0381486 | A1 | 12/2015 | Xiao et al. |
| 2015/0381493 | A1 | 12/2015 | Bansal et al. |
| 2016/0335107 | A1 | 11/2016 | Behera et al. |
| 2016/0344565 | A1 | 11/2016 | Batz et al. |
| 2016/0353465 | A1 | 12/2016 | Vrzic et al. |
| 2016/0360408 | A1 | 12/2016 | Senarath et al. |
| 2017/0054595 | A1 | 2/2017 | Zhang et al. |
| 2017/0085628 | A1* | 3/2017 | Mahindra ............. H04L 67/10 |
| 2017/0093633 | A1* | 3/2017 | Chang ............. H04L 67/02 |
| 2017/0142591 | A1 | 5/2017 | Vizic |
| 2017/0250893 | A1 | 8/2017 | Duda |
| 2017/0250906 | A1 | 8/2017 | MeLampy et al. |
| 2017/0264483 | A1 | 9/2017 | Lambeth et al. |
| 2017/0289791 | A1 | 10/2017 | Yoo et al. |
| 2017/0332212 | A1 | 11/2017 | Gage |
| 2017/0332421 | A1 | 11/2017 | Sternberg et al. |
| 2018/0183866 | A1 | 6/2018 | Gunda et al. |
| 2018/0219762 | A1 | 8/2018 | Wang et al. |
| 2018/0220276 | A1 | 8/2018 | Senarath et al. |
| 2018/0220277 | A1 | 8/2018 | Senarath et al. |
| 2018/0248770 | A1 | 8/2018 | Regmi et al. |
| 2018/0270713 | A1 | 9/2018 | Park et al. |
| 2018/0270743 | A1 | 9/2018 | Callard et al. |
| 2018/0295036 | A1 | 10/2018 | Krishnamurthy et al. |
| 2018/0332441 | A1 | 11/2018 | Shaw et al. |
| 2018/0368060 | A1 | 12/2018 | Kedalagudde et al. |
| 2019/0053104 | A1 | 2/2019 | Qiao et al. |
| 2019/0058508 | A1 | 2/2019 | Yiu |
| 2019/0075082 | A1 | 3/2019 | Adam et al. |
| 2019/0104458 | A1 | 4/2019 | Svennebring et al. |
| 2019/0123963 | A1 | 4/2019 | Tang et al. |
| 2019/0124704 | A1 | 4/2019 | Sun et al. |
| 2019/0150080 | A1 | 5/2019 | Davies et al. |
| 2019/0158364 | A1 | 5/2019 | Zhang et al. |
| 2019/0159117 | A1 | 5/2019 | Kuge et al. |
| 2019/0174573 | A1 | 6/2019 | Velev et al. |
| 2019/0187999 | A1 | 6/2019 | Lu et al. |
| 2019/0191309 | A1 | 6/2019 | Kweon et al. |
| 2019/0200286 | A1 | 6/2019 | Usui et al. |
| 2019/0268633 | A1 | 8/2019 | Jayawardene et al. |
| 2019/0268973 | A1 | 8/2019 | Bull et al. |
| 2019/0280976 | A1 | 9/2019 | Wang |
| 2019/0287146 | A1 | 9/2019 | Maitland et al. |
| 2019/0289470 | A1 | 9/2019 | Vaidya et al. |
| 2019/0320494 | A1 | 10/2019 | Jayawardene et al. |
| 2019/0373520 | A1 | 12/2019 | Sillanpää |
| 2020/0007445 | A1 | 1/2020 | Anwer et al. |
| 2020/0053531 | A1 | 2/2020 | Myhre et al. |
| 2020/0053545 | A1 | 2/2020 | Wong et al. |
| 2020/0067831 | A1 | 2/2020 | Spraggins et al. |
| 2020/0077327 | A1 | 3/2020 | Duan et al. |
| 2020/0106536 | A1 | 4/2020 | Bedekar |
| 2020/0120721 | A1 | 4/2020 | Lau et al. |
| 2020/0120724 | A1 | 4/2020 | Vaidya et al. |
| 2020/0137621 | A1 | 4/2020 | Yang et al. |
| 2020/0213360 | A1 | 7/2020 | Ojha et al. |
| 2020/0235990 | A1 | 7/2020 | Janakiraman et al. |
| 2020/0252142 | A1 | 8/2020 | Bedekar |
| 2020/0273314 | A1 | 8/2020 | Bordeleau et al. |
| 2020/0275281 | A1 | 8/2020 | Bordeleau et al. |
| 2020/0275358 | A1 | 8/2020 | Bordeleau et al. |
| 2020/0275359 | A1 | 8/2020 | Bordeleau et al. |
| 2020/0275360 | A1 | 8/2020 | Bordeleau et al. |
| 2020/0314029 | A1 | 10/2020 | Gopinath et al. |
| 2021/0037390 | A1 | 2/2021 | Tofighbakhsh et al. |
| 2021/0051490 | A1 | 2/2021 | Yanover et al. |
| 2021/0064407 | A1 | 3/2021 | Kommula et al. |
| 2021/0064451 | A1 | 3/2021 | Kommula et al. |
| 2021/0067416 | A1 | 3/2021 | Kommula et al. |
| 2021/0067439 | A1 | 3/2021 | Kommula et al. |
| 2021/0297347 | A1 | 9/2021 | Ku et al. |

FOREIGN PATENT DOCUMENTS

| | | |
|---|---|---|
| WO | 2020171957 A1 | 8/2020 |
| WO | 2021040935 A1 | 3/2021 |

OTHER PUBLICATIONS

Non-Published Commonly Owned Related U.S. Appl. No. 16/443,812 with similar specification, filed Jun. 17, 2019, 38 pages, VMware, Inc.

Non-Published Commonly Owned Related U.S. Appl. No. 16/443,813 with similar specification, filed Jun. 17, 2019, 49 pages, VMware, Inc.

Non-Published Commonly Owned Related U.S. Appl. No. 16/443,815 with similar specification, filed Jun. 17, 2019, 49 pages, VMware, Inc.

Non-Published Commonly Owned Related U.S. Appl. No. 16/443,816 with similar specification, filed Jun. 17, 2019, 54 pages, VMware, Inc.

Non-Published Commonly Owned Related U.S. Appl. No. 16/443,818 with similar specification, filed Jun. 17, 2019, 64 pages, VMware, Inc.

Non-Published Commonly Owned U.S. Appl. No. 16/568,322, filed Sep. 12, 2019, 55 pages, VMware, Inc.

Non-Published Commonly Owned U.S. Appl. No. 16/568,325, filed Sep. 12, 2019, 55 pages, VMware, Inc.

Non-Published Commonly Owned U.S. Appl. No. 16/568,330, filed Sep. 12, 2019, 55 pages, VMware, Inc.

Non-Published Commonly Owned U.S. Appl. No. 16/568,332, filed Sep. 12, 2019, 55 pages, VMware, Inc.

Non-Published Commonly Owned International Patent Application PCT/US2020/043648, filed Jul. 26, 2020, 55 pages, VMware, Inc.

PCT International Search Report and Written Opinion of Commonly Owned International Patent Application PCT/US2020/016833, dated May 7, 2020, 13 pages, International Search Authority (EPO).

Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.

* cited by examiner

VIRTUAL SERVICE NETWORKS

BACKGROUND

Communications service provider networks receive and process many types of traffic from many different types of devices, especially moving forward. For example, these networks will have traffic from mobile phones, Internet of Things (IoT) devices, self-driving automobiles, home computers, etc. Ideally, this traffic should be treated differently by the network based on the type of application (e.g., streaming video, web browsing, telephone calls, etc.), the type of device (e.g., data traffic for self-driving automobiles need extremely low latency), and other differentiators. While 4G and 5G standards have introduced a certain level of traffic differentiation, more adaptable network slicing, that can be generalized to other types of networks, is desirable.

BRIEF SUMMARY

Some embodiments provide methods for establishing a virtual service network across a set of datacenters. The set of datacenters across which the virtual service network is established may include, e.g., one or more public clouds, a software-defined wide area network (SD-WAN) that spans public and private clouds, a telecommunications service provider access network (e.g., spanning a combination of the radio access network, edge clouds, and core clouds), or other types of datacenters. The virtual service network of some embodiments includes multiple network slices each of which provides different network services to data messages assigned to the network slice.

In some embodiments, when a device (e.g., a mobile endpoint device in the telecommunications context) transmits a data message onto such a network, a network slice selector initially processes the data message. The network slice selector assigns the data message to one of the network slices of the virtual service network and handles service chaining operations to ensure that the data message is processed by the correct set of network services for the assigned slice. In different embodiments, this network slice selector may be implemented by a virtual machine (VM), a containerized function, a software forwarding element (e.g., a flow-based forwarding element) operating within a VM, within a container or within virtualization software of a host computer, a set of modules executing outside of a forwarding element (e.g., between a VM and a port of a forwarding element) within virtualization software of a host computer, a hardware forwarding element (e.g., a programmable switch), or other implementations.

In some cases, many network slice selectors are configured to implement a virtual service network. In the telecommunications service provider example, some embodiments configure a network slice selector for each cellular tower, base station, or other aspect of the access network. The telecommunications service provider access network of some embodiments includes edge clouds for each cellular tower, and configures at least one network slice selector at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM) or at a designated device (e.g., a specific nearby switch or router, a dedicated VM).

Each network slice of a virtual service network, in some embodiments, includes one or more network services such as firewalls, load balancers, network address translation, metering (e.g., for billing purposes), virtual private network (VPN) gateways, radio access network (RAN) functions (e.g., distributed unit and centralized unit functions), evolved packet core (EPC) functions (e.g., home subscriber server, serving gateway, packet data network gateway, mobility management entity), or other types of network functions. These network functions may be implemented as virtual network functions (VNFs), physical network functions (PNFs), and/or cloud network functions (CNFs) in different embodiments.

When a network slice selector assigns a data message to a network slice, the slice selector is responsible in some embodiments for performing the service chaining to ensure that the data message traverses the network services of the assigned slice in the correct order. In some embodiments, the slice selector transmits the data message to the first network service (e.g., the VM, container, or other data compute node that implements the network service) and maintains context information for that data message. Upon the first network service completing its processing of the data message, the first network service returns the data message to the slice selector. The slice selector then uses the maintained context information to transmit the data message to the next network service, and so on. In some embodiments, when the full network slice is implemented across multiple datacenters, a similar service chaining module operates at each datacenter to handle the service chaining for the slice within its own datacenter. These service chaining modules may be implemented in the same manner as the network slice selectors in some embodiments (e.g., as VMs, as forwarding elements in VMs or virtualization software). A service chaining module of some embodiments receives a data message as the data message ingresses to the datacenter, identifies the slice for the data message (e.g., based on context information provided with the data message by the network slice selector or service chaining module of the previous datacenter), and provides the data message to the next network service within the datacenter. Other embodiments use distributed service chaining rather than returning data messages to a designated slice selector or service chaining module in each datacenter (e.g., by adding tags to the packet headers to indicate the order of services in a selected network slice).

In some embodiments, a controller hierarchy configures various entities within the one or more datacenters to implement a virtual service network. A high-level controller (referred to herein as a virtual service network (VSN) controller) receives configuration data for the virtual service network from a user (e.g., a telecommunications provider, a datacenter tenant) through an interface (e.g., a set of REST APIs, a graphical interface, a command line interface). This VSN controller coordinates sets of other controllers that configure the entities in the datacenters in which the VSN is implemented. In some embodiments, each datacenter has its own suite of lower-level controllers. These controllers may include compute controllers (e.g., for configuring VMs that implement the VNFs), network controllers (e.g., for configuring forwarding elements to transmit data messages between the slice selector(s) and the network services), storage controllers, and SDN controllers (e.g., for configuring the slice selectors and/or gateways that transmit data messages between the datacenters).

Network slice selectors may assign data messages to slices using different techniques in different embodiments. Slice selection may be based on a combination of layer 2 to layer 4 (L2-L4) headers and/or by performing deep packet inspection (e.g., to classify traffic based on data in the layer 5 to layer 7 (L5-L7) headers. For example, slice selection may be based simply on the source device by using the source network layer (e.g., IP) address, or may be based on the type of traffic and/or destination network domain by looking at the higher layer (L5-L7) headers. In some embodiments, the network slice selector integrates with other control plane components to collect additional information about a connection (e.g., regarding the user session, device type, or other data) and uses this information as part of the slice selection process (e.g., using only this collected information or combining this information with the L2-L4 and/or L5-L7 packet header data). In some embodiments, the network slice selector maintains state for mapping connections to network slices so that deep packet inspection does not need to be performed on each data message of a connection. In addition, for some connections, only certain data messages contain the L5-L7 header information required for performing the slice selection.

When performing network slice selection using deep packet inspection, in certain cases the initial data message for a connection may not include the L5-L7 header information that the slice selector needs to correctly identify the slice. For example, a connection between an endpoint device (e.g., a mobile device such as a smart phone or tablet, a laptop or desktop computer, an IoT device, a self-driving automobile, a smart camera belonging to a security system, or other device) and a network domain (e.g., a web domain such as www.netflix.com, www.google.com, etc.) often begins with a set of connection initiation messages such as a TCP handshake. After completion of the handshake, the device then sends, e.g., an http get message that includes the network domain. Subsequent data messages sent between the device and the network domain may not include such information.

In some embodiments, the network slice selector acts as a proxy to terminate the connection initiation messages without sending these messages across the virtual service network to the intended destination. That is, the network slice selector exchanges the appropriate set of connection initiation messages with the endpoint device, such that the endpoint device behaves as though the connection has been properly set up with the destination domain. The network slice selector stores data about these connection initiation messages for subsequent use. Upon receiving a data message from the endpoint device (e.g., an http get message), the network slice selector performs deep packet inspection to examine the L5-L7 headers and select one of the network slices for the connection. The network slice selector then exchanges the connection initiation messages with the destination network domain, this time acting as the device rather than the destination domain. These connection initiation messages are transmitted via the selected network slice, such that all of the network services on the selected network slice process the connection initiation messages. Once this connection is established with the destination domain, the slice selector forwards the data message to the destination domain as well, via the selected network slice. The slice selector also stores connection information (e.g., a connection 5-tuple) mapping the connection to the selected network slice, for use in processing data messages. For subsequent data messages received for the connection, the network slice selector uses the mapping of the connection to the slice to assign the data message to the selected slice without the need to perform deep packet inspection. This avoids performing deep packet inspection on every data message for the connection, which may not be possible as the required information might not be in the L5-L7 headers of all of the data messages belonging to the connection. In some embodiments, an egress gateway that processes data messages after completion of the virtual service network also stores the connection-to-slice mapping information, and uses this to assign data messages sent from the destination domain to the endpoint device to the correct network slice (with the network services performed in the opposite order).

Some embodiments, rather than terminating the connection initiation messages at the slice selector, pass these messages through to a default network slice initially, then replay the messages over the correct network slice for the connection after the network slice is selected. In this procedure, the slice selector assigns the initial connection initiation messages to the default slice while storing these messages (or the data required to recreate the messages). In addition, the egress gateway (i.e., a gateway that transmits the messages out to the destination (e.g., to the Internet) and receives reverse-direction messages from the destination domain) stores information regarding the connection initiation messages as well. Upon receiving the initial data message, the network slice selector performs deep packet inspection to select the correct slice. Before transmitting the data messages onto the selected slice, however, the slice selector replays the connection initiation messages over the network slice. These messages are not sent from the egress gateway out to the destination domain; rather, the connection initiation messages are sent only between the slice selector and the egress gateway. Once these messages have been replayed, the network services of the selected slice will have processed the connection initiation messages and thus are prepared for the subsequent data message traffic between the endpoint device and the destination network domain.

In the case of stateful slice selection, as mentioned, subsequent data messages are sent using the state stored by the network slice selector, both for resource/time savings and because many of the subsequent data messages do not have the information in their L5-L7 headers necessary for deep packet inspection to be useful. However, mobile devices (e.g., smart phones, tablets, self-driving automobiles) may move from one geographic range served by a first slice selector to another geographic range served by a second slice selector (e.g., when moving from one cell tower to another or when moving from a WiFi network to a cellular network) while maintaining one connection. Different embodiments use different techniques to ensure that the state is maintained, without requiring action on the part of the endpoint device.

In some embodiments, the second slice selector (the slice selector for the region to which the mobile device moves) forwards all data messages for the connection to the first slice selector (the slice selector for the region in which the mobile device was located when the connection was initiated). That is, the second slice selector receives data indicating that the first slice selector is the location of the slice mapping state for the connection, and thus forwards the data traffic for the connection to the first slice selector. In different embodiments, the first slice selector either (i) pushes this state location information directly to the second slice selector or (ii) pushes the state location information to a network controller (e.g., the aforementioned VSN controller), from which the second slice selector retrieves the state location information.

In other embodiments, the second slice selector receives the state (i.e., the mapping of the connection to the network slice) and is thus able to forward the data messages for the connection to the network slice without involving the first network slice selector. In different embodiments, the second slice selector may receive the state directly from the first slice selector or from a network controller (e.g., the aforementioned VSN controller). In some such embodiments, the first slice selector pushes the state either (i) directly to the second slice selector (e.g., before the device has moved to the geographic region of the second slice selector) or (ii) to the network controller, from which the second slice selector retrieves the state. In other such embodiments, the first slice selector pushes location information for the state to the network controller, and the second slice selector retrieves this location information from the network controller, then uses this location information to retrieve the state from the first slice selector.

In the case that the first slice selector pushes the state information directly to the second slice selector, in some embodiments the first slice selector pushes all of its slice mappings to slice selectors for neighboring geographical regions, in case mobile devices that initiate connections within the geographical region of the first slice selector move to any of the neighboring geographical regions. In other such embodiments, the first slice selector uses location data of the mobile device (if that data is made available) to push the state information to slice selectors for neighboring geographical regions to which the device is likely to move.

In some embodiments, a virtual service network is sliced hierarchically. That is, slices of a virtual service network are themselves virtual service networks with a slice selector and multiple network slices. For example, in telecommunications networks, a mobile network operator (MNO) owns the physical infrastructure of the access and core networks (i.e., the RAN and EPC infrastructure), and traffic from devices that subscribe to that MNO are processed by that infrastructure. In addition, the MNO may lease that infrastructure to one or more mobile virtual network operators (MVNOs) that also have subscriber devices using the same infrastructure. Those MVNOs, in some cases, also lease their virtual infrastructure to additional MVNOs or other entities. In addition, hierarchical layers of slice selection can be implemented over networks for additional reasons besides different telecommunications service providers.

In the above telecommunications provider example, a first slice selector configured by the MNO might assign data messages to network slices based on the source device (e.g., by source network address). Thus, data messages from source devices associated with the MNO are sent to another virtual service network configured by the MNO, while data messages from source devices associated with different MVNOs are sent to virtual service networks configured by the respective MVNOs. In some embodiments, a second slice selector for each virtual service network performs additional slice selection based on various aspects of the data message headers. If an MVNO leases their virtual infrastructure to one or more additional MVNOs, then this second slice selector might also assign data messages to network slices based on a more fine-grained network address analysis (e.g., if the first MVNO is assigned a pool of IP addresses, and divides this pool between its own devices and devices for another MVNO). In other cases, the second level slice selector may perform stateful slice selection based on deep packet inspection, such as that described above.

In some embodiments, within a virtual service network (a collection of multiple network slices with different ordered sets of network services), a network slice selector is always the first entity to process a data message. In other embodiments, after the first network slice selector selects one of the slices, this slice (which is a virtual service network) may include network services applied to the data messages before the second network slice selector selects slices within that virtual service network. Similarly, in some embodiments, network services may be applied to data messages for all network slices within a virtual service network, after the different services are applied for a given slice.

While the above examples of networks that use slice selection and virtual service networks are telecommunications provider networks (both for hierarchical slice selection as well as single-level slice selection), it should be understood that the virtual service networks can be configured for other types of networks as well. For instance, within datacenters or for networks that span across multiple datacenters, virtualization software (e.g., in the host computers that host the VMs or other endpoints of the networks) can be configured to implement slice selection for data messages sent by the network endpoints. One type of network spanning multiple datacenters is using a set of one or more public clouds to connect enterprise datacenters (e.g., a headquarters and one or more remote branch offices); in such a network, network services for a network slice may be implemented in the enterprise datacenters as well as within the public cloud(s).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide methods for establishing a virtual service network across a set of datacenters. The set of datacenters across which the virtual service network is established may include, e.g., one or more public clouds, a software-defined wide area network (SD-WAN) that spans public and private clouds, a telecommunications service provider access network (e.g., spanning a combination of the radio access network, edge clouds, and core clouds), or other types of datacenters. The virtual service network of some embodiments includes multiple network slices each of which provides different network services to data messages assigned to the network slice.

In some embodiments, when a device (e.g., a mobile endpoint device in the telecommunications context) transmits a data message onto such a network, a network slice selector initially processes the data message. The network slice selector assigns the data message to one of the network slices of the virtual service network and handles service chaining operations to ensure that the data message is processed by the correct set of network services for the assigned slice. In different embodiments, this network slice selector may be implemented by a virtual machine (VM), a containerized function, a software forwarding element (e.g., a flow-based forwarding element) operating within a VM, within a container or within virtualization software of a host computer, a set of modules executing outside of a forwarding element (e.g., between a VM and a port of a forwarding element) within virtualization software of a host computer, a hardware forwarding element (e.g., a programmable switch), or other implementations.

In some cases, many network slice selectors are configured to implement a virtual service network. In the telecommunications service provider example, some embodiments configure a network slice selector for each cellular tower, base station, or other aspect of the access network. The telecommunications service provider access network of some embodiments includes edge clouds for each cellular tower, and configures at least one network slice selector at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM) or at a designated device (e.g., a specific nearby switch or router, a dedicated VM or container).

Figure 1:
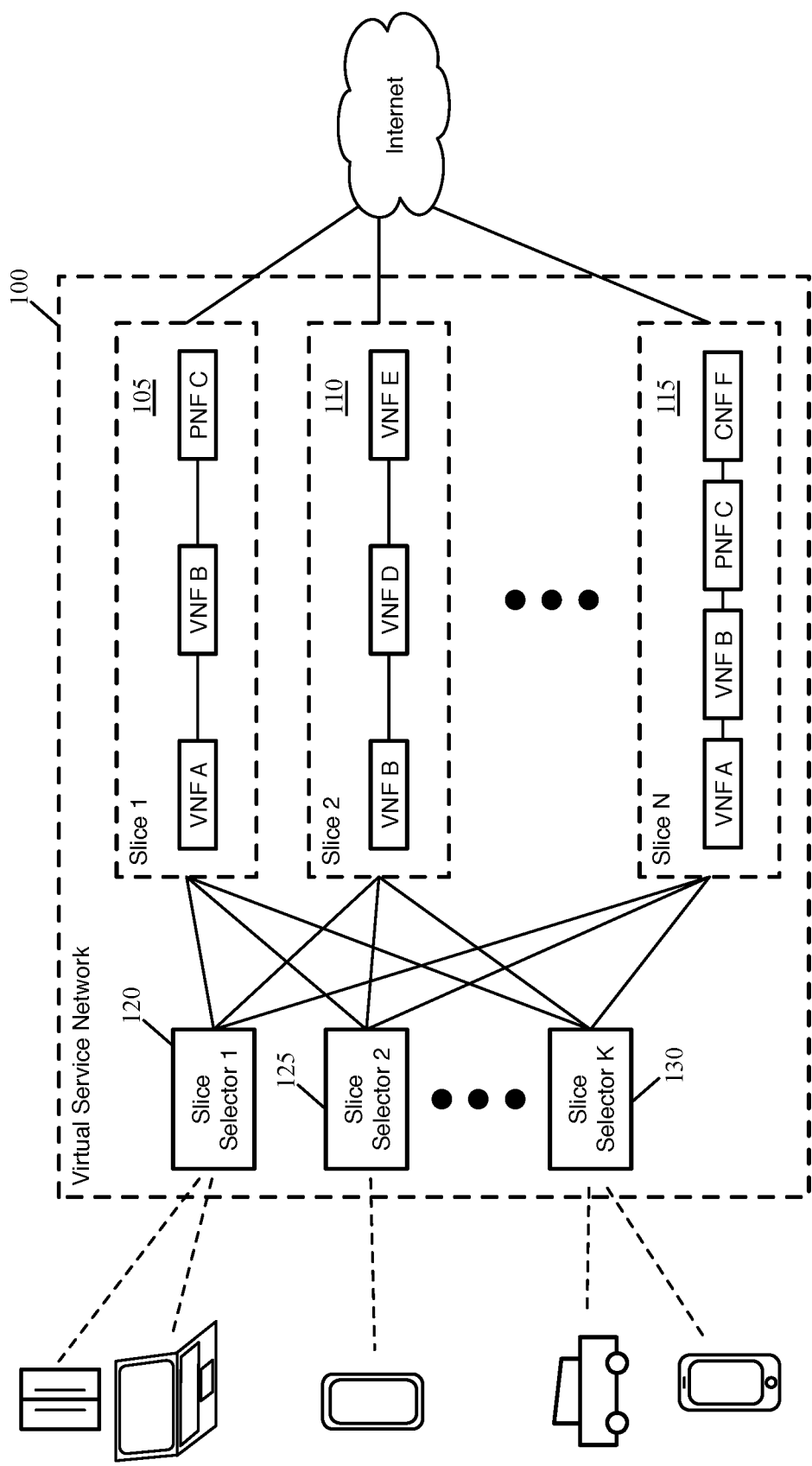
FIG. 1 conceptually illustrates a virtual service network (VSN) with multiple network slice selectors.

FIG. 1 conceptually illustrates such a virtual service network (VSN) 100 with multiple network slice selectors. In this case, the VSN 100 performs network services on data messages for devices accessing the Internet (e.g., within a telecommunications service provider access network). Which network services the VSN performs on a given data message is dependent on the slice to which the data message is assigned. As described further below, the network services of a given network slice may be implemented in a single data center or a combination of datacenters. For a given slice some of the network services might be distributed into many edge clouds while later network services are implemented in a central public datacenter.

As shown, the virtual service network 100 includes numerous (N) network slices 105-115. Each of these network slices represents a network service path (i.e., an ordered set of network services performed on data messages assigned to the slice). These network services can include firewalls, load balancers, network address translation, metering (e.g., for billing purposes) functions, VPN gateways, radio access network (RAN) functions (e.g., distributed unit and centralized unit functions), evolved packet core (EPC) functions (e.g., home subscriber server, serving gateway, packet data network gateway, mobility management entity), or other types of network functions.

In different embodiments, the network slices of a virtual service network may serve different purposes. Some embodiments slice a network based on the source device (e.g., using the source network address or information identifying the type of device) or subscriber information (e.g., by interfacing with authentication, authorization, and accounting systems or policy systems), while other embodiments slice a network based on the type of traffic (e.g., by performing deep packet inspection). Each network slice can have a prescribed quality of service (QoS) service-level agreement (SLA). For example, a network slice for self-driving automobiles might have extremely low latency requirements, a network slice for streaming video might have high bandwidth requirements, and an IoT slice might have less strict bandwidth or latency requirements for a single device but have a massive connectivity expectation.

These network services may be implemented as virtualized network functions (VNFs), physical network functions (PNFs), and/or cloud native network functions (CNFs) in different embodiments. VNFs are network services that are implemented in virtualized data compute nodes, such as virtual machines. This enables, for instance, the same network service configuration for a particular slice to be implemented in numerous edge clouds (e.g., along with the numerous slice selectors). CNFs are network services implemented in cloud-native data compute nodes, such as specific types of containers. Lastly, PNFs are network services implemented by a physical device (e.g., a specific firewall or load balancer device). In general, PNFs are more usefully located in centralized datacenters rather than edge clouds, so that the same physical device does not need to be replicated for each edge cloud.

In this example, the first network slice 105 includes two VNFs A and B as well as a PNF C. The second network slice 110 is entirely virtual, with three VNFs B, D, and E. The last network slice 115 includes the same three network services as slice 105 (VNFs A and B as well as PNF C) followed by a CNF F. In some embodiments, the same VM can implement a VNF for multiple different network slices. In this example, one VM might implement the same VNF B for all three of the illustrated network slices 105-115. If this VNF is located within the edge clouds, then a single VM may be instantiated in each edge cloud (e.g., for each slice selector). In other embodiments, however, a separate VNF (e.g., a separate VM or other data compute node) is instantiated for each VNF, even if the VNF configuration is the same for multiple slices. Thus, in this example, three different VNFs are instantiated for VNF B for each of the slices 105-115. Thus, if this VNF is located within the edge clouds, then each edge cloud would have three different VMs for VNF B.

Because of the manner in which devices access the network 100, some embodiments have numerous slice selectors 120-130. Devices may access a telecommunications service provider network through base stations (e.g., cell towers), wireless access points, wired hookups (e.g., within a home), or other means. For provider networks, the slice selectors of some embodiments are implemented close to the devices, so that the slice selection can occur before data traffic crosses most of the network. For instance, in the case of 5G wireless networks with multi-access edge computing, some embodiments configure a slice selector for each distributed unit (DU). Other embodiments configure a slice selector for each centralized unit (CU), which receives traffic from multiple DUs. In this case, each slice selector has an associated geographic range (i.e., that of its associated DU or CU).

In such situations, such as that shown in FIG. 1, each slice selector 120-130 is configured to perform the same slice selection function (i.e., they operate as a single logical slice selector) in some embodiments. That is, each slice selector 1-K can assign a data message to any of the slices 1-N, and the network slice assignment will be the same irrespective of which of the slice selectors 120-130 processes the data message. In other embodiments, slices are accessible only in certain specific geographical regions. For instance, a network slice associated with a specific application might be available in certain cities or other geographical areas in certain cases.

This example shows that multiple devices can attach to a given slice selector at any particular time. In the example, a smart refrigerator and a laptop are attached to the first slice selector 120, a tablet device is attached to the second slice selector 125, and an autonomous car and a mobile phone are attached to the last slice selector 130. In different embodiments, the network slice selectors may be implemented by a virtual machine (VM), a software forwarding element (e.g., a flow-based forwarding element) operating within a VM or within virtualization software of a host computer, a set of modules executing outside of a forwarding element (e.g., between a VM and a port of a forwarding element) within virtualization software of a host computer, a physical device (e.g., a dedicated hardware forwarding element, a physical host computer), a container application (e.g., a Kubernetes system running a network service mesh), or other implementations.

Figure 2:
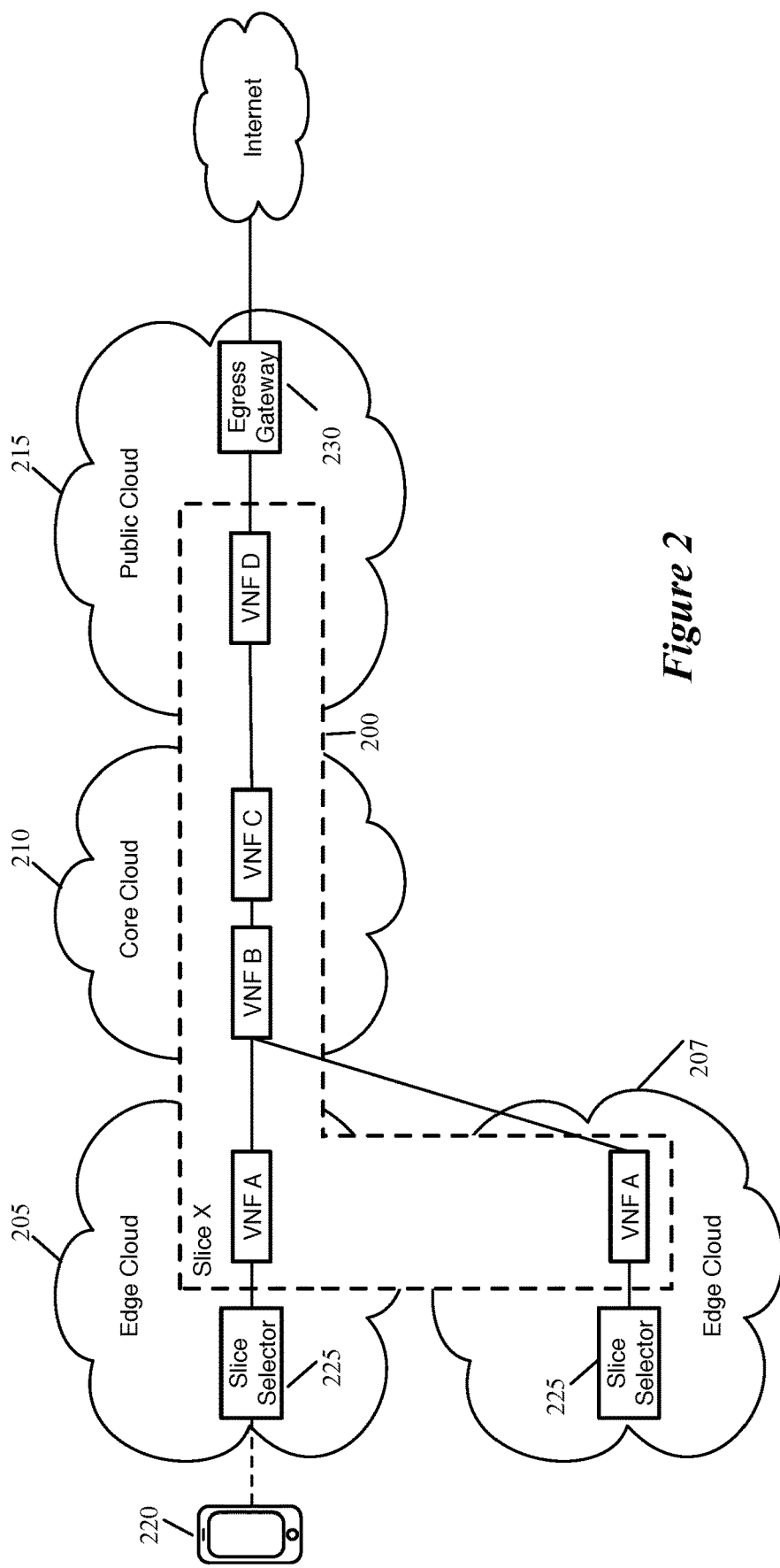
FIG. 2 conceptually illustrates the distribution of the services for a single network slice over multiple datacenters.

FIG. 2 conceptually illustrates the distribution of the services for a single network slice 200 over multiple datacenters 205-215. As shown, in this example, the network slice 200 includes four network services (VNFs A-D), which are applied to certain data traffic from the device 220 that is assigned to the network slice 200. The first VNF A is implemented in the edge clouds 205 and 207, the second and third VNFs B and C are implemented in the core cloud 210, and the fourth VNF D is implemented in a public cloud 215. In a network (e.g., a 5G network) that uses multi-access edge computing, the slice selector 225 and any network services that are implemented in the edge cloud are instantiated in each edge cloud. As such, both the edge cloud 205 and the edge cloud 207 each have instances of the slice selector 225 and the VNF A (as well as any network services implemented on the edge for any other slices of the same VSN or any other VSNs implemented across the network). In addition, though not shown, within each edge cloud some embodiments execute multiple slice selectors for high availability reasons (e.g., an active slice selector and a standby slice selector, or multiple active slice selectors to share the load of processing all incoming traffic).

In some embodiments, traffic from the device 220 initially passes through the radio access network (RAN), which is not shown in this figure. Some embodiments implement network slicing prior to the RAN (i.e., on the device side of the RAN), while in this example network slicing occurs after the RAN. Next, the data traffic arrives at the slice selector 225 (in the edge cloud 205), which analyzes the traffic and assigns the traffic to the network slice 200.

When the slice selector 225 assigns a data message to the network slice 200, the slice selector 225 is responsible in some embodiments for performing service chaining to ensure that the data message traverses the network services of the assigned slice (i.e., the VNFs A-D) in the correct order. In some embodiments, the slice selector 225 transmits the data message to the first network service (i.e., the VM that implements VNF A in the same edge cloud 205) and maintains context information for that data message. When VNF A completes its processing of the data message, the VNF returns the data message to the slice selector 225. If additional network services for the slice are also implemented in the edge cloud 225 (which is not the case for the slice 200), then the slice selector 225 would use the maintained context information to transmit the data message to the next network service, and so on.

In this case, the second network service VNF B is implemented in the core cloud 210. In some embodiments, the network slice selector 225 transmits the data message to a service chaining module at the core cloud (e.g., via wide area network (WAN) gateways that interconnect the clouds 205-215). In some embodiments, when the full network slice is implemented across multiple datacenters, a similar service chaining module operates at each datacenter to handle the service chaining for the slice within its own datacenter (e.g., in both the core cloud 210 and the public cloud 215). These service chaining modules may be implemented in the same manner as the network slice selectors in some embodiments (e.g., as VMs, as forwarding elements in VMs or virtualization software, as containers). Once the last network service is completed, in some embodiments an egress gateway 230 sends the data message to its destination via the Internet.

Figure 3:
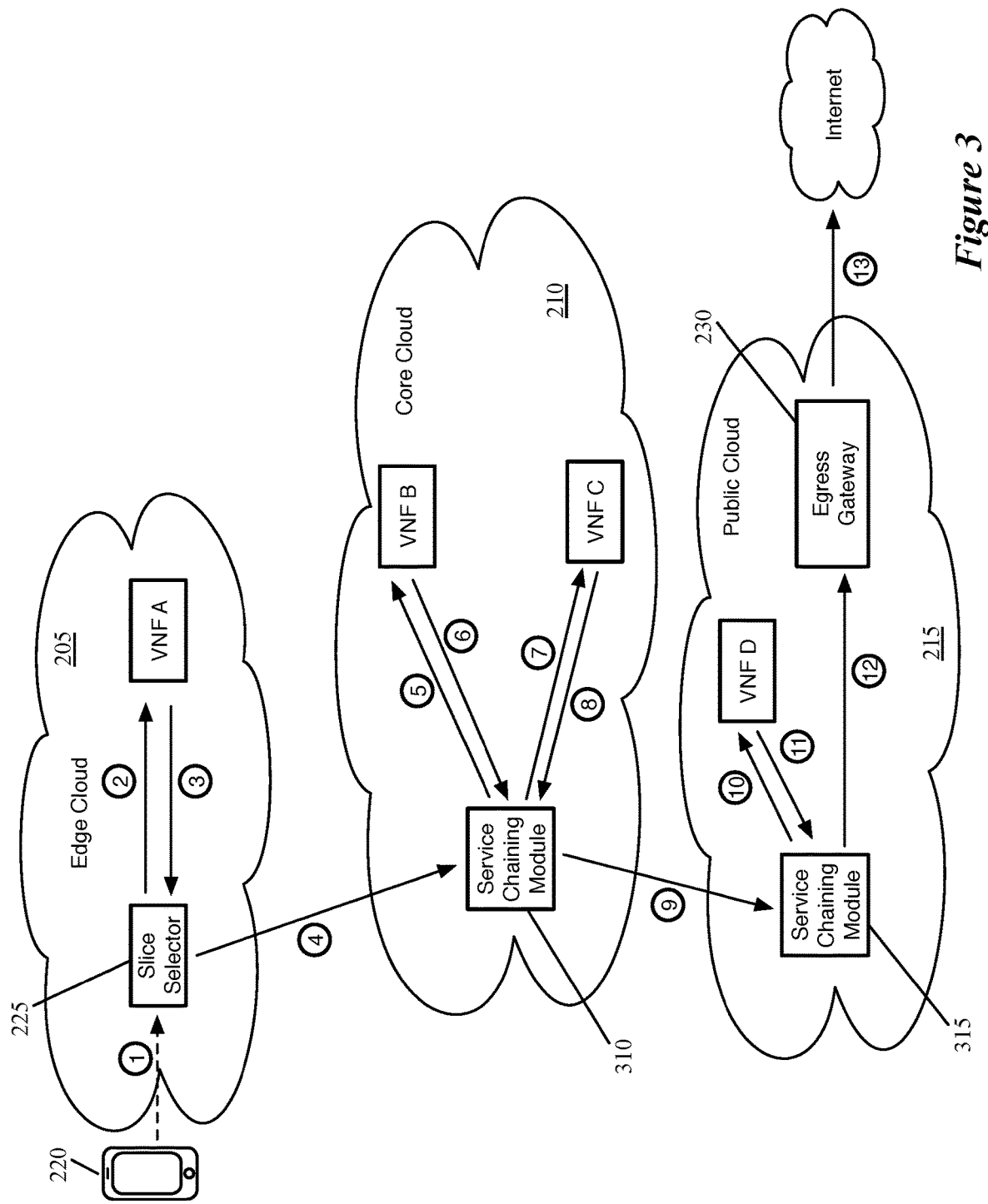
FIG. 3 conceptually illustrates the path a data message that is received at an edge cloud and assigned to the network slice shown in FIG. 2 by the slice selector at the edge cloud takes through the VSN according to some embodiments.

FIG. 3 conceptually illustrates this path that a data message received at the edge cloud 205 and assigned to the slice 200 by the slice selector 225 at that edge cloud takes through the VSN according to some embodiments. As shown by the encircled 1, the endpoint device 220 transmits a data message to the telecommunications provider access network, where it is processed by the slice selector 225 at the edge cloud 205. In some embodiments, the data message is initially processed by the RAN and/or EPC, if these portions of the access network are not part of the virtual service network (i.e., if the slice selector processes data messages after the RAN and/or EPC). The slice selector 225 in the edge cloud 205 assigns the data message to the slice 200 (e.g., based on deep packet inspection, L2-L4 headers, or other factors), and identifies that VNF A is (i) the first network service for this slice and (ii) also located in the edge cloud 205. As such, the slice selector 225 transmits the data message to VNF A (shown by the encircled 2), which processes the data message and returns it to the slice selector 225 (shown by the encircled 3).

Next, the slice selector 225 identifies that the next network service for the selected slice 200 is located in the core cloud 210, and thus transmits the data message to the service chaining module 310 that operates in the core cloud 210 (shown by the encircled 4) via WAN gateways (that are not shown in the figure for simplicity). In some embodiments, the service chaining module 310 uses a learning operation (e.g., MAC learning) to store the source of these data messages, so that reverse-direction traffic is sent to the slice selector 225 in the correct edge cloud 205 (i.e., as opposed to the edge cloud 207).

The service chaining module 310 in the core cloud 210 receives the data message as the data message ingresses to the core cloud 210 (after processing by a WAN gateway) and identifies the slice for the data message (e.g., based on context information provided with the data message by the slice selector 310, a stored slice mapping for the connection, or other factors). This service chaining module 310 provides the data message to the network services within the core cloud 210, in this case to VNF B and then to VNF C. As shown, the service chaining module sends the data message to VNF B (shown by the encircled 5), receives the data message back from VNF B (shown by the encircled 6), sends the message to VNF C (shown by the encircled 7), and receives the data message back from VNF C (shown by the encircled 8).

After the data message is processed by VNF C, the data message is transmitted by the service chaining module 310 to another service chaining module 315 (shown by the encircled 9) in the public cloud 215 (e.g., via WAN gateways interconnecting the core cloud 210 and the public cloud 215). The service chaining module 310 operates similarly to the service chaining module 310 in the core cloud 210 in some embodiments, using a learning mechanism to store information for processing return traffic. This service chaining module 310 within the public cloud 215 sends the data message to VNF D (shown by the encircled 10), which performs its network service and returns the data message to the service chaining module 315.

Lastly, the service chaining module 315 determines that the network slice processing is complete for the data message, and sends it to the egress gateway 230, which transmits the data message to its destination via the Internet. While this example shows connectivity between an endpoint device and an Internet domain, in the case of other virtual service networks the destination may instead be located within the public cloud or another datacenter connected via the WAN. The egress gateway 230 of some embodiments stores information mapping the connection to the network slice 200, so that reverse-direction traffic (i.e., data messages from the public Internet domain) are assigned to the same slice (with the network functions performed in the reverse direction). In other embodiments, the egress gateway 230 assigns data messages in a non-stateful manner (e.g., using the destination network address of the data messages). The egress gateway may be implemented together with the service chaining module in some embodiments (or with the original slice selector for virtual service networks that only span a single datacenter).

The slice selectors, network services (e.g., VNFs, CNFs, PNFs), as well as the various forwarding elements that handle transmission of data messages between these entities (e.g., software forwarding elements that tunnel data messages between host machines, WAN gateways) require configuration. In some embodiments, a centralized controller allows a user (e.g., a network administrator) to provide configuration for an entire VSN, and then a controller hierarchy configures the various entities within the one or more datacenters to implement this VSN.

Figure 4:
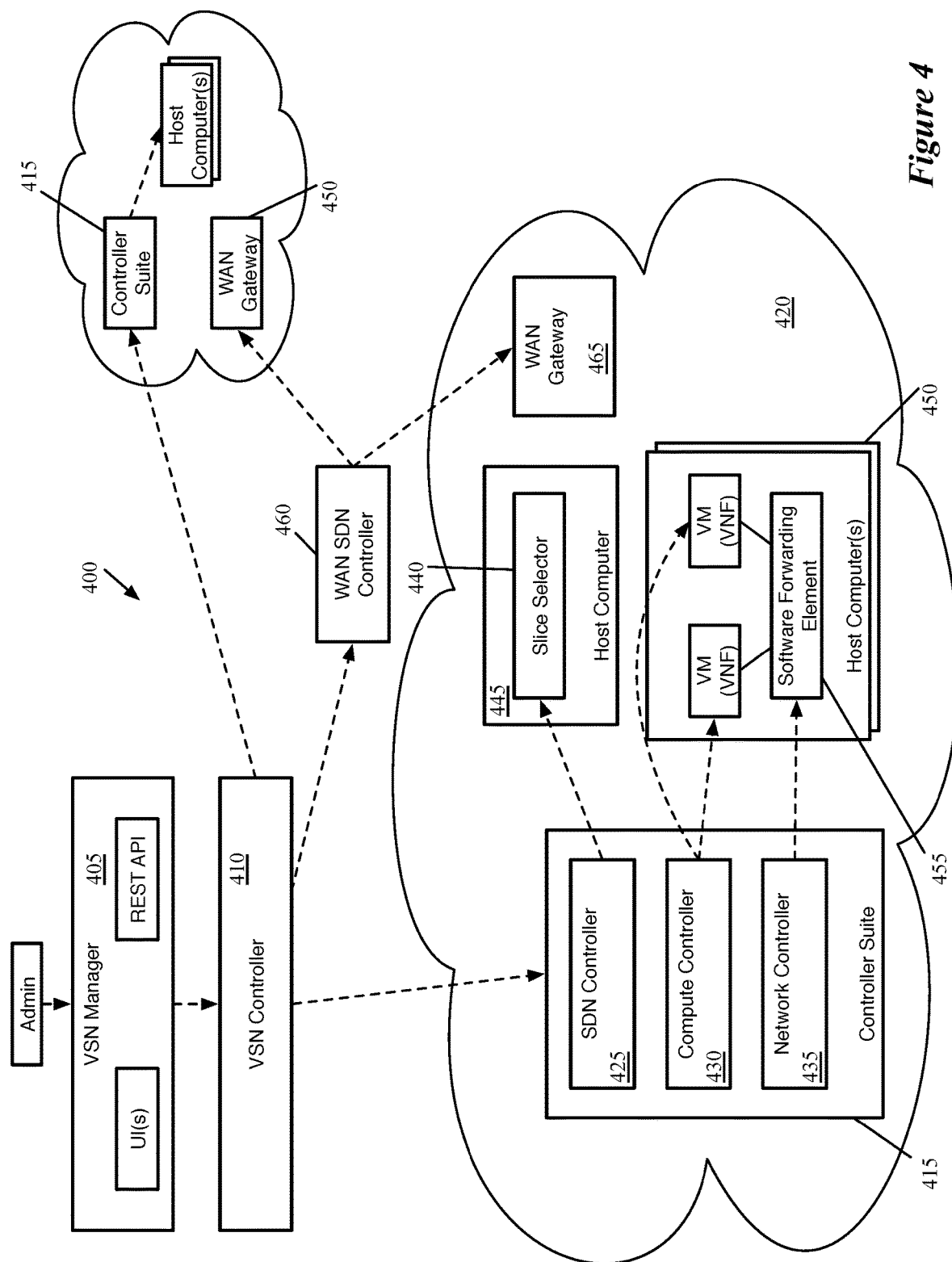
FIG. 4 conceptually illustrates a hierarchical set of controllers.

FIG. 4 conceptually illustrates such a hierarchical set of controllers 400. As shown in this figure, a high-level VSN manager 405 receives a VSN configuration from a network administrator (e.g., for a datacenter tenant, a telecommunications provider). The VSN manager 405 of some embodiments provides one or more interfaces (e.g., a graphical user interface, a command line interface, a set of REST APIs) through which the administrator provides this data. In some embodiments, the configuration data for a VSN specifies the different slices of the VSN, the slice selector configuration (i.e., the characteristics for assigning data messages to each of the different slices), the network service configurations for each network service on a slice, how each network services will be implemented (e.g., as VNFs, CNFs, or PNFs), the locations (e.g., edge clouds, core clouds, or other datacenters) for each network service, and/or other data.

The VSN controller 410 coordinates the centralized storage and distribution of this information to the other controllers in the hierarchy. In some embodiments, a suite of controllers 415 in each of the datacenters receives the VSN configuration data from the VSN controller 410 and configures the entities in the datacenters to implement the VSN. In some embodiments, each datacenter has its own suite of these lower-level controllers. These controller suites may be the same sets of controllers in each datacenter (e.g., a suite of controllers provided by a single company), or different sets of controllers (e.g., a different set of controllers for private edge and core clouds as compared to the public clouds).

The controller suite 415 in the first datacenter 420 includes a software-defined networking (SDN) controller 425, a compute controller 430, and a network controller 435. It should be understood that different embodiments may include additional controllers or may combine the functionality of multiple controllers into a single controller. For instance, some embodiments include an orchestrator that acts as a layer between the VSN controller 410 and the other controllers in the controller suite 415 (e.g., an openstack controller), or combine the SDN controller 425 features with those of the network controller 435. In addition, some embodiments include a storage controller for managing storage relevant to the VSN within the datacenter.

The SDN controller 425 configures the slice selector 440. In this example, a single slice selector 440 operates in the datacenter 420 (e.g., as a VM or within a VM on the host computer 445, in virtualization software of the host computer 445), though it should be understood that in other embodiments the slice selector 440 is implemented in a distributed manner within the datacenter. In some embodiments, the SDN controller 425 configures the slice selector with flow entries or other configuration data to assign data messages to the flows correctly and to perform service chaining operations to ensure that data messages are sent to the correct network services in the correct order within the datacenter 420. In addition, in datacenters that host network services but not the slice selectors (e.g., core clouds, public and/or private clouds for the telecommunications provider example), the SDN controllers of some embodiments configure the service chaining modules as well as the egress gateways (which may perform slice selection for reverse-direction data messages).

The compute controller 430 is responsible for instantiating and configuring the VNFs (e.g., as VMs in this example). In some embodiments, the VMs are instantiated on host computers 450 by the compute controller 430, which configures the VMs to implement the specified network service. In some embodiments, the compute controller 430 uses templates for firewalls, load balancers, or other network services for instantiating the VMs, then provides the specific configuration data for the network service as specified by the network administrator to the VM. In addition, the compute controller 430 of some embodiments is also responsible for configuring any CNFs and/or PNFs implemented in the datacenter 420.

The network controller 435 configures forwarding elements (e.g., the software forwarding element 455 or other types of forwarding elements such as programmable hardware forwarding elements) to implement the network connectivity between the network services and the slice selector 440. This configuration includes forwarding according to, e.g., a logical forwarding plane that connects the various entities of a slice (the slice selector and the network services), as well as performing encapsulation on data messages to tunnel those data messages between the entities within the datacenter. In addition to the software forwarding elements 455 (e.g., virtual switches operating in virtualization software) shown on the host computers 450, in some embodiments a similar software forwarding element executes in the host computer 445 to forward and encapsulate/decapsulate data messages to and from the slice selector 440. In some embodiments (e.g., when the slice selector is implemented in a distributed manner within the software forwarding elements or between the software forwarding elements and the VMs), the network controller 435 also receives the slice selector configuration and configures the appropriate network entities to implement the slice selector.

In addition to these controllers in the controller suite 415, some embodiments also include one or more WAN SDN controllers 460. The WAN SDN controller 460 is responsible for interconnecting the datacenters as needed, and configures WAN gateways 465 in each of the datacenters to do so. These WAN gateways may interconnect the datacenters using MPLS, SD-WAN, or other technologies for inter-datacenter communications. In many cases, not all of the datacenters will need direct communication. For instance, in the telecommunications example, the edge clouds may not need to communicate with each other, as data traffic is not sent between edge clouds but rather between an edge cloud and a core cloud.

In some embodiments, rather than communicating directly with the controllers in the controller suite 415 and the WAN SDN controller 460, the VSN controller 410 provides data to an agent in each datacenter and an agent for the WAN SDN controller 460. These agents are responsible for translating data from the VSN controller 410 (which may be provided in a uniform format for all controllers) into data that the various controller suites can use. In some embodiments, the VSN controller 410 pushes data in a policy format to the local agents, which translate this into data that instructs the various SDN controllers, compute controllers, and/or network controllers, to configure the datacenter components according to those policies. This allows the VSN controller 410 to use a single format to communicate with various different types of controller suites (e.g., different public cloud controllers, enterprise datacenter controller suites). Similarly, for the WAN SDN controller 460, the agent would convert the policies into WAN configuration instructions.

As mentioned above, network slice selectors may assign data messages to slices using different techniques in different embodiments. Slice selection may be based on packet header information, including layer 2 to layer 4 (L2-L4) headers and/or by performing deep packet inspection (e.g., to classify traffic based on data in the layer 5 to layer 7 (L5-L7) headers). For example, slice selection may be based simply on the source device by using the source network layer (e.g., IP) address, or may be based on the type of traffic and/or destination network domain by looking at the upper layer (L5-L7) headers.

In addition, in some embodiments the network slice selector integrates with other control plane components to collect additional information about a connection (e.g., regarding the user session, device type, or other data) and uses this information as part of the slice selection process (e.g., using only this collected information or combining this information with the L2-L4 and/or L5-L7 packet header data). Examples of such control plane components include Authentication, Authorization, and Accounting (AAA) protocols (e.g., Remote Authentication Dial-in User Service (RADIUS)), the Policy Control and Charging Rules Function (PCRF), or other such components that can provide device and/or user data to the slice selector.

In some embodiments, the network slice selector maintains state for mapping connections to network slices so that deep packet inspection does not need to be performed on each data message of a connection. In addition, for some connections, only certain data messages contain the L5-L7 header information required for performing the slice selection.

When performing network slice selection using deep packet inspection, in certain cases the initial data message for a connection may not include the L5-L7 header information that the slice selector needs to correctly identify the slice. For example, a connection between an endpoint device (e.g., a mobile device such as a smart phone or tablet, a laptop or desktop computer, an IoT device, a self-driving automobile, a smart camera belonging to a security system) and a network domain (e.g., a web domain such as www.netflix.com, www.google.com, etc.) often begins with a set of connection initiation messages such as a TCP handshake. After completion of the handshake, the device then sends, e.g., an http get message that includes the network domain. Subsequent data messages sent between the device and the network domain may not include such information.

Different embodiments use different techniques to identify the correct network slice for a connection while ensuring that (i) the connection is initiated correctly between the client (e.g., an endpoint device) and server (e.g., a web domain) and (ii) all of the messages are transmitted on the correct network slice, even if that network slice cannot be selected based on the first message. In some embodiments, the network slice selector acts as a proxy to terminate the connection initiation messages without sending these messages across the virtual service network to the intended destination. In other embodiments, the slice selector passes the connection initiation messages through to a default network slice initially, then replays the messages over the correct network slice for the connection after the network slice is selected.

Figure 5:
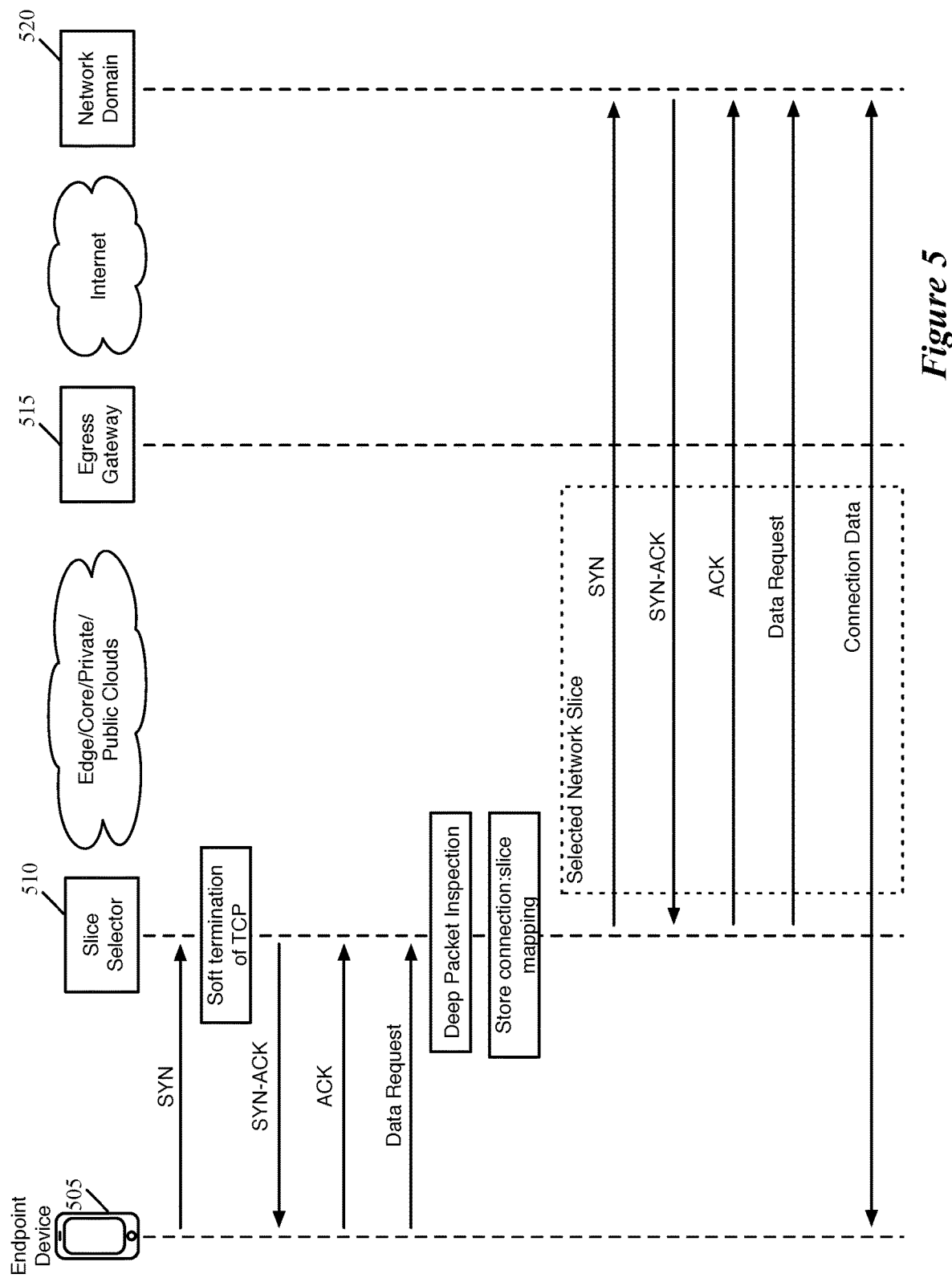
FIG. 5 illustrates a flow diagram that shows the interactions between an endpoint device, a slice selector, an egress gateway, and a network domain to transmit messages for a connection in which the slice selector acts as a soft termination proxy.

FIG. 5 illustrates a flow diagram that shows the interactions between an endpoint device 505, a slice selector 510, an egress gateway 515, and a network domain 520 (e.g., a server) to transmit messages for a connection in which the slice selector acts as a soft termination proxy. This example illustrates a connection that is initiated by the endpoint device 505 using a TCP three-way handshake, but the slice selector 510 of some embodiments is also capable of performing similar termination for other types of connection initiation messaging (e.g., TLS handshakes, QUIC connections over UDP). In this example, a set of private and public clouds (e.g., connected by SD-WAN or MPLS) host the virtual service network that is sliced (between the slice selector 510 and the egress gateway 515), while the egress gateway connects this VSN to the Internet (and the network domain 520).

As shown, the endpoint device 505 (e.g., a smart phone, a self-driving automobile, an IoT device) initially transmits a TCP SYN message directed to the network domain 520 (e.g., using a destination IP address for the network domain). Such a message may not have useful header information (e.g., L5-L7 header information) for the slice selector 510 to use in order to assign the connection being initiated to one of the network slices. As mentioned, in some embodiments the network slices are application-specific and/or device-specific, configured to meet latency, bandwidth, jitter, or other requirements of different applications or device types. Streaming video, self-driving vehicles, IoT devices, and other devices/applications all have different requirements that can be met by different network slices with different SLAs.

Rather than forwarding the connection initiation message (the SYN message) through the network to the Internet (and eventually the network domain 520), the slice selector 510 performs soft termination of the connection initiation. The slice selector 510 stores a record of the SYN message (i.e., the message itself or enough data to recreate the message) and replies to the endpoint device 505 with a SYN-ACK message. This SYN-ACK message is formatted as though the network domain received the SYN message and replied with the SYN-ACK message. This causes the endpoint device 505 to send an ACK message and behave as though the connection has been set up with the network domain 520. The slice selector 505 stores data about all of the connection initiation messages for subsequent use.

Based on the appearance of the connection having been setup properly, the endpoint device 505 then sends a data request message (or other message). This message will typically have L7 information (or other higher-layer information, such as a TLS server name indication) required by the slice selector to correctly assign the connection to a network slice. For instance, FIG. 6 conceptually illustrates an http get message 600. Such a message has an L3 header (L2 headers, etc. are not shown for simplicity) including source and destination IP addresses and a transport layer protocol field and an L4 header including source and destination port numbers. In addition, a portion of the L7 header of the message 600 includes a domain name within the http get command (in this case, www.exampledomain.com).

The slice selector 510 performs deep packet inspection on the data message (in this case, the data request) to identify the correct network slice for the connection. In some embodiments, this involves inspecting the L5-L7 headers (e.g., the http data shown in FIG. 6). In addition, the slice selector 510 stores state mapping the connection to the selected network slice, for use in processing subsequent data messages. In some embodiments, the slice selector stores this mapping as a connection 5-tuple (i.e., source and destination network address, transport layer protocol, source and destination transport layer ports) mapped to a slice identifier. In addition, some embodiments identify related connections that will require assignment to the same network slice and store state for these connections as well. As an example, a streaming video session will include, in some embodiments, multiple separate TCP connections (for audio and for different video resolutions).

Figure 7:
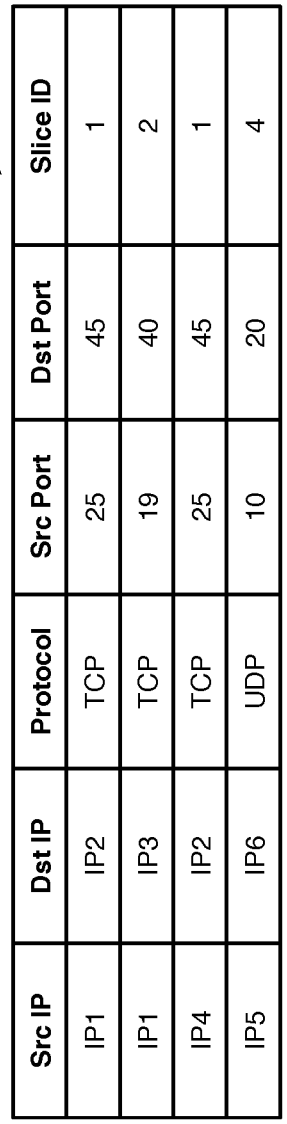
FIG. 7 illustrates entries for a connection mapping table of some embodiments stored by a slice selector.

FIG. 7 illustrates entries for a connection mapping table 700 of some embodiments stored by a slice selector. As shown, this table includes entries by the 5-tuple mapped to a slice identifier. In some embodiments, these entries are generated as flow entries for a flow-based forwarding element that implements the slice selector. For each flow entry, the match conditions are the connection 5-tuple and the action is to assign a data message to the specified slice. As this table 700 shows, a single source device (e.g., IP1) may have multiple ongoing connections that are assigned to multiple different network slices (e.g., for a concurrent web browsing connection and audio stream). In addition, a slice selector might assign connections for multiple different devices to the same slice (e.g., multiple self-driving automobiles, two devices streaming video simultaneously). In some embodiments, additional information besides the 5-tuple is included in the match condition (e.g., VLAN information or other virtual network identifiers).

The slice selector 510 then exchanges the connection initiation messages with the destination network domain, this time acting as the device rather than the destination domain. These connection initiation messages are transmitted via the selected network slice, such that all of the network services on the selected network slice process the connection initiation messages. As shown, the slice selector 510 transmits the SYN message to the network domain 520 via the selected network slice and the egress gateway 515. The egress gateway 515, in some embodiments, also stores connection to slice mapping state so that return traffic from the network domain 520 can also be transmitted via the selected network slice. The network domain 520 returns a SYN-ACK message, which the egress gateway 515 transmits via the selected network slice. This message does not reach the endpoint device 510, as the slice selector 510 recognizes the SYN-ACK message and returns the ACK message to the network domain (via the selected network slice). At this point, the connection is fully initiated between the endpoint device 505 and the network domain 520, as the entire 3-way handshake has been fully exchanged.

Figure 8:
FIG. 8 conceptually illustrates a data message.

The slice selector 510 can then transmit the data request (i.e., the initial data message on which deep packet inspection was performed) to the network domain 520 via the selected network slice. Subsequent data messages for the connection are also exchanged between the endpoint device 505 and the network domain 520, and the slice selector 510 uses the stored state to assign this traffic to the selected network slice without performing deep packet inspection (as does the egress gateway 515 for return traffic). This avoids performing deep packet inspection on every data message for the connection, which may not be possible as the required information might not be in the L5-L7 headers of all of the data messages belonging to the connection. FIG. 8 conceptually illustrates such a data message 800. The data message 800 has similar L3 and L4 headers to those of the data message 600, but the L7 header does not include the same network domain information. Instead, the L7 portion of the data message includes payload data (e.g., video or audio data) that is not useful for the slice selector of some embodiments.

Figure 9:
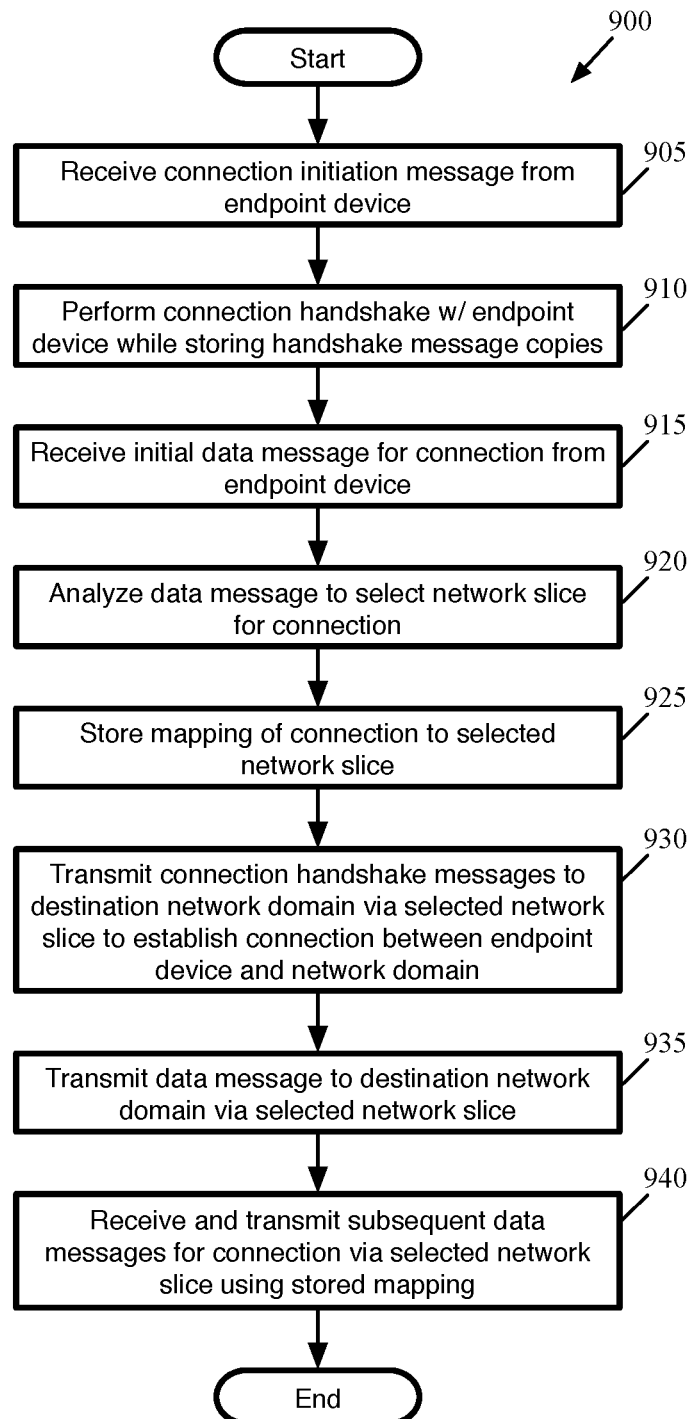
FIG. 9 conceptually illustrates a process of some embodiments for assigning a connection between an endpoint device and a destination network domain to a network slice of a VSN by terminating the connection handshake.

FIG. 9 conceptually illustrates a process 900 of some embodiments for assigning a connection between an endpoint device and a destination network domain to a network slice of a VSN by terminating the connection handshake. In some embodiments, the process 900 is performed by a slice selector such as the slice selector 510 shown in FIG. 5. Similar processes may be performed by slice selectors in other types of networks (e.g., intra-datacenter or inter-datacenter communication that does not reach the public Internet).

As shown, the process 900 begins by receiving (at 905) a connection initiation message from an endpoint device (e.g., a phone, a self-driving automobile, a tablet, an IoT device). This message may be a TCP SYN message, the initial message of a TLS handshake, a QUIC protocol message over UDP, or other connection initiation message. The process then performs (at 910) the rest of the connection handshake with the endpoint device while storing copies of the handshake messages (or data needed to recreate the handshake messages). For example, in the TCP 3-way handshake example, the slice selector exchanges SYN-ACK and ACK messages with the endpoint device, acting as the server in this handshake. For optimized single-message connection initiation (e.g., QUIC protocol), this operation is not required, and the slice selector either performs deep packet inspection on the initial message or on a subsequent message without performing a handshake with the endpoint device.

Once the connection has been setup on the endpoint device, the process 900 receives (at 915) an initial data message for the connection from the endpoint device. This may be an http get message such as that shown in FIG. 6, or another data message. In many cases, this data message will include information useful for performing slice selection, so the process 900 analyzes (at 920) the data message to select a network slice for the connection. This deep packet inspection may examine the name of the domain being contacted, the particular L7 protocol in use (e.g., to identify the type of application initiating the connection), or other information in the higher-layer headers of the data message. The process 900 also stores (at 925) state mapping the connection (e.g., using the 5-tuple) to the selected network slice. This information may be stored in a connection mapping table such as that shown in FIG. 7 (by, e.g., generating a new flow entry for the connection).

Next, the process 900 transmits (at 930) the connection handshake messages to the destination network domain via the selected network slice in order to establish the connection between the endpoint device and the network domain. In this exchange of messages, the slice selector acts as the endpoint device rather than the network domain, allowing the network domain server to setup the connection. This also allows the network services of the selected network slice to process the connection initiation messages, so that these services will be prepared for the subsequent data messages (e.g., a firewall would often be configured to reject data messages for a TCP connection for which it had not processed the original 3-way handshake messages).

The process 900 also transmits (at 935) the initial data message to the destination network domain via the selected network slice. In addition, the process 900 receives and transmits (at 940) subsequent data messages for the connection via the selected network slice using the stored connection mapping state. The stored state allows the slice selector to assign each data message for the connection from the endpoint device to the selected network slice without the need to perform deep packet inspection (which, as mentioned, may not even be possible for many of the subsequent data messages).

Figure 10:
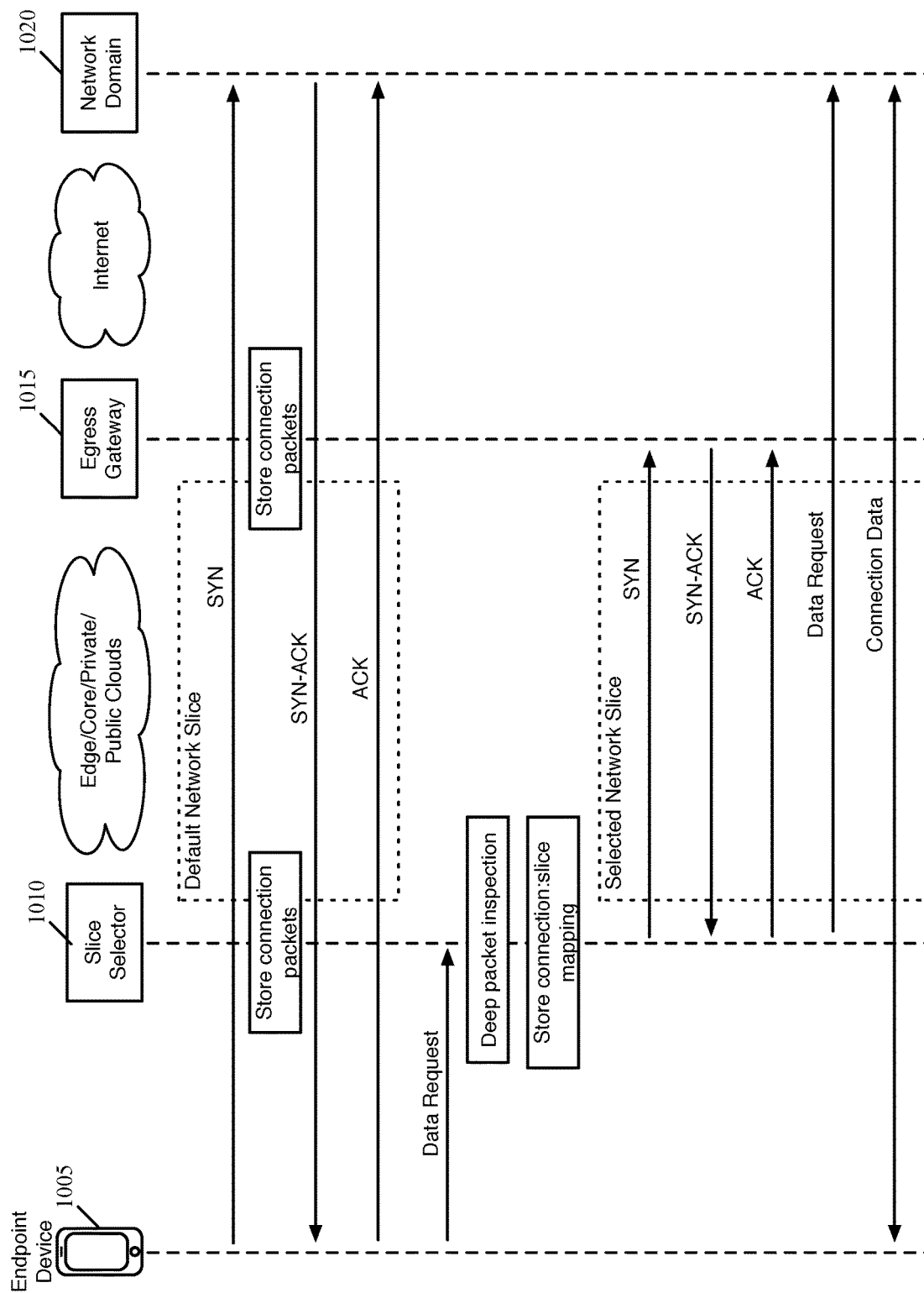
FIG. 10 illustrates a flow diagram that shows the interactions between an endpoint device, a slice selector, an egress gateway, and a network domain to transmit messages for a connection in which the slice selector and the egress gateway perform a handshake replay.

As mentioned, rather than terminating the connection initiation messages at the slice selector, some embodiments pass these messages through to the destination on a default network slice initially, then replay the messages over the correct network slice for the connection after the network slice is selected. FIG. 10 illustrates a flow diagram that shows the interactions between an endpoint device 1005, a slice selector 1010, an egress gateway 1015, and a network domain 1020 (e.g., a server) to transmit messages for a connection in which the slice selector and egress gateway perform a handshake replay. This example illustrates a connection that is initiated by the endpoint device 1005 using a TCP three-way handshake, but the slice selector 1010 of some embodiments is also capable of performing a similar replay for other types of connection initiation messaging (e.g., TLS handshakes, QUIC connections over UDP). In this example, a set of private and public clouds (e.g., connected by SD-WAN or MPLS) host the virtual service network that is sliced (between the slice selector 1010 and the egress gateway 1015), while the egress gateway 1015 connects this VSN to the Internet (and the network domain 1020).

As shown, the endpoint device 1005 (e.g., a smart phone, a self-driving automobile, an IoT device) initially transmits a TCP SYN message directed to the network domain 1020 (e.g., using a destination IP address for the network domain). Such a message does not have useful L5-L7 header information for the slice selector 1010 to use in order to assign the connection being initiated to one of the network slices, as described above. In this case, rather than terminating the handshake and responding to the endpoint device, the slice selector 1010 assigns the TCP SYN message to the default network slice and transmits the message through this network to the network domain 1020 (via the egress gateway 1015). In addition, both the slice selector 1010 and the egress gateway 1015 store records of the SYN message (i.e., the message itself or enough data to recreate the message). The network domain 1020 replies with a SYN-ACK message, which the egress gateway 1015 assigns to the default slice, and the slice selector treats the ACK message from the endpoint device 1005 similarly.

Figure 6:
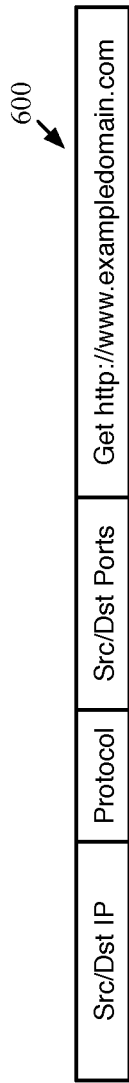
FIG. 6 conceptually illustrates an http get message.

With the connection setup between the endpoint device 1005 and the network domain 1020, the endpoint device 1005 then sends a data request message (or other message). This message will typically have L5-L7 information required by the slice selector to correctly assign the connection to an application-specific or device-specific network slice. FIG. 6, described above, conceptually illustrates an example of such a message 600.

The slice selector 1010 performs deep packet inspection on the data message (in this case, the data request) to identify the correct network slice for the connection. In some embodiments, this involves inspecting the L5-L7 headers (e.g., the http data shown in FIG. 6). In addition, the slice selector 1010 stores state mapping the connection to the selected network slice, for use in processing subsequent data messages. In some embodiments, the slice selector stores this mapping as a connection 5-tuple (i.e., source and destination network address, transport layer protocol, source and destination transport layer ports) mapped to a slice identifier, as shown in FIG. 7, which is described above. In addition, some embodiments identify related connections that will require assignment to the same network slice and store state for these connections as well. As an example, a streaming video session will include, in some embodiments, multiple separate TCP connections (for audio and for different video resolutions).

Before transmitting the data messages onto the selected slice, however, the slice selector replays the connection initiation messages over the selected network slice. The various network services of the selected slice will not have yet processed the connection initiation messages, and thus would be likely to reject data messages for the connection if these data messages were sent without replaying the handshake. Thus, as shown, the slice selector 1010 uses its stored data to exchange the TCP 3-way handshake messages with the egress gateway 515, which has also stored information for these messages. The SYN, SYN-ACK, and ACK messages are transmitted between the slice selector 1010 and the egress gateway 1015 via the selected network slice. These messages are not transmitted outside of the virtual service network (i.e., to either the endpoint device or the public Internet), because the connection has already been established between the endpoint device 1005 and the network domain 1020. The egress gateway 1015, in some embodiments, also stores the connection to slice mapping state so that return traffic from the network domain 1020 can be transmitted via the selected network slice.

Once these messages have been replayed, the network services of the selected slice will have processed the connection initiation messages and thus are prepared for the subsequent data message traffic between the endpoint device and the destination network domain. As shown, the slice selector 1010 transmits the data request (i.e., the initial data message on which deep packet inspection was performed) to the network domain 1020 via the selected network slice. Subsequent data messages for the connection are also exchanged between the endpoint device 1005 and the network domain 1020, and the slice selector 1010 uses the stored state to assign this traffic to the selected network slice without performing deep packet inspection (as does the egress gateway 1015 for return traffic). This avoids performing deep packet inspection on every data message for the connection, which may not be possible as the required information might not be in the L5-L7 headers of all of the data messages belonging to the connection (e.g., as shown by the data message 800 of FIG. 8).

Figure 11:
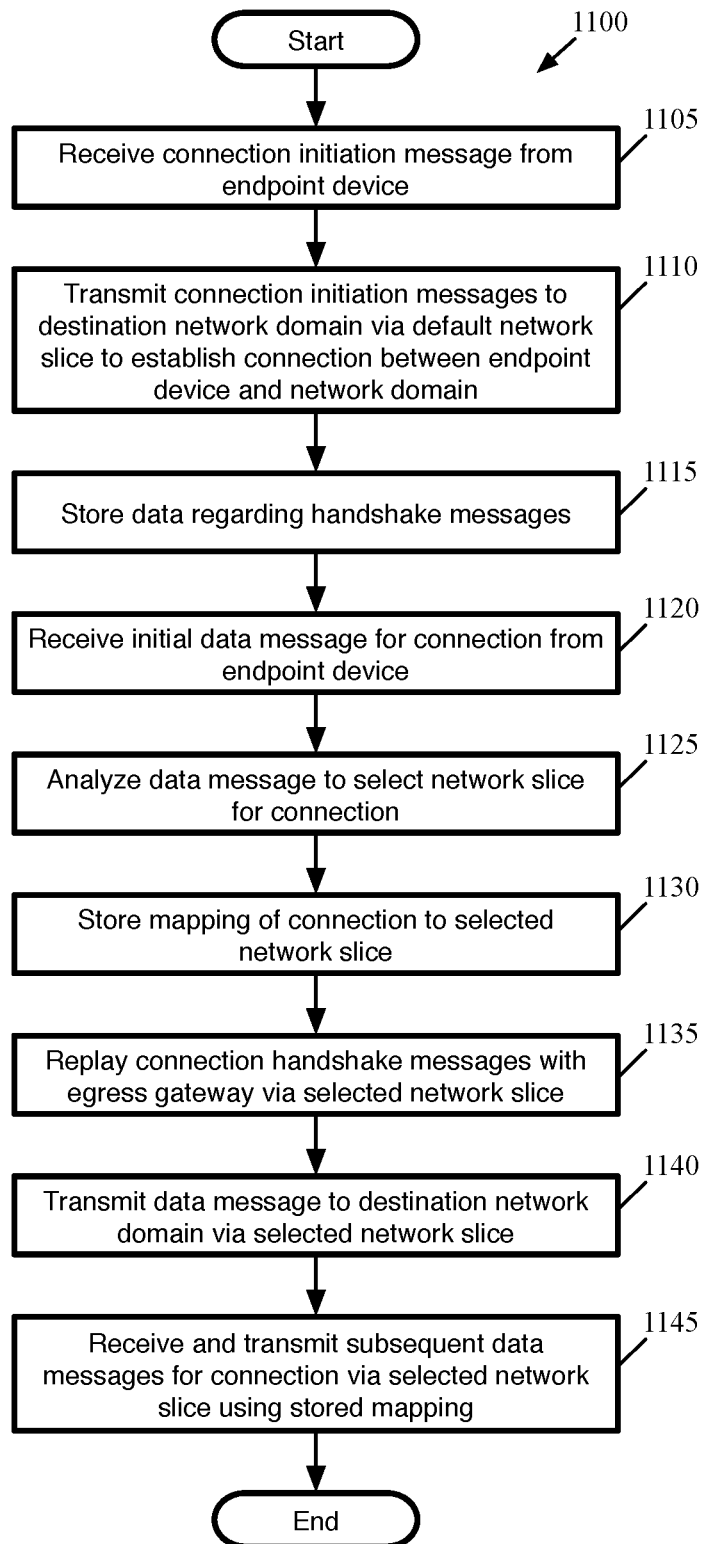
FIG. 11 conceptually illustrates a process of some embodiments for assigning a connection between an endpoint device and a destination network domain to a network slice of a VSN by replaying the connection handshake messages.

FIG. 11 conceptually illustrates a process 1100 of some embodiments for assigning a connection between an endpoint device and a destination network domain to a network slice of a VSN by replaying the connection handshake messages. In some embodiments, the process 1100 is performed by a slice selector such as the slice selector 1010 shown in FIG. 10. Similar processes may be performed by slice selectors in other types of networks (e.g., intra-datacenter or inter-datacenter communication that does not reach the public Internet).

As shown, the process 1100 begins by receiving (at 1105) a connection initiation message from an endpoint device (e.g., a phone, a self-driving automobile, a tablet, an IoT device). This message may be a TCP SYN message, the initial message of a TLS handshake, a QUIC protocol message over UDP, or other connection initiation message. The process then transmits (at 1110) the connection initiation messages (i.e., the initial message and any subsequent messages) to the destination network domain via a default network slice to establish the connection between the endpoint device and the network domain. Similarly, for return messages of the connection initiation handshake sent from the endpoint domain, the slice selector receives these messages via the default slice and transmits them to the endpoint device.

During the connection initiation handshake, the process stores (at 1115) data regarding the handshake messages (i.e., copies of the messages, or data needed to recreate the messages). For example, in the case of a TCP 3-way handshake, the slice selector stores the data in order to send SYN and ACK messages. For single-message connection initiation (e.g., QUIC protocol), this operation is not required, and the slice selector of some embodiments performs deep packet inspection on the initial message so as to avoid the need to use the default slice.

Once the connection has been setup on the endpoint device, the process 1100 receives (at 1120) an initial data message for the connection from the endpoint device. This may be an http get message such as that shown in FIG. 6, or another data message. In many cases, this data message will include information useful for performing slice selection, so the process 1100 analyzes (at 1125) the data message to select a network slice for the connection. This deep packet inspection may examine the name of the domain being contacted, the particular L7 protocol in use (e.g., to identify the type of application initiating the connection), or other information in the higher-layer headers of the data message. The process 1100 also stores (at 1130) state mapping the connection (e.g., using the 5-tuple) to the selected network slice. This information may be stored in a connection mapping table such as that shown in FIG. 7 (e.g., by generating a new flow entry for the connection).

Next, the process 1100 replays (at 1135) the connection handshake messages with the egress gateway via the selected network slice. In this exchange of messages, the slice selector acts as the client (i.e., the endpoint device) and the egress gateway acts as the server (i.e., the network domain). In the TCP 3-way handshake example, the slice selector sends a SYN message, receives a SYN-ACK message from the egress gateway, and sends an ACK message. This serves the purpose of allowing the network services of the selected network slice to process the connection initiation messages, so that these services will be prepared for the subsequent data messages (e.g., a firewall would often be configured to reject data messages for a TCP connection for which it had not processed the original 3-way handshake messages).

The process 1100 also transmits (at 1140) the initial data message to the destination network domain via the selected network slice. In addition, the process 900 receives and transmits (at 1145) subsequent data messages for the connection via the selected network slice using the stored connection mapping state. The stored state allows the slice selector to assign each data message for the connection from the endpoint device to the selected network slice without the need to perform deep packet inspection (which, as mentioned, may not even be possible for many of the subsequent data messages).

Figure 12:
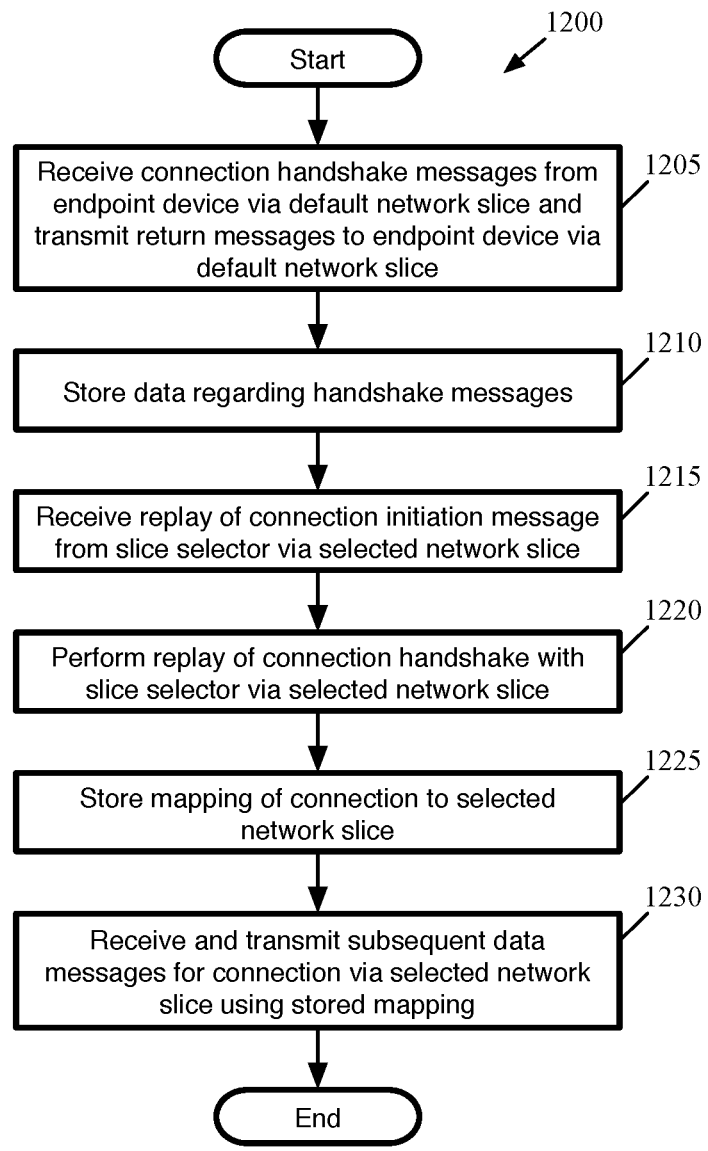
FIG. 12 conceptually illustrates a process of some embodiments for the egress gateway during the handshake replay case.

FIG. 12 conceptually illustrates a process 1200 of some embodiments for the egress gateway during the handshake replay case. In the example shown in FIG. 10 (i.e., in which the VSN is implemented on a telecommunications service provider access network), the egress gateway that performs the process 1200 is the gateway that connects the VSN to the public Internet.

As shown, the process 1200 begins by receiving (at 1205) a set of connection handshake messages from an endpoint device via a default network slice and transmitting return messages from the destination network domain for the connection to the endpoint device via a default network slice. The egress gateway receives the messages sent by the endpoint device and transmits these messages to their destination in addition to receiving the return traffic and sending this onto the default network slice towards the slice selector (and eventually the endpoint device). In addition, the process 1200 stores (at 1210) data regarding the handshake messages (i.e., copies of the messages, or data needed to recreate the messages). For example, in the case of a TCP 3-way handshake, the egress gateway stores the data in order to send the SYN-ACK message. single-message connection initiation (e.g., QUIC protocol), this operation is not required, and the slice selector of some embodiments performs deep packet inspection on the initial message so as to avoid the need to use the default slice or perform handshake replay.

Once the connection has been setup between the endpoint device and the network domain, the process 1200 receives (at 1215) a replay of the connection initiation message from the slice selector via the selected network slice. The slice selector, at this point, would have received a data message from the endpoint device, used deep packet inspection to assign the connection to a particular one of the possible network slices, and then begun the replay process by sending the initial connection initiation message to the egress gateway. The process 1200 performs (at 1220) the complete replay of the connection handshake with the slice selector via the selected network slice using the stored data for these messages. That is, the egress gateway recognizes the initial connection initiation message as corresponding to a stored set of handshake message data and uses that stored set of data to perform the replay. For instance, in the TCP 3-way handshake example, the egress gateway receives as SYN message, sends the SYN-ACK message to the slice selector, and receives the ACK message. This enables the network services of the selected network slice to process the full set of handshake messages and be prepared for the rest of the data belonging to the connection.

The process 1200 stores (at 1225) state mapping the connection (e.g., using the 5-tuple) to the selected network slice. This information may be stored in a connection mapping table such as that shown in FIG. 7 (e.g., by generating a new flow entry for the connection if the gateway is a flow-based forwarding element). Using this stored state, the process 1200 receives (at 1230) and transmits subsequent return data messages (i.e., from the public network domain) belonging to the connection to the endpoint device via the selected network slice.

Other embodiments may use other techniques to build up the state that maps connections to network slices. In some embodiments, the slice selector integrates (e.g., over a control plane channel) with an external component that provides a populated connection-to-slice mapping table to the slice selector, which the slice selector uses to perform stateful slice selection (thereby avoiding the requirement for the slice selector to perform deep packet inspection). The external component, in different embodiments, may provide an entirely pre-populated connection-to-slice mapping table or gradually populate the table with updates as endpoint devices initiate connections. As an example, the slice selectors of some embodiments can integrate with the 5G Network Slice Selection Function (NSSF), allowing the NSSF to define the connection-to-slice mapping. In some such embodiments, the NSSF provides the mapping state to the slice selector, which uses the state to select the correct slice for data packets. That is, an offline external component provides the connection-to-slice mapping state and the slice selector enforces this state in the data plane.

Stateful slice selection, in which an initial data message is inspected to select a network slice for a connection and subsequent data messages are assigned to the network slice based on state stored by the slice selector, works so long as the same slice selector (and egress gateway) process all of the data traffic for a connection. However, in a distributed network (e.g., a telecommunications service provider access network) with numerous slice selectors associated with different geographic ranges, mobile devices (e.g., smart phones, tablets, self-driving automobiles) may move from one geographic range served by a first slice selector to another geographic range served by a second slice selector (e.g., when moving from one base station to another, between groups of base stations that provide traffic to the same centralized unit, when moving from a WiFi network to a cellular network) while maintaining a connection. Different embodiments use different techniques to ensure that the state is maintained, without requiring action on the part of the endpoint device.

In some embodiments, the second slice selector (the slice selector for the region to which the mobile device moves) forwards all data messages for the connection to the first slice selector (the slice selector for the region in which the mobile device was located when the connection was initiated). That is, the second slice selector receives data indicating that the first slice selector is the location of the slice mapping state for the connection, and thus forwards the data traffic for the connection to the first slice selector.

Figure 13:
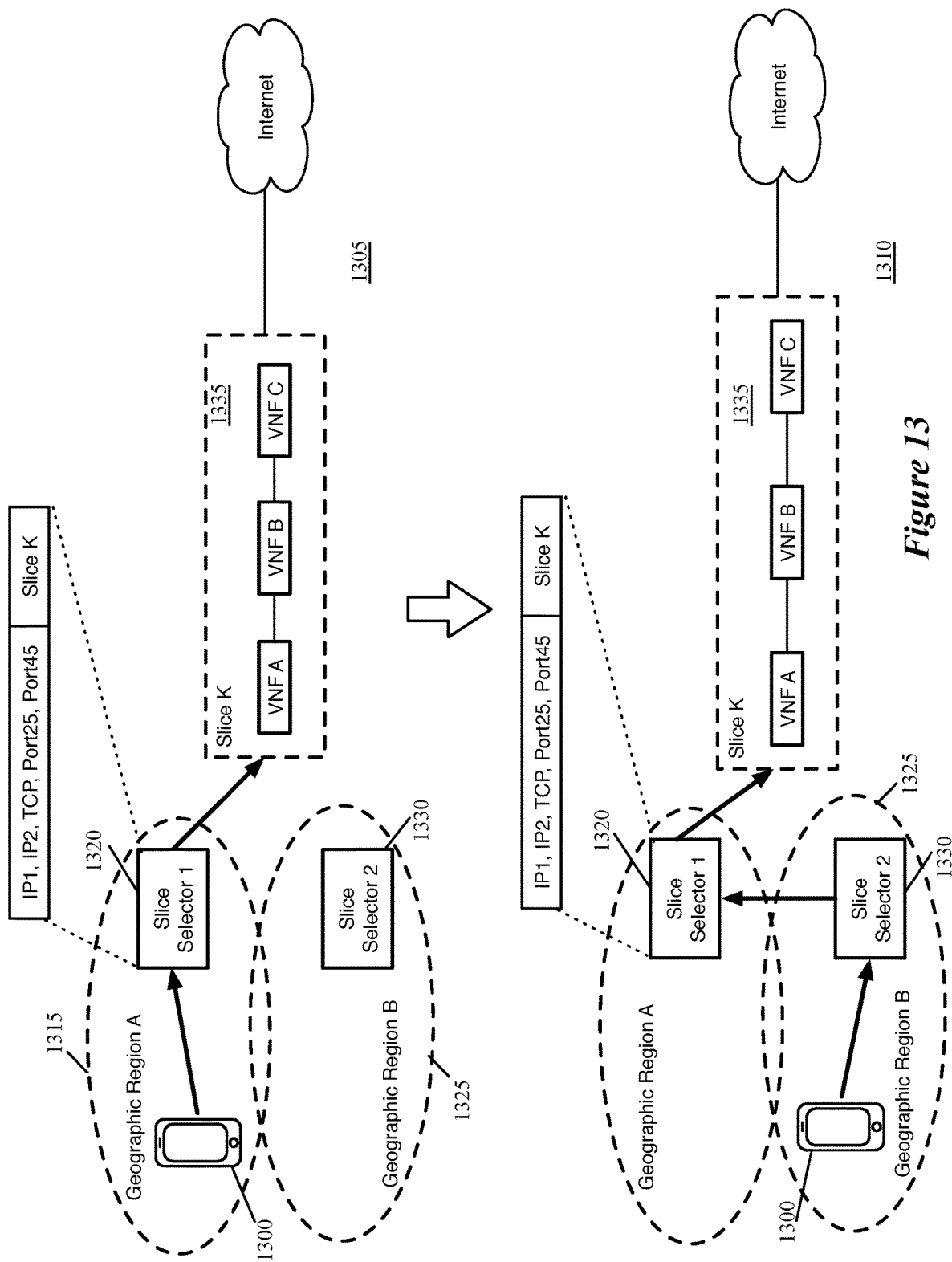
FIG. 13 conceptually illustrates a mobile device moving from a first slice selector region to a second slice selector region with the second slice selector forwarding data traffic from the mobile device to the first slice selector.

FIG. 13 conceptually illustrates a mobile device 1300 moving from a first slice selector region to a second slice selector region with the second slice selector forwarding data traffic from the mobile device 1300 to the first slice selector over two stages 1305-1310. As shown in the first stage 1305, the mobile device 1300 initiates a connection with a public network destination (not shown) while located in a first geographic region 1315 served by a first slice selector 1320. A neighboring (and in some cases, partially overlapping) geographic region 1325 is served by a second slice selector 1330. In some embodiments, each slice selector is located in an edge cloud that corresponds to a 5G centralized unit (CU), which encompasses multiple distributed unit (DU) ranges (i.e., multiple cell towers).

When the mobile device 1300 initiates a connection (which may be only one of multiple connections initiated by the device (e.g., in a single PDU session)), the first slice selector 1320 assigns the connection to the slice 1335, one of several slices of a virtual service network implemented over the access network. As shown, the network slice 1335 includes three VNFs A-C before transmitting data through an egress gateway (not shown) to the Internet. The first slice selector 1320, after performing deep packet inspection to select the network slice, stores state data mapping the connection (in this case, a TCP connection between IP1 and IP2) to the selected network slice. As mentioned above, this state data may be stored as a flow entry (or set of flow entries), as an entry in a connection table, or in another manner. For subsequent traffic from the mobile device 1300 that belongs to this connection, the slice selector 1320 assigns the traffic to the selected network slice 1335 (other connections from the device 1300 may be assigned to other slices). Return traffic for the connection is received from the Internet at the egress gateway, which uses similar stored state to assign this traffic to the same network slice 1335. This return traffic is processed by the VNFs of the network slice 1335 in the reverse order, and then sent from the slice selector 1300 to the mobile device 1300.

In the second stage, however, the mobile device 1300 has moved to the second geographic region 1325, and thus no longer connects to the first slice selector 1320 (i.e., the mobile device 1300 is connected to a different base station that provides traffic to the second slice selector 1330 rather than the first slice selector 1320). The second slice selector 1330 does not have the connection-to-slice mapping state to assign this data traffic from the device 1300 to the correct network slice, and in many cases the data messages will not include the necessary data in the L5-L7 headers for the slice selector 1330 to assign the connection to the network slice. As such, the second slice selector 1330 forwards this traffic to the first slice selector 1320, which uses its stored state information to assign the traffic to the selected network slice 1335. New connections started by the device 1300 while in the second geographic region 1325 will be assigned to the correct slice by the second slice selector 1330.

For the second slice selector 1330 to transmit the data traffic to the first slice selector 1320, in some embodiments the second slice selector 1330 sends the packet via a routable network between the two slice selectors. That is, in such embodiments a routable network exists between the two edge clouds at which the slice selectors are implemented, which can be used to transmit data traffic between the two slice selectors. In other embodiments, the data traffic can be sent through a core cloud (if the two edge clouds connect to the same core cloud) or other WAN connection, or through the VSN controller (though this solution is not optimal if a large amount of traffic is transmitted between slice selectors).

Reverse-direction (return) traffic for the ongoing connection is treated differently in different embodiments, because the slice selector does not need the connection state in some embodiments to process return traffic and send this return traffic to the device 1300. However, in many cases, at least one of the network services is stateful and implemented in the same location (e.g., the same edge cloud) as the slice selector, and thus the return traffic needs to be sent to that edge cloud in order for the same implementation of those network services (i.e., the VM in the first edge cloud with the first slice selector 1320 rather than a VM in the second edge cloud with the second slice selector 1330). The first slice selector 1320 then forwards this return traffic to the second slice selector 1330 in order for the second slice selector 1330 to forward the data to the mobile device 1300 (e.g., through the RAN). In some embodiments, the service chaining module in the core cloud uses its learning function (e.g., a MAC learning feature) to automatically transmit the return traffic to the first slice selector 1320 from which it received the traffic originating at the mobile device 1300. In addition, in some embodiments, the first slice selector 1320 uses a similar learning function when receiving traffic for the connection from the second slice selector 1330, so that it automatically forwards the return traffic onto the network between the two slice selectors (which results in that traffic returning to the second slice selector 1330. For instance, when there is a routable network between the two slice selectors, the first slice selector 1320 stores the MAC address of the router from which it received the traffic from the second slice selector 1330, so that return traffic can be forwarded to this router using the stored MAC address. Other embodiments use a separate ingress gateway function on the slice (i.e., before the first network service), that is responsible for sending return traffic to the correct slice selector In order for the second slice selector 1330 to forward the data traffic for a particular connection to the first slice selector 1320, the second slice selector needs to receive data indicating that the first slice selector 1320 has the state information for the connection. In different embodiments, the first slice selector either (i) pushes the state location information to a network controller (e.g., the aforementioned VSN controller), from which the second slice selector retrieves the state location information or (ii) pushes the state location information to the second slice selector.

Figure 14:
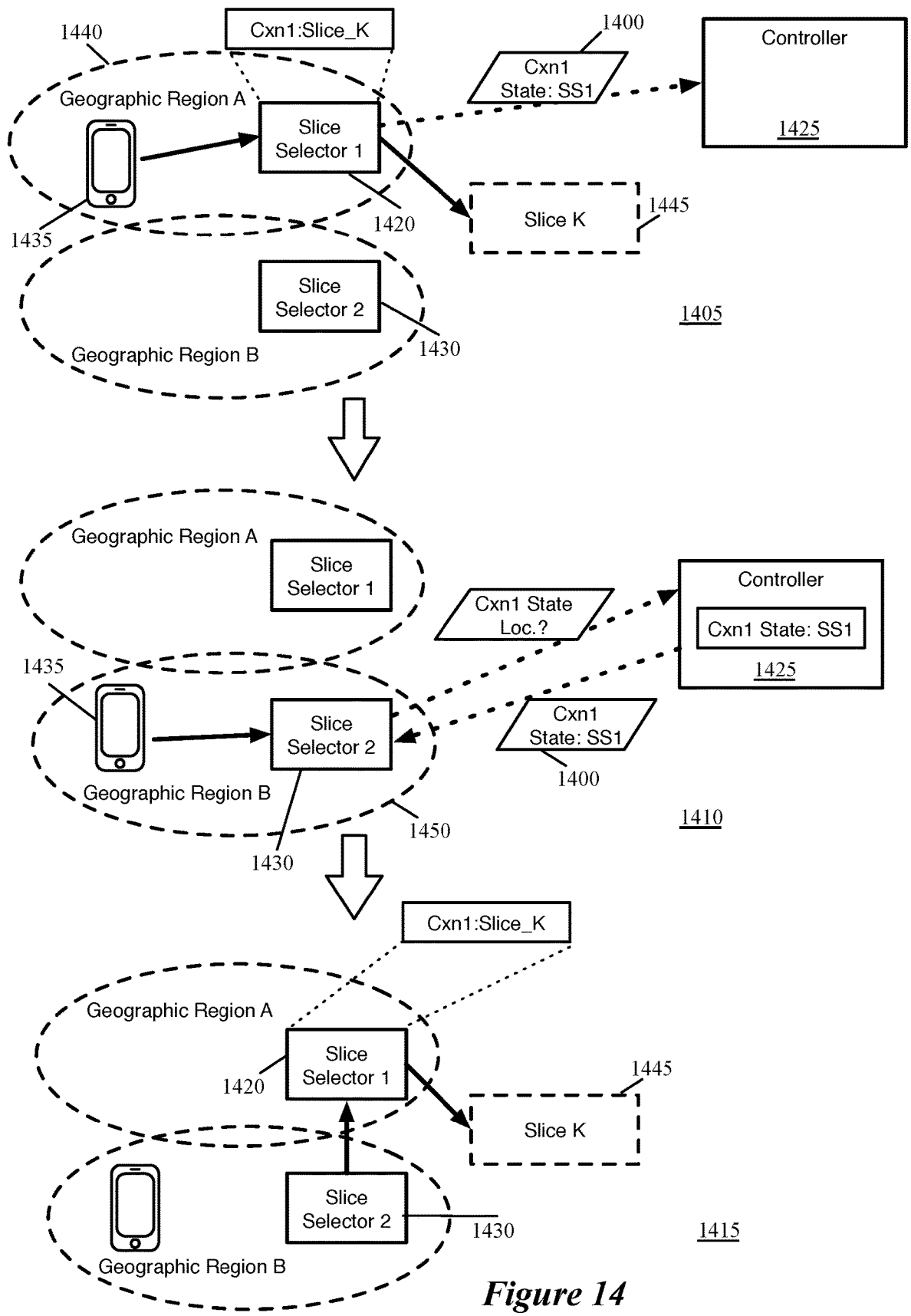
FIG. 14 conceptually illustrates an example of a first slice selector pushing state location information to a central controller and a second slice selector retrieving the state location information from the central controller.

FIG. 14 conceptually illustrates an example of a first slice selector 1420 pushing state location information 1400 to a central controller 1425 and a second slice selector 1430 retrieving the state location information from the central controller 1425 over three stages 1405-1415. As shown in the first stage 1405, like in the example of FIG. 13, a mobile device 1435 initiates a connection with a public network destination while located in a first geographic region 1440 associated with the first slice selector 1420. The first slice selector assigns the connection to a network slice 1445, forwards data traffic from the mobile device 1440 belonging to this connection to this slice (i.e., to the network services of this slice), and stores connection state mapping the connection to the selected network slice.

In addition, the first slice selector 1420 pushes information to the network controller 1425 specifying that the first slice selector is the location of the slice mapping state for this connection. This network controller, in some embodiments, is a VSN controller that provides VSN configuration data to the controllers at multiple datacenters in which the VSN is implemented. Specifically, in some embodiments, the first slice selector 1420 provides the slice mapping state location data to one of the controllers local to its datacenter (e.g., the SDN controller that configures the slice selector), which in turn passes the state location data to the VSN controller so that it can be accessed by slice selectors at other datacenters.

In the second stage 1410, the mobile device 1435 has moved to a second geographic range 1450 associated with the second slice selector 1430. Upon receiving a data message from the device 1435 for an ongoing connection that the second slice selector 1430 does not recognize, this slice selector 1430 sends a request to the controller 1425 (e.g., by making such a request to one of the controllers local to its datacenter, which in turn sends the request to the VSN controller). The controller 1425 stores this state location information 1400, and thus returns the information 1400 to the second slice selector 1430 (e.g., via the controller local to the datacenter of the second slice selector 1430).

Based on this state location information, in the third stage 1415, the second slice selector 1430 is able to forward the data message for this connection (as well as subsequent data messages for the connection) to the first slice selector 1420, which can forward the data onto the selected network slice 1445. In some embodiments, datacenter-to-datacenter connections (i.e., routable networks) exist between edge clouds, while in other embodiments this traffic is passed from one slice selector to another through core clouds or other networks.

Figure 15:
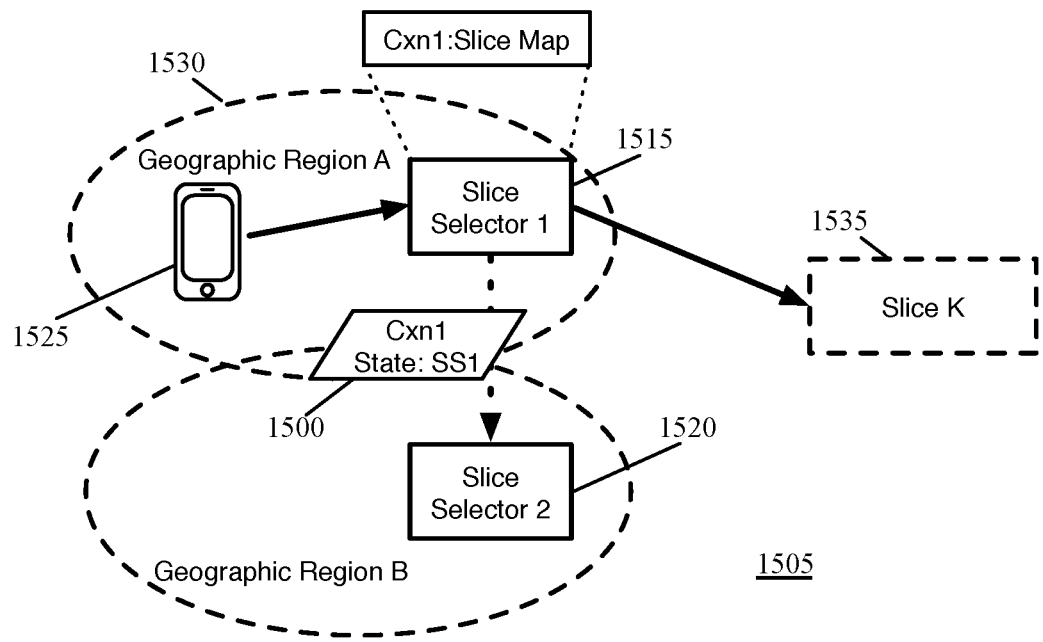
FIG. 15 conceptually illustrates an example of a first slice selector pushing state location information to a second slice selector.
Figure 15:
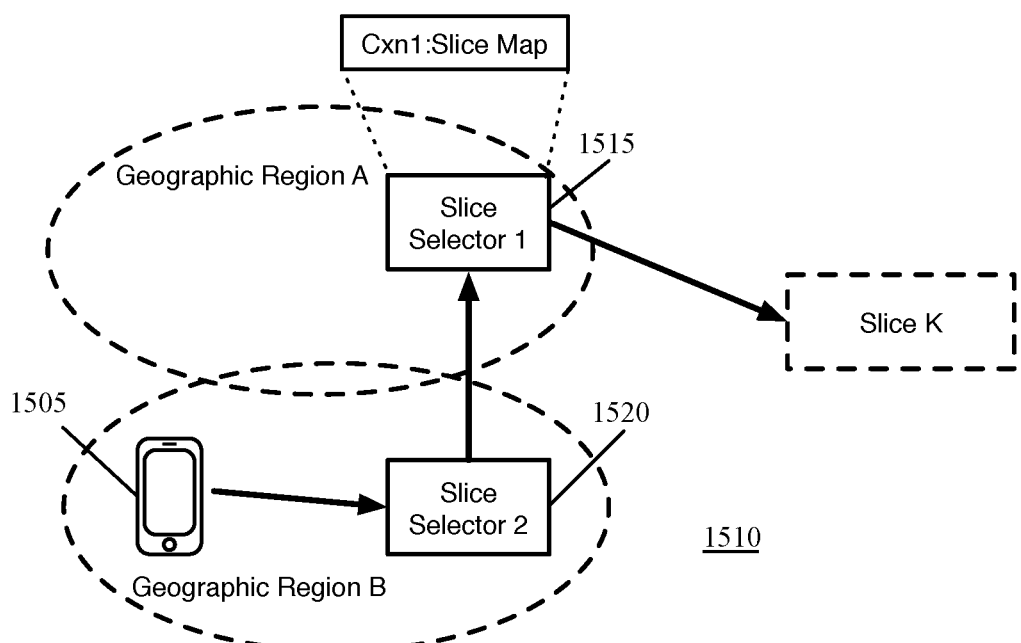

In other embodiments, the slice selector through which a connection was initiated pushes the state location information to other slice selectors (e.g., geographically neighboring slice selectors) such that those other slice selectors have the state location information available if the mobile device that initiated the connection moves into a new geographic region. FIG. 15 conceptually illustrates an example of a first slice selector 1515 pushing state location information 1500 to a second slice selector 1520 over two stages 1505-1510. As shown in the first stage 1505, like in the example of FIG. 13, a mobile device 1525 initiates a connection with a public network destination while located in a first geographic region 1530 associated with the first slice selector 1515. The first slice selector 1515 assigns the connection to a network slice 1535, forwards data traffic from the mobile device 1525 belonging to this connection to this slice (i.e., to the network services of this slice), and stores connection state mapping the connection to the selected network slice.

In addition, the first slice selector 1515 pushes information to the second slice selector 1520 specifying that the first slice selector 1515 is the location of the slice mapping state for this connection. Different embodiments transmit the state location information in different ways. In some embodiments, this information is transmitted through the data network (e.g., via a routable datacenter-to-datacenter network, through an edge cloud) as for the data traffic sent between the two slice selectors (but as control plane data between control plane interfaces of the slice selectors), while in other embodiments the state location information is pushed to a controller (i.e., as shown in FIG. 14), which in turn automatically pushes the state location information to the second slice selector 1520. The state location information, in different embodiments, may be pushed to specific slice selectors with neighboring geographic ranges, to all slice selectors for a particular network (e.g., for a particular network service provider), or to other combinations of slice selectors.

In the second stage 1510, the mobile device 1525 has moved to a second geographic range 1540 associated with the second slice selector 1520. Upon receiving data traffic from the device 1525 for an ongoing connection, the second slice selector 1520 can map that data traffic to the state location data that it already stores and forward the data messages to the first slice selector 1515, which forwards the data onto the selected network slice 1535. In some embodiments, datacenter-to-datacenter connections (i.e., routable networks) exist between edge clouds, while in other embodiments this traffic is passed from one slice selector to another through core clouds or other networks.

Rather than data for a connection always being forwarded to the original slice selector through which a mobile device initiated the connection, other embodiments provide the slice mapping state for the connection to other slice selectors to which the mobile device moves. The second slice selector (i.e., the slice selector into the range of which the mobile device moves) receives the slice mapping state for the connection and is thus able to forward the data messages for the connection to the network slice without involving the first network slice selector (through which the connection was initiated).

Figure 16:
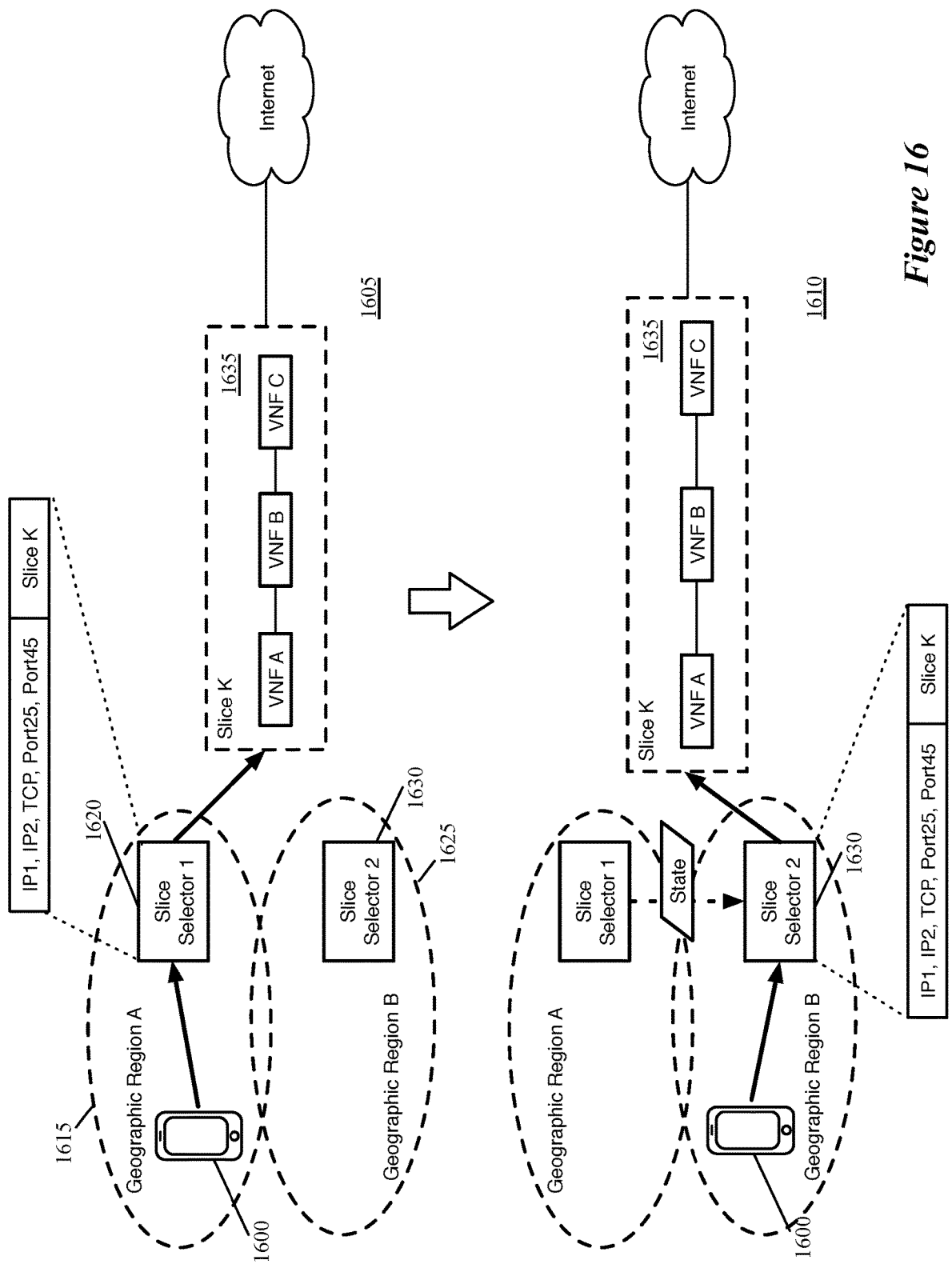
FIG. 16 conceptually illustrates a mobile device moving from a first slice selector region to a second slice selector region with the second slice selector receiving slice mapping state for a connection and forwarding data traffic for the connection using the slice mapping state.

FIG. 16 conceptually illustrates a mobile device 1600 moving from a first slice selector region to a second slice selector region with the second slice selector receiving slice mapping state for a connection and forwarding data traffic for the connection using the slice mapping state, over two stages 1605-1610. As shown in the first stage 1605, the mobile device 1600 initiates a connection with a public network destination (not shown) while located in a first geographic region 1615 served by a first slice selector 1620. A neighboring (and in some cases, partially overlapping) geographic region 1625 is served by a second slice selector 1630. In some embodiments, each slice selector is located in an edge cloud that corresponds to a 5G centralized unit (CU), which encompasses multiple distributed unit (DU) ranges (i.e., multiple cell towers).

When the mobile device 1600 initiates a connection (which may be only one of multiple connections initiated by the device (e.g., in a single PDU session)), the first slice selector 1620 assigns the connection to the slice 1635, one of several slices of a VSN implemented over the access network. As shown, the network slice 1635 includes three VNFs A-C before transmitting data through an egress gateway (not shown) to the Internet. The first slice selector 1620, after performing deep packet inspection to select the network slice, stores state data mapping the connection (in this case, a TCP connection between IP1 and IP2) to the selected network slice. As mentioned above, this data may be stored as a flow entry (or set of flow entries), as an entry in a connection table, or in another manner. For subsequent traffic from the mobile device 1600 that belongs to this connection, the slice selector 1620 assigns the traffic to the selected network slice 1635 (other connections from the device 1600 may be assigned to other slices). Return traffic for the connection is received from the Internet at the egress gateway, which uses similar stored state to assign this traffic to the same network slice 1635. This return traffic is processed by the VNFs of the network slice 1635 in the reverse order, and then sent from the slice selector 1600 to the mobile device 1600

In the second stage, however, the mobile device 1600 has moved to the second geographic region 1625, and thus no longer connects to the first slice selector 1620 (i.e., the mobile device 1600 is connected to a different base station that provides traffic to the second slice selector 1630 rather than the first slice selector 1620). In this case, rather than forwarding data from the mobile device 1600 to the first slice selector 1620, the first slice selector 1620 has provided the slice mapping state for the connection to the second slice selector 1630. As such, the second slice selector 1630 can forward this data directly to the network slice 1635 selected for the connection, without the need to perform any deep packet inspection.

In some embodiments, one or more of the network services for the slice is stateful and is implemented in the edge clouds along with the slice selectors. If the services are stateless, then when the traffic moves to the second slice selector 1630, the instances of those services in the new edge cloud can process the traffic without any issues. However, when a network service in the edge cloud is stateful, then some embodiments transfer the state from the instance of the service in the edge cloud with the first slice selector 1620 to the instance of the network service in the edge cloud with the second slice selector 1630. Another option utilized by some embodiments is to migrate the network service instance from the first edge cloud to the second edge cloud. However, if the network service instance is processing traffic for numerous connections, then this option has downsides of interrupting the other connections. In some other embodiments, if any of the network services for the selected slice are stateful and implemented in the edge clouds with the slice selectors, then slice mapping state for the connection is not provided to the second slice selector, which instead forwards data traffic to the first slice selector as shown above in FIGS. 13-15.

In different embodiments, the second slice selector 1630 may receive the state directly from the first slice selector or from a network controller (e.g., the aforementioned VSN controller). In some such embodiments, the first slice selector pushes the state either (i) directly to the second slice selector (e.g., before the device has moved to the geographic region of the second slice selector) or (ii) to the network controller, from which the second slice selector retrieves the state. In other such embodiments, the first slice selector pushes location information for the state to the network controller, and the second slice selector retrieves this location information from the network controller, then uses this location information to retrieve the state from the first slice selector.

Figure 17:
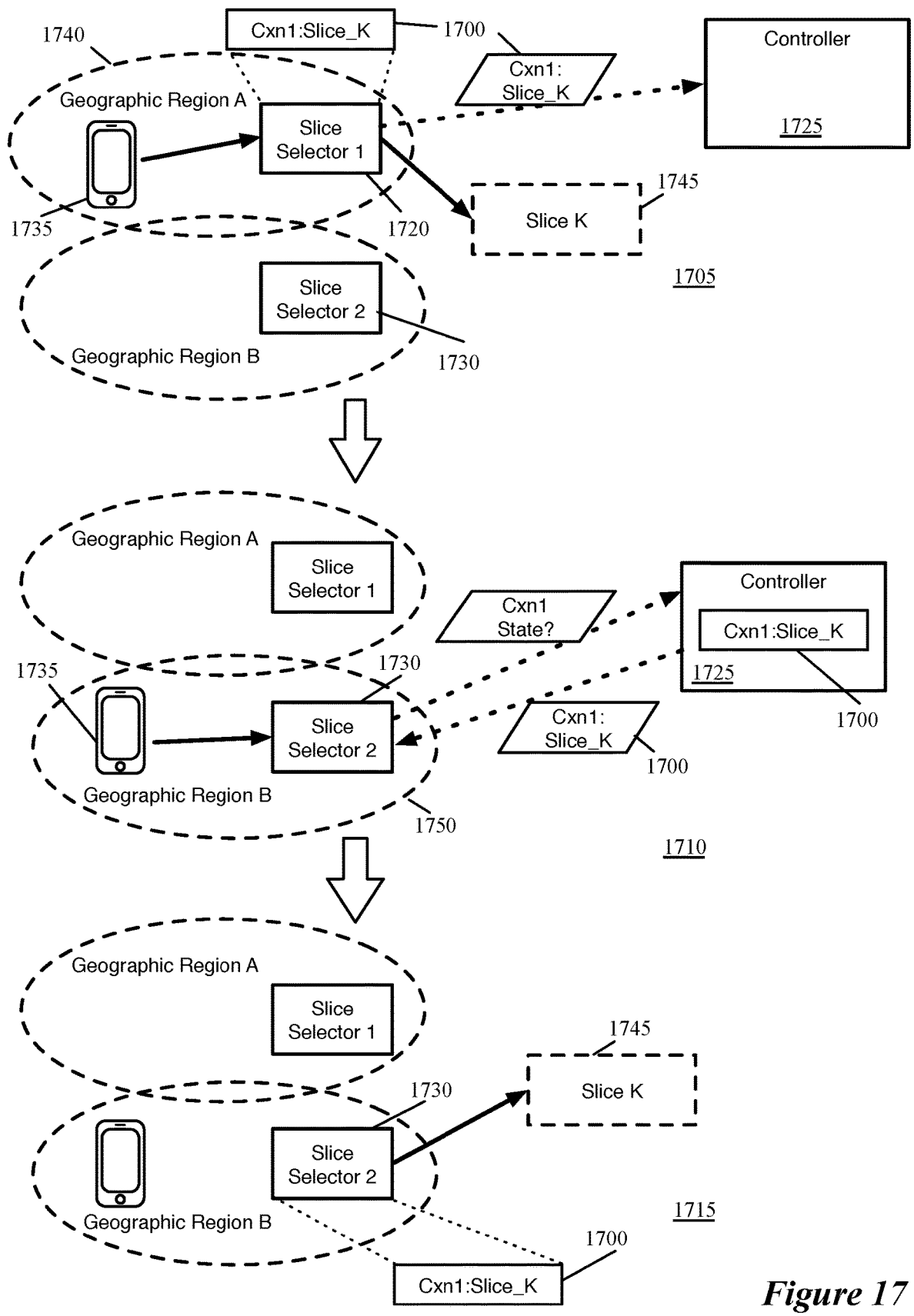
FIG. 17 conceptually illustrates an example of a first slice selector pushing slice mapping state to a central controller and a second slice selector retrieving the slice mapping state from the central controller.

FIG. 17 conceptually illustrates an example of a first slice selector 1720 pushing slice mapping state 1700 to a central controller 1725 and a second slice selector 1730 retrieving the slice mapping state from the central controller 1725 over three stages 1705-1715. As shown in the first stage 1705, like in the example of FIG. 16, a mobile device 1735 initiates a connection with a public network destination while located in a first geographic region 1740 associated with the first slice selector 1720. The first slice selector 1720 assigns the connection to the network slice 1745, forwards data traffic from the mobile device 1740 belonging to this connection to the selected slice (i.e., to the network services of this slice), and stores connection state 1700 mapping the connection to the selected network slice.

In addition, the first slice selector 1720 pushes the connection to slice mapping state 1700 to the network controller 1725, so that other slice selectors can retrieve this state if needed. This network controller, in some embodiments, is a VSN controller that provides VSN configuration data to the controllers at multiple datacenters in which the VSN is implemented. Specifically, in some embodiments, the first slice selector 1720 provides the slice mapping state 1700 to one of the controllers local to its datacenter (e.g., the SDN controller that configures the slice selector), which in turn passes the state to the VSN controller so that it can be accessed by slice selectors at other datacenters.

In the second stage 1710, the mobile device 1735 has moved to a second geographic range 1750 associated with the second slice selector 1730. Upon receiving a data message from the device 1735 for an ongoing connection that the second slice selector 1730 does not recognize, this slice selector 1730 sends a request to the controller 1725 (e.g., by making such a request to one of the controllers local to its datacenter, which in turn sends the request to the VSN controller). The controller 1725 stores the slice mapping state 1700 for the connection specified in this request, and thus returns the state 1700 to the second slice selector 1730 (e.g., via the controller local to the datacenter of the second slice selector 1730).

Based on this slice mapping state, in the third stage 1715, the second slice selector 1730 is able to process the data message received from the mobile device 1735 (as well as subsequent data messages for this connection) and forward this data message onto the selected network slice (i.e., the slice specified in the slice mapping state for the connection).

Figure 18A:
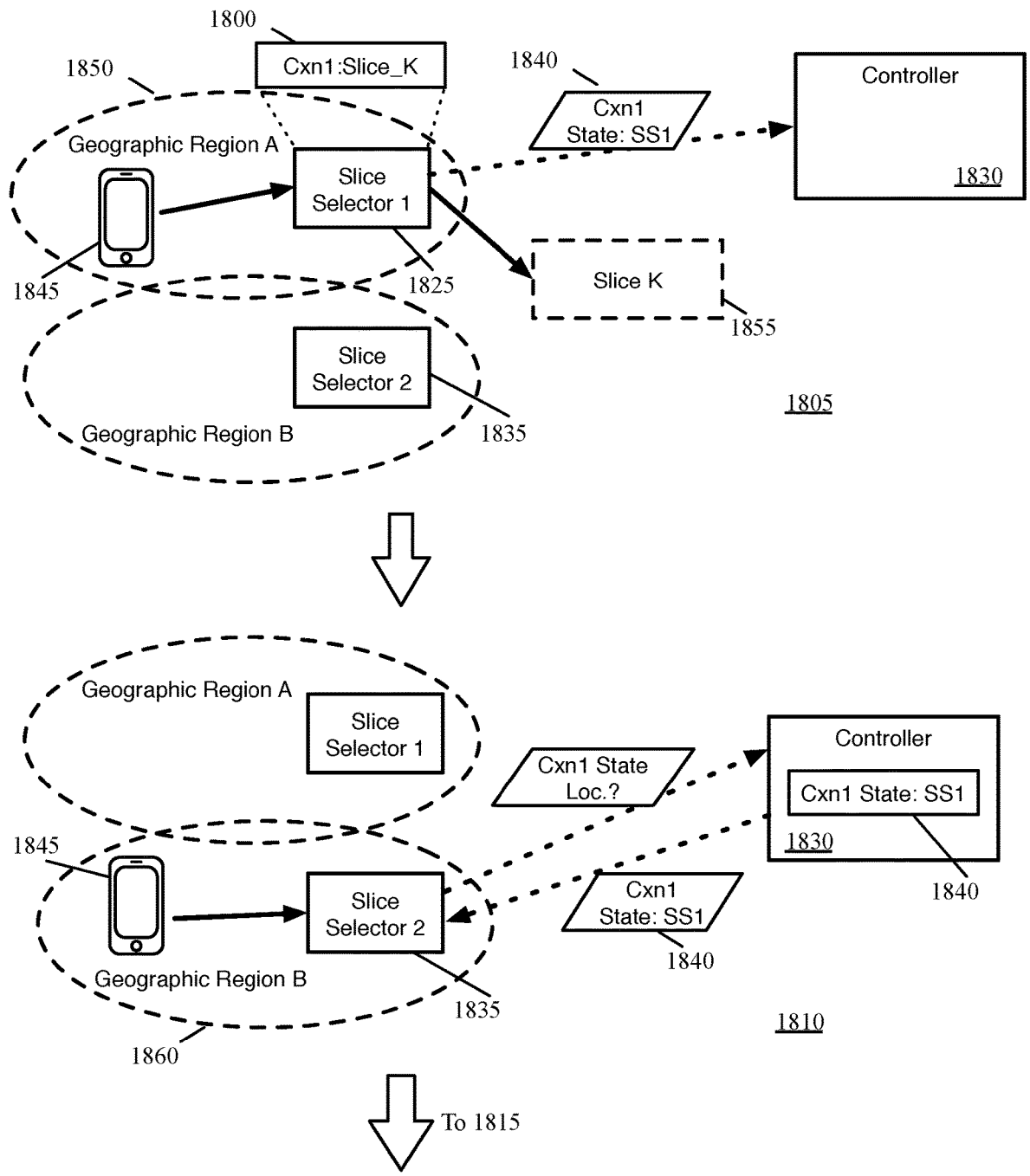
FIGS. 18A-B conceptually illustrate an example of a first slice selector pushing state location information to a controller and a second slice selector retrieving the state location information and using that state location information to retrieve slice mapping state from the first slice selector.
Figure 18B:
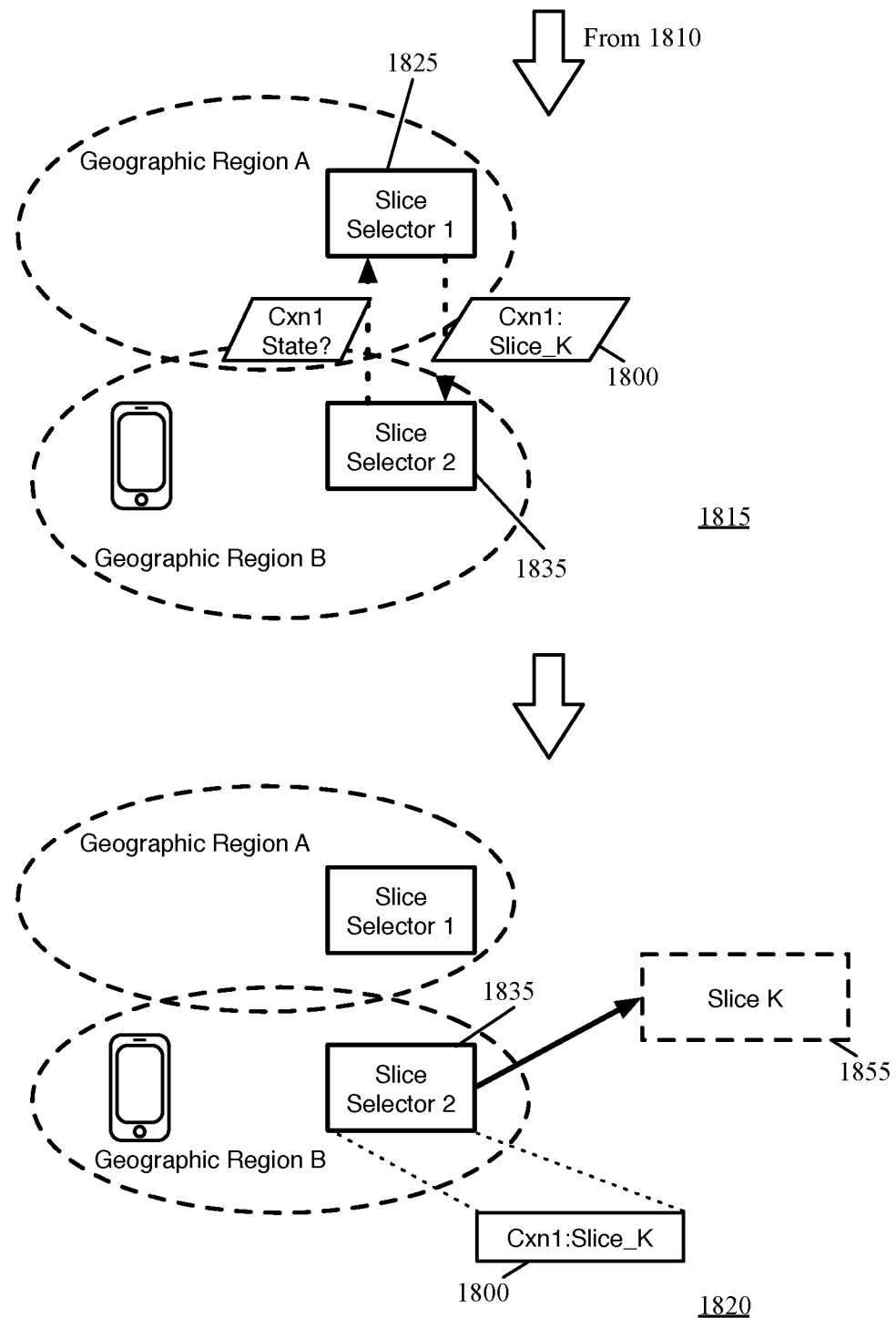

In other embodiments, the slice selector through which a connection was initiated only provides state location information to the controller, allowing other slice selectors to retrieve the state location information and use that to retrieve the slice mapping state directly from the first slice selector. FIGS. 18A-B conceptually illustrate an example of a first slice selector 1825 pushing state location information 1840 to a controller 1830 and a second slice selector 1835 retrieving the state location information 1840 and using that state location information 1840 to retrieve slice mapping state 1800 from the first slice selector 1830, over four stages 1805-1820. As shown in the first stage 1805, like in the example of FIG. 16, a mobile device 1845 initiates a connection with a public network destination while located in a first geographic region 1850 associated with the first slice selector 1825. The first slice selector 1825 assigns this connection to a network slice 1855, forwards data traffic from the mobile device 1845 belonging to this connection to the selected network slice 1855 (i.e., to the network services of this slice), and stores connection state 1800 mapping the connection to the selected network slice.

In addition, the first slice selector 1825 pushes state location information 1840 to the network controller 1830 specifying that the first slice selector is the location of the slice mapping state for this connection. This network controller, in some embodiments, is a VSN controller that provides VSN configuration data to the controllers at multiple datacenters in which the VSN is implemented. Specifically, in some embodiments, the first slice selector 1825 provides the slice mapping state location data 1840 to one of the controllers local to its datacenter (e.g., the SDN controller that configures the slice selector), which in turn passes the state location data to the VSN controller so that it can be accessed by slice selectors at other datacenters.

In the second stage 1810, the mobile device 1845 has moved to a second geographic range 1860 associated with the second slice selector 1835. Upon receiving a data message from the device 1845 for an ongoing connection that the second slice selector 1835 does not recognize, this slice selector 1835 sends a request to the controller 1830 (e.g., by making such a request to one of the controllers local to its datacenter, which in turn sends the request to the VSN controller). The controller 1830 stores this state location information 1840, and thus returns the information 1840 to the second slice selector 1835 (e.g., via the controller local to the datacenter of the second slice selector 1835).

Based on this state location information, in the third stage 1815, the second slice selector 1830 sends a request to the first slice selector 1825 for the slice mapping state for the connection. This request specifies the connection (e.g., by 5-tuple) in some embodiments, and is formatted in a specific manner recognized by the first slice selector 1825 as a request for slice mapping state. In response, the first slice selector 1825 sends the slice mapping state 1800 for the connection to the second slice selector 1835. In some embodiments, routable datacenter-to-datacenter connections exist between edge clouds, while in other embodiments the request and subsequent response is passed from one slice selector to another through core clouds or other networks.

In the fourth stage 1820, the second slice selector 1835 is able to process the data message received from the mobile device 1845 (as well as subsequent data messages for this connection) and forward this data message onto the selected network slice 1855 (i.e., the slice specified in the slice mapping state for the connection).

Figure 19:
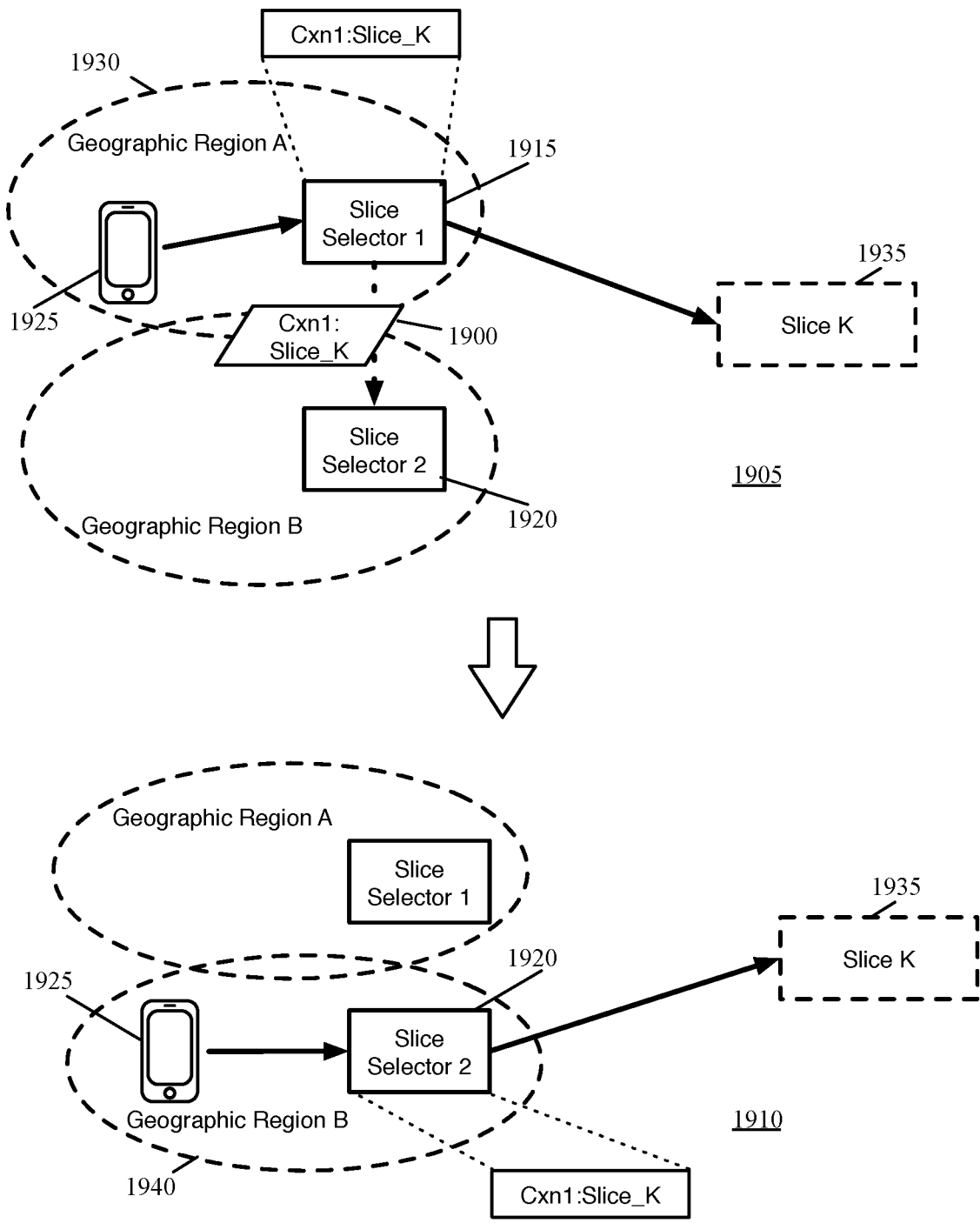
FIG. 19 conceptually illustrates an example of a first slice selector pushing slice mapping state to a second slice selector.

In still other embodiments, the slice selector through which a connection was initiated pushes slice mapping state to other slice selectors (e.g., geographically neighboring slice selectors) such that those other slice selectors have the slice mapping state for the connection available if the mobile device that initiated the connection moves into a new geographic region. FIG. 19 conceptually illustrates an example of a first slice selector 1915 pushing slice mapping state 1900 to a second slice selector 1920 over two stages 1905-1910. As shown in the first stage 1905, like in the example of FIG. 16, a mobile device 1925 initiates a connection with a public network destination while located in a first geographic region 1930 associated with the first slice selector 1915. The first slice selector 1915 assigns the connection to a network slice 1935, forwards data traffic from the mobile device 1925 belonging to this connection to this slice (i.e., to the network services of this slice), and stores connection state mapping the connection to the selected network slice.

In addition, the first slice selector 1915 pushes the slice mapping state 1900 for the connection to the second slice selector 1920, indicating that the connection is assigned to the network slice 1935. Different embodiments transmit the slice mapping state in different ways. In some embodiments, the state is transmitted through the data network (e.g., via a routable network between datacenters, through an edge cloud), while in other embodiments the state is pushed to a controller (i.e., as shown in FIG. 17), which in turn automatically pushes the state to the second slice selector 1920. The slice mapping state, in different embodiments, may be pushed to specific slice selectors with neighboring geographic ranges, to all slice selectors for a particular network (e.g., for a particular network service provider), or to other combinations of slice selectors.

In the second stage 1910, the mobile device 1925 has moved to a second geographic range 1940 associated with the second slice selector 1920. Upon receiving data traffic from the device 1925 for the ongoing connection, the second slice selector 1920 is able to process the data message received from the mobile device 1925 (as well as subsequent data messages for this connection) and forward this data message onto the selected network slice 1935 (i.e., the slice specified in the slice mapping state for the connection).

In a number of the above examples, the first slice selector pushes the slice mapping state (or the state location information) to the second controller. In some embodiments, the first slice selector pushes all of its slice mapping state (or the state location information for those connections) to slice selectors for neighboring geographical regions, in case mobile devices that initiate connections within the geographical region of the first slice selector move to any of the neighboring geographical regions. In other such embodiments, the first slice selector uses location data of the mobile device (if that data is available) to push the state information to slice selectors for neighboring geographical regions to which the device is likely to move.

Figure 20:
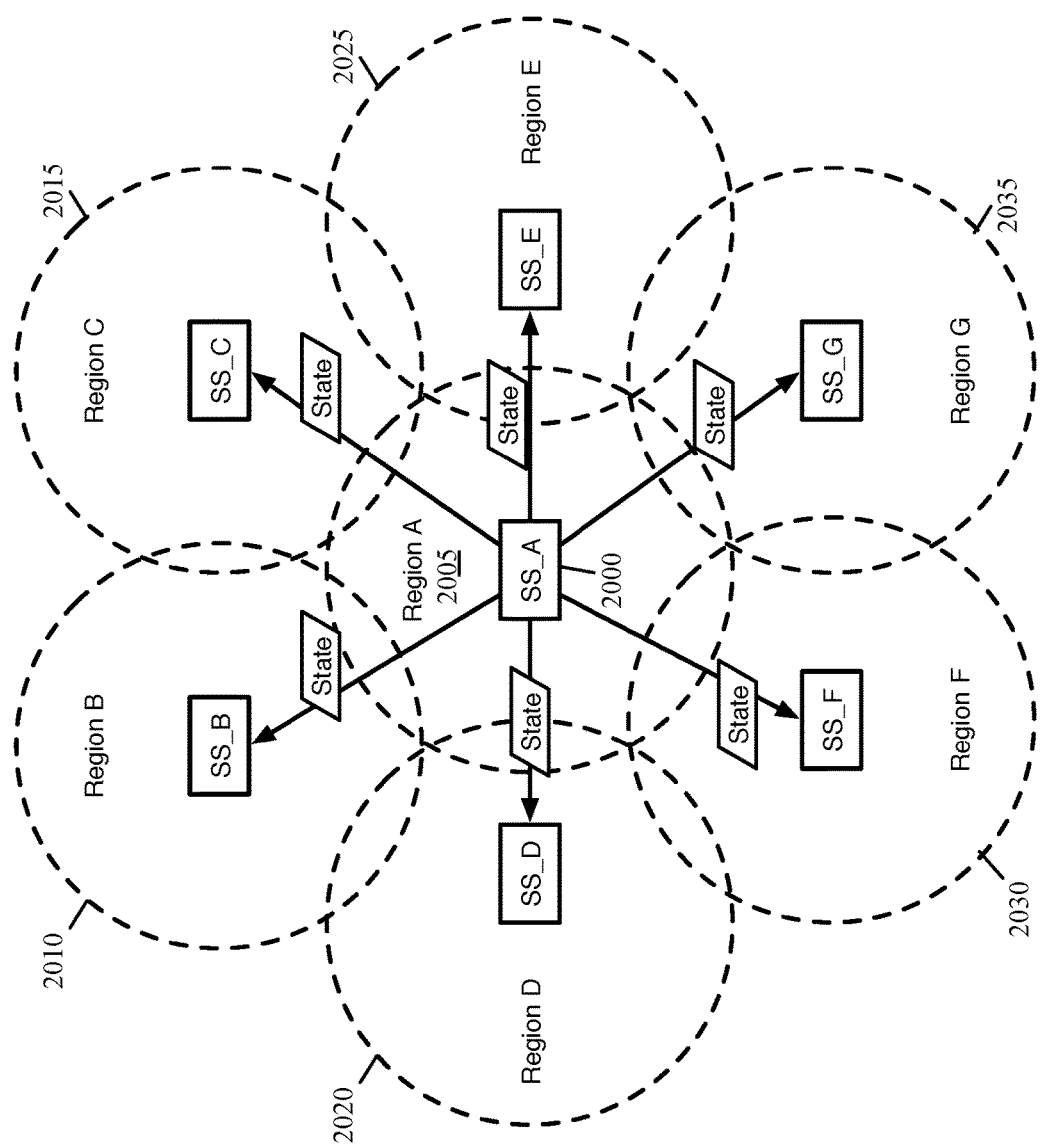
FIG. 20 conceptually illustrates a first slice selector associated with a first geographical region pushing slice mapping state to all of its neighboring geographical regions according to some embodiments.

FIG. 20 conceptually illustrates a first slice selector 2000 associated with a first geographical region 2005 pushing slice mapping state to all of its neighboring geographical regions according to some embodiments. In this example, the first geographical region 2005 has six neighboring geographical regions 2010-2035. These geographical regions 2005-2035 are all circular and equally-sized in this example, but it should be understood that the actual geographic regions may vary in size and shape for various reasons (e.g., different slice selectors being associated with different numbers of base stations, different base stations having different associated geographic regions). When a connection is initiated by a mobile device located in the first geographic region 2005, the slice selector 2000 associated with this region pushes the slice mapping state to all of the slice selectors associated with the neighboring geographic regions 2010-2035.

Some embodiments only push the slice mapping state (or state location information) to directly neighboring regions (i.e., regions that partially overlap or abut the region in which a connection is initiated), while other embodiments push the state to additional regions (e.g., all regions, regions that neighbor all of the neighboring regions of the region in which a connection is initiated). In some embodiments, the slice selector is configured with a list of all of the regions to which it pushes slice mapping state (or state location information), and pushes this state directly to the slice selectors for those other regions (e.g., by transmitting the information through a connection between datacenters). Once a mobile device moves to a different region and the slice selector for that region processes the data traffic for a connection from the mobile device using the slice mapping state, in some embodiments the slice selector for the new region also pushes the state to the slice selectors for its neighboring regions, in case the mobile device continues to move.

The slice selectors of other embodiments push the state to a central controller (e.g., the VSN controller) that automatically distributes the state to the slice selectors for neighboring regions, in which case the slice selector does not need to be configured with a list of slice selectors to which to push its state, as this is handled at the controller.

Figure 21:
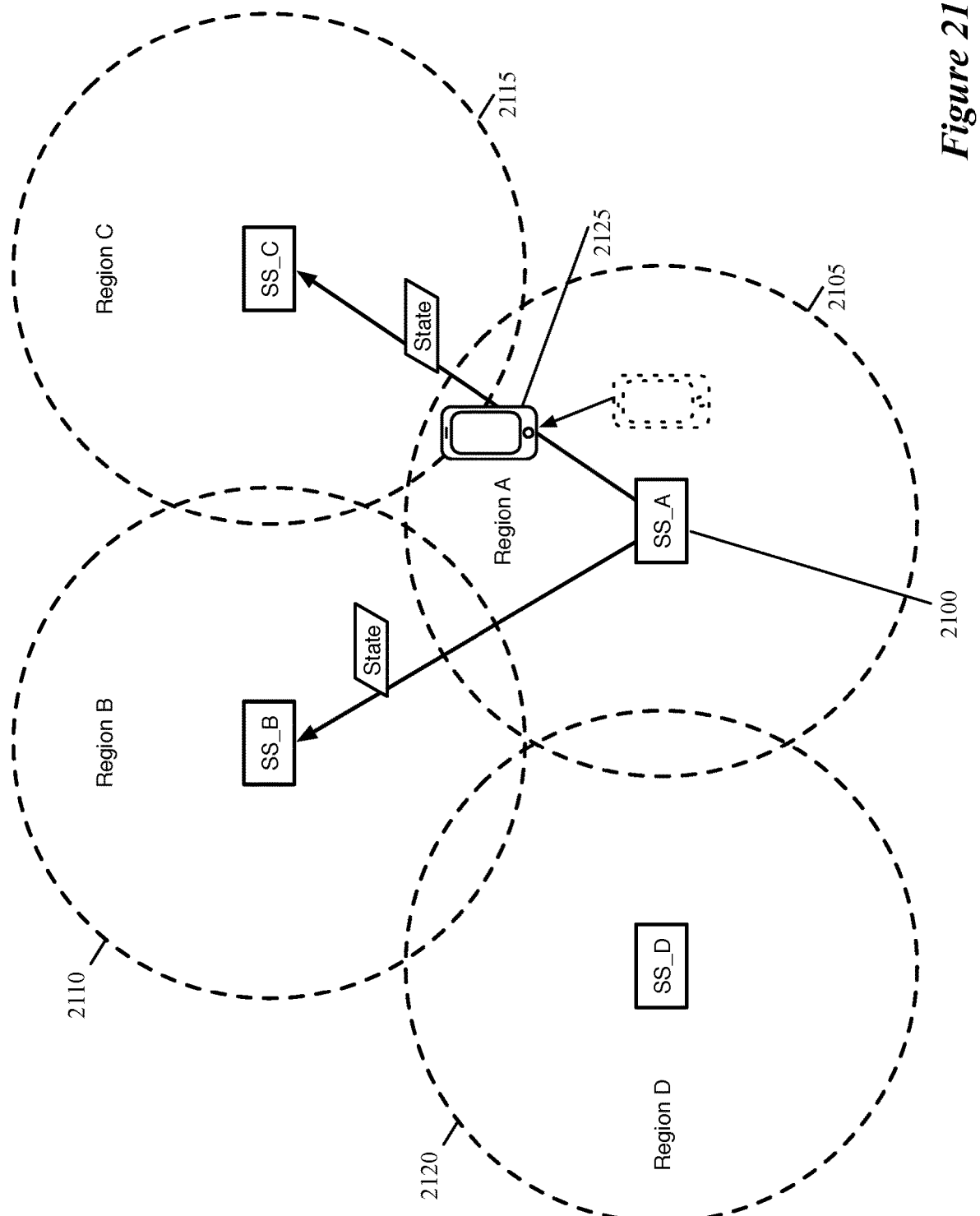
FIG. 21 conceptually illustrates a mobile device moving within a first geographic region and the slice selector for that region pushing slice mapping state for a connection initiated by the mobile device to only the neighboring regions towards which the device is moving.

As mentioned, some embodiments use more precise location data for a mobile device to intelligently push slice mapping state (or state location information) to specific neighboring regions. FIG. 21 conceptually illustrates a mobile device 2125 moving within a first geographic region 2105 and the slice selector 2100 for that region pushing slice mapping state for a connection initiated by the mobile device to only the neighboring regions towards which the device 2125 is moving. As shown in the figure, the mobile device 2125 has moved from closer to the center of the region 2105 to a position in which it is near the overlap of region 2105 and its neighboring region 2115. In addition, the vector of movement for the mobile device indicates that the device may move into region 2110 soon. As such, based on this location information, the first slice selector 2100 pushes the slice mapping state for any connections initiated by the mobile device 2125 to the slice selectors for regions 2110 and 2115 (but not the slice selector for its other illustrated neighboring region 2120). Different embodiments may use different heuristics as to when to push the slice mapping state (or state location information) to a particular neighboring region (e.g., using absolute location within a threshold distance of the neighboring region, using a direction vector indicating movement towards the neighboring region, or other heuristics).

All of the above examples illustrate a single virtual service network implemented over a physical infrastructure (e.g., a telecommunications service provider access network). In some embodiments, however, a virtual service network is sliced hierarchically. That is, slices of a virtual service network are themselves virtual service networks with a slice selector and multiple network slices.

Figure 22:
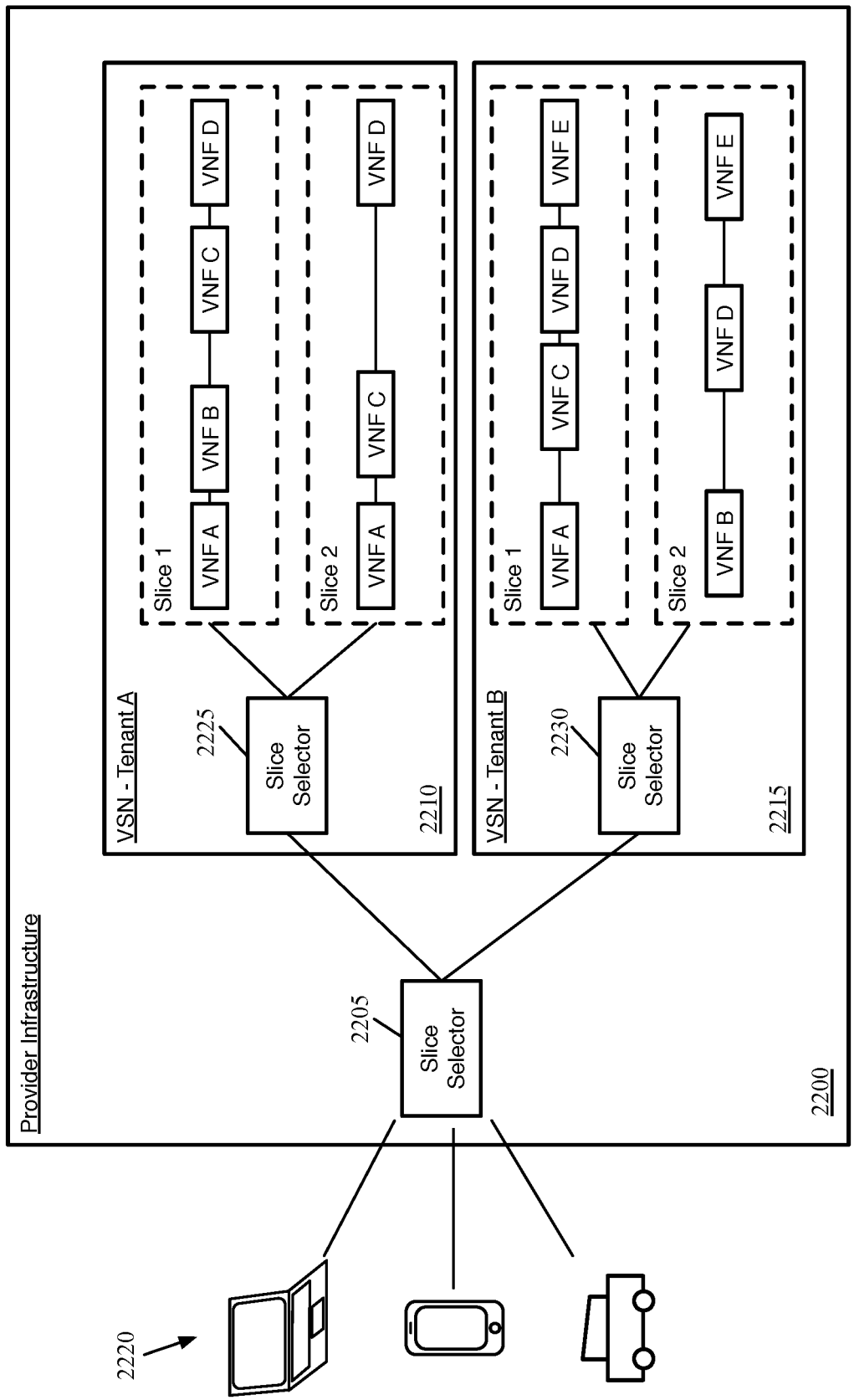
FIG. 22 conceptually illustrates an example of hierarchical VSNs.

FIG. 22 conceptually illustrates an example of such hierarchical virtual service networks. Specifically, this figure illustrates a provider infrastructure 2200 with a slice selector 2205 that selects between two separate virtual service networks 2210 and 2215, each of which has multiple slices. The provider infrastructure 2200 is its own top-level virtual service network with a slice selector 2205 that receives data traffic from various devices 2220 (e.g., computers, smart phones, tablets, self-driving automobiles, IoT devices) and assigns this data traffic to one of two different lower-level virtual service networks 2210 and 2215.

For example, in a telecommunications service provider network of some embodiments, a mobile network operator (MNO) owns the physical infrastructure 2200 of the access and core networks (i.e., the RAN and EPC infrastructure), and configures the slice selector 2205 to process traffic from devices that subscribe to the MNO. In addition, the MNO may lease the physical infrastructure to one or more mobile virtual network operators (MVNOs) that also have subscriber devices using the same infrastructure. Those MVNOs, in some cases, also lease their virtual infrastructure to additional MVNOs or other entities. In the example of FIG. 22, the MNO might configure the slice selector 2205 to select between the VSN 2210 of tenant A (for its own subscriber devices) and the VSN 2215 of tenant B (for subscriber devices of an MVNO).

For example, the slice selector 2205 configured by the MNO assigns data messages to either VSN 2210 or VSN 2215 based on the source device (e.g., by source network address). Thus, data messages from source devices associated with the MNO are sent to the VSN 2210 while data messages from source devices associated with the MVNO is sent to the VSN 2215, which is configured by the MVNO.

If additional MVNOs lease the infrastructure as well, then the slice selector 2205 would have additional VSNs from which to select (with each MVNO able to configure the slice selector and sets of network services for the slices of its own VSN).

Each of the VSNs 2210 and 2215 has its own respective slice selector 2225 and 2230 as well. In the example, each of these slice selectors 2225 and 2230 chooses between two possible network slices, but it should be understood that just as the provider infrastructure may have numerous VSNs from which the top-level slice selector 2205 chooses, each of the VSNs will often include numerous slices. In some embodiments, these slice selectors 2210 and 2215 for the tenant VSNs perform additional slice selection based on various aspects of the data message headers. For example, while the top-level slice selector 2205 selects VSNs based on the source device network address in some embodiments, the lower-level slice selectors 2210 and 2215 might assign data messages to slices in the stateful manner described above (e.g., using deep packet inspection to assign connections to slices in an application-aware manner).

Figure 23:
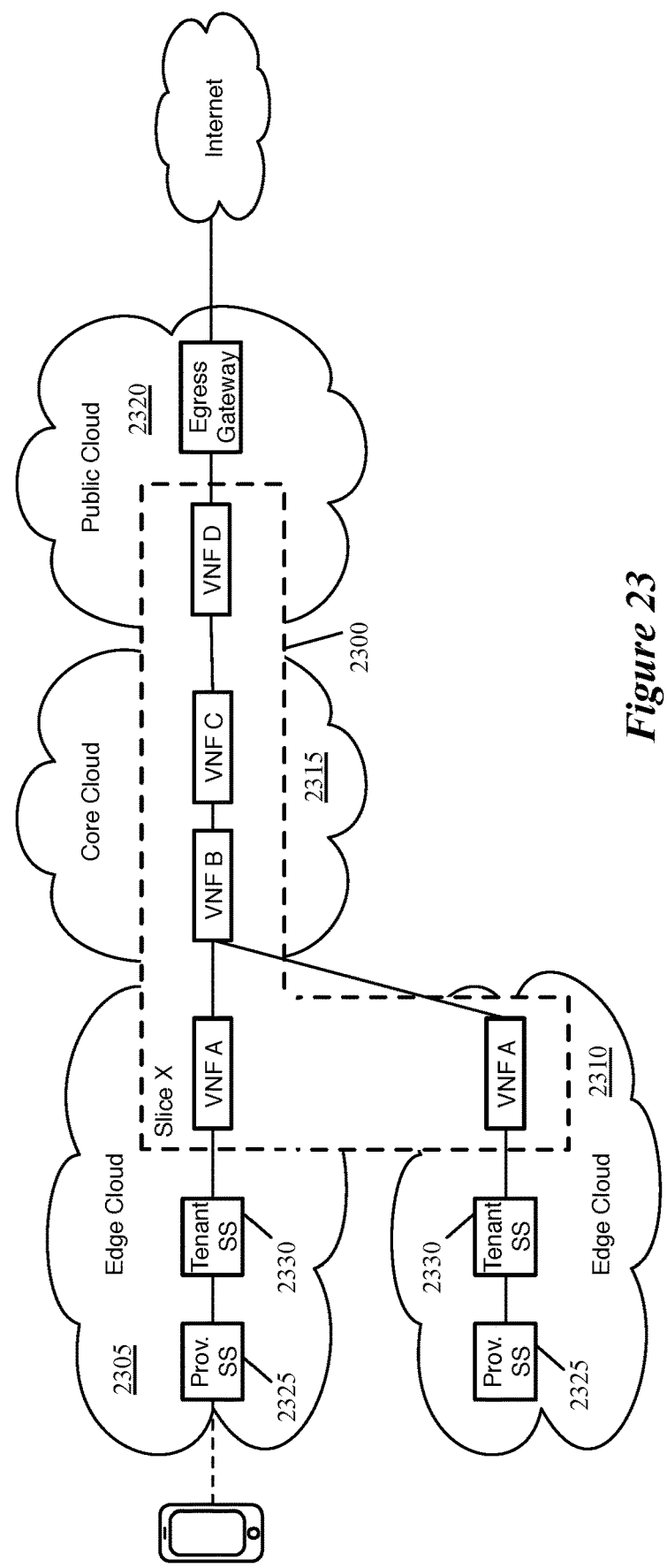
FIG. 23 conceptually illustrates the distribution of provider and tenant slice selectors (as well as the network services of a network slice) over multiple datacenters.

FIG. 23 conceptually illustrates the distribution of provider and tenant slice selectors (as well as the network services of a network slice) over multiple datacenters 2305-2320. As shown, in this example, both the provider slice selectors 2325 and the tenant slice selectors 2330 are implemented in each of the edge clouds 2305 and 2310. In addition, though not shown, each other tenant slice selector would also be implemented in each of the edge clouds (unless other tenant slice selectors were implemented in the core clouds, which some embodiments allow if none of the network services for any of the slices of those tenant VSNs were instantiated in the edge clouds). In addition, as in FIG. 2, the network services (VNF A-D) of the illustrated network slice 2300 are distributed between the edge clouds 2305 and 2310, the core cloud 2315, and the public cloud 2320.

Just as a single level of slice selector may be implemented in different ways (e.g., as a flow-based forwarding element operating within a VM or virtualization software, as a programmable physical forwarding element, as a separate set of modules executing between a VM and a port of a software forwarding element), different embodiments implement the multiple levels of slice selectors 2325 and 2330 in different ways. When the form factor for the slice selector is a VM or a forwarding element executing within a VM, some embodiments use separate VMs for each instance of the provider slice selector 2325 and each instance of the tenant slice selector 2330 (and any other tenant slice selectors). This allows, e.g., the provider admin to configure the VM and forwarding elements for the provider slice selector 2325 separately from the VMs and forwarding elements for each of the tenant slice selectors.

In this case, when the access network receives a data message, the message (after any preliminary processing, e.g., through the RAN) is first sent to the provider slice selector 2325. After the provider slice selector forwarding element selects one of the tenant VSNs (or the provider's own VSN, which is effectively another tenant VSN), the provider slice selector 2325 sends the data message to the slice selector 2330 for the selected tenant VSN in the same edge cloud (i.e., in this example, the edge cloud 2305). In some embodiments, the provider slice selector 2325 uses service chaining techniques to send the data message to the tenant slice selector 2330, while in other embodiments the provider slice selector 2325 is finished processing the data message at this point, and is simply configured to send the data message to the appropriate tenant slice selector (e.g., slice selector 2330).

This tenant slice selector 2330 receives the data message, performs slice selection and service chaining for its selected slice (i.e., in the same manner shown in FIG. 3), and then sends the data message through the egress gateway. If the network is distributed across multiple datacenters (i.e., as shown in this example), then the tenant VSN implementation includes service chaining modules in each of the datacenters in some embodiments. In some such embodiments, the provider slice selector 2325 does not perform service chaining (i.e., the tenant slice selector 2330 and/or service chaining module does not return data traffic to the provider slice selector after completion of the tenant network slice, and therefore provider service chaining modules are not required in the other datacenters.

In the example of FIG. 23, the mapping of provider slice selectors to tenant slice selectors is 1:1. However, in other embodiments, the top-level (provider) slice selector might be more distributed than the lower-level (tenant) slice selector. For example, in a 5G access network, a provider slice selector in some embodiments may be implemented at each DU, with the slice selectors for the various tenants implemented at each CU. In some such embodiments, the tenant slice selector uses MAC learning to determine to which provider slice selector return traffic should be sent. In many cases, only the tenant slice selector uses stateful connection to slice mappings, so only movement between regions associated with different tenant slice selectors causes the application of the state sharing or state location sharing techniques described above by reference to FIGS. 13-19 (i.e., if the provider slice selector assigns data messages to network slices based on source network address or another value based on the source device, then stateful mappings are not required). In this situation, the tenant slice selector will use the learned MAC address to send return traffic to the correct provider slice selector, and the provider slice selector will be the correct provider slice selector for the current location of the device, as traffic will not need to be sent from one provider slice selector to another.

In some embodiments, rather than implementing the different levels of slice selectors separately, the lower-level (tenant) slice selectors are implemented in the same VM and/or forwarding element as the top-level (provider) slice selector. For instance, in some such embodiments, a first set of flow entries implement the provider slice selector and separate sets of flow entries implement each of the tenant slice selectors. Which of these separate sets of flow entries are evaluated (i.e., which of the tenant slice selectors evaluates a data message) depends on which of the first set of flow entries is matched by the first slice selector (i.e., to which tenant VSN the data message is assigned).

In a service insertion model for the slice selectors, in which the slice selection is performed as a service associated with a port of a software forwarding element, then some embodiments perform both top-level (provider) slice selection and lower-level (tenant) slice selection as separate services one after another. That is, a data message is intercepted initially by the provider slice selector, and then based on which tenant VSN is chosen, the data message is intercepted by one of the tenant slice selectors.

Figure 24:
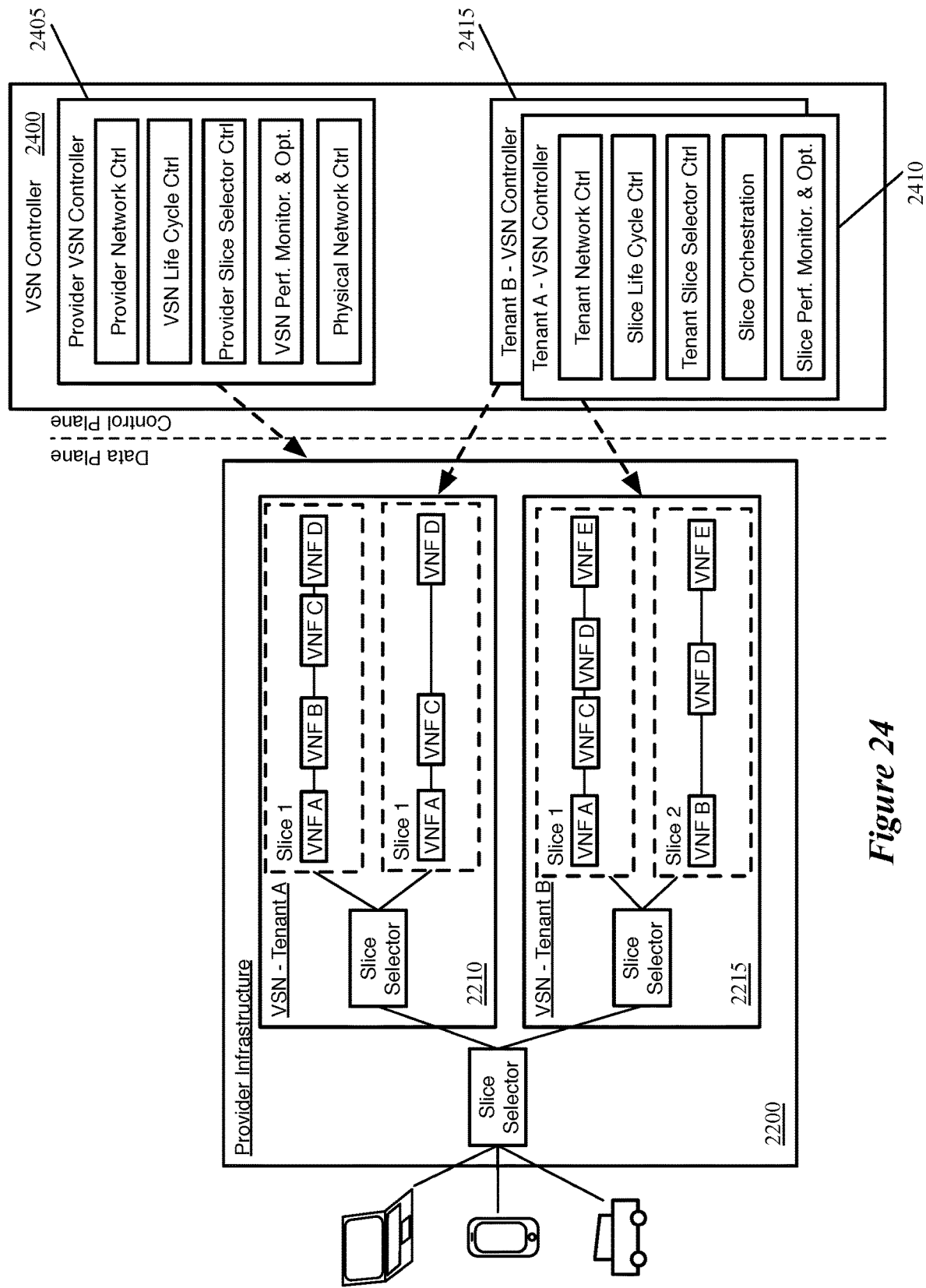
FIG. 24 conceptually illustrates bifurcated control of the provider infrastructure and the multiple tenant VSNs.

FIG. 24 conceptually illustrates bifurcated control of the provider infrastructure 2200 and the multiple tenant VSNs 2210 and 2215 according to some embodiments. As in FIG. 4, a VSN manager and controller 2400 (subsequently referred to as the VSN controller) is the centralized top layer of control for the entire network. In some embodiments, this VSN controller has separate instances of a provider VSN controller 2405 and tenant VSN controllers 2410 and 2415 corresponding to each of the tenant VSNs.

The separate controller instances 2405-2415 are accessed by logins with different administrative privileges in some embodiments (i.e., using role-based access control). That is, the VSN controller interface (CLI, GUI, APIs) of some embodiments provides different logins to a provider administrator account and separate accounts for each tenant administrator. These different accounts are able to provide different sets of configuration data to the VSN controller to configure the respective VSNs. For instance, the provider VSN controller 2405 allows the provider to configure the top-level slice selector, the chaining between any services at the top level and the selected tenant VSN, and the physical network and gateways between datacenters in some embodiments. In addition, this provider VSN controller 2405 includes functions in some embodiments to manage the life cycle of the provider VSN (e.g., instantiate the slice selector, gateways, and other components), and/or to monitor and optimize the provider VSN entities and the various tenant VSNs.

Each of the tenant VSN controllers 2410 and 2415, in some embodiments, allows the respective tenant to separately configure their respective VSNs. By using different logins for the administrators, the controller 2400 isolates a tenant administrator to only configure their own VSN, and not any of the other tenant VSNs or the provider VSN. In some embodiments, each tenant administrator is able to configure their respective slice selector, the network services of their various slices, the chaining between the slice selector and the network services, and other aspects of the tenant's configuration. In addition, the tenant VSN controllers 2410 and 2415 each include functions in some embodiments to manage the life cycle of the tenant VSN and the various network services and/or to monitor and optimize the various network services (and slices as a whole).

As described above with respect to FIG. 4, each datacenter has its own set of controllers in some embodiments. In some embodiments, these controllers do not differentiate between top-level configuration data and lower-level configuration data. Instead, the VSN controller 2400 provides configuration data (e.g., network configuration data for configuring forwarding elements to tunnel data messages between slice selectors and network services, slice selector configuration data, network service configuration data) to these controllers, which configure the various entities in the same manner for different levels. For instance, in the example of FIG. 24, the provider VSN controller 2405 provides slice selector configuration that the SDN controller uses to configure the provider slice selector, but no VNF configuration data for the compute controller to configure VNFs. Instead, this data for the compute controller is provided by the various different tenant VSN controller instances 2410 and 2415. These VSN controller instances also provide slice selector configuration data for the SDN controller to use to configure the slice selectors. In some embodiments the WAN configuration for transmitting data traffic between datacenters is only provided to the SDN controllers that manage these gateways by the provider VSN controller 2405 (i.e., because the tenants do not manage the physical infrastructure).

In the above example of FIG. 22, the lower-level slice selectors 2225 and 2230 are the first entities to process data messages within their respective VSNs 2210 and 2215. Some embodiments require a slice selector to be the first entity within a VSN to process a data message. In other embodiments, however, after the first network slice selector selects one of the VSNs, this VSN (which is a slice of the top-level VSN) may include network services applied to data messages before the lower-level slice selector performs its operations to select slices within that lower-level VSN. Similarly, in some embodiments, network services may be applied to data messages for all network slices within a virtual service network, after the different services are applied for a given slice.

Figure 25:
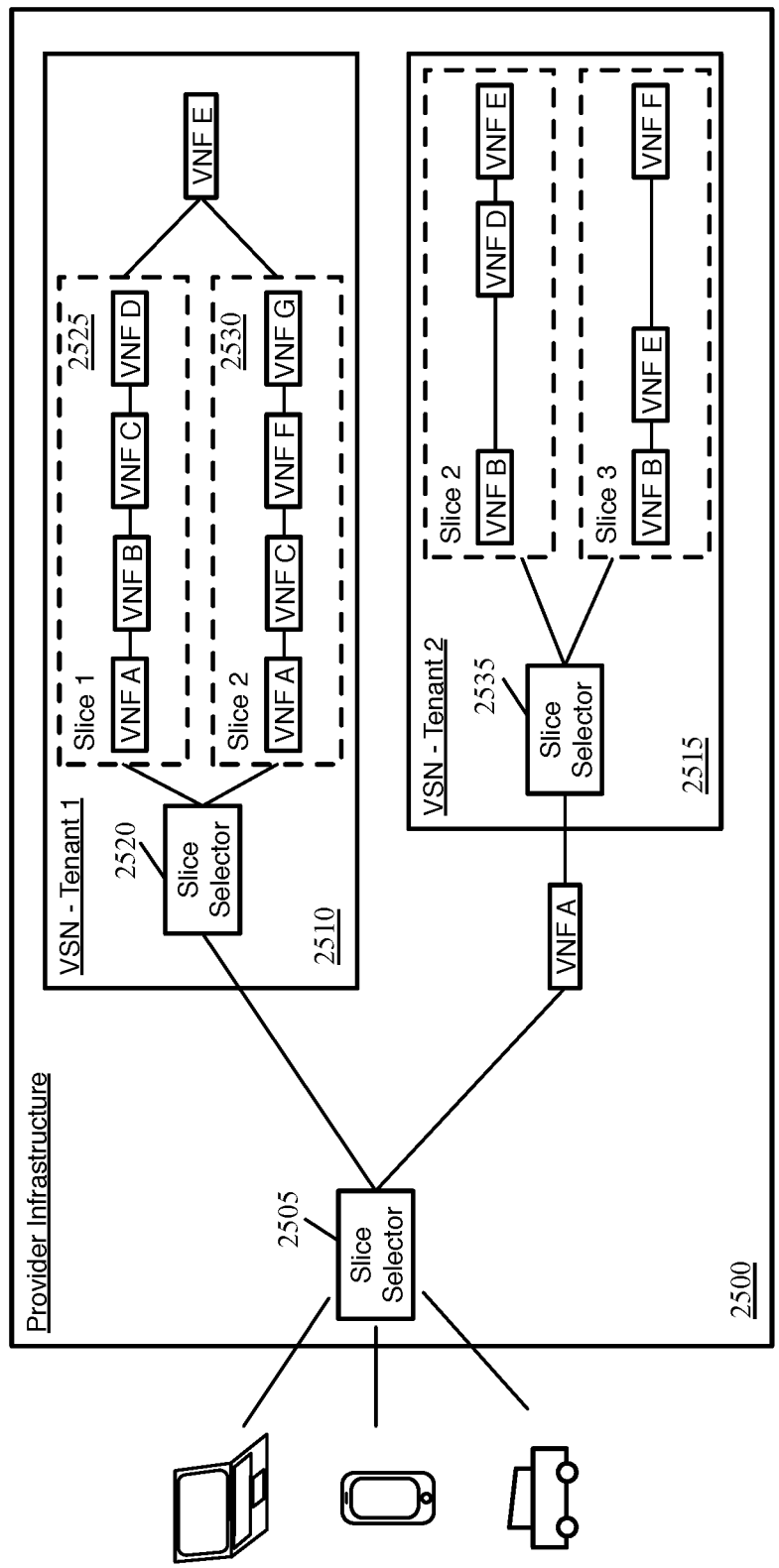
FIG. 25 conceptually illustrates examples of hierarchical VSNs with network services interposed between slice selectors and/or after the services of different slices are completed.

FIG. 25 conceptually illustrates examples of hierarchical VSNs with network services interposed between slice selectors and/or after the services of different slices are completed. This figure illustrates a provider infrastructure VSN 2500 with a slice selector 2505 that chooses between two tenant VSNs 2510 and 2515.

The first tenant VSN 2510 includes a slice selector 2520 that selects between two slices 2525 and 2530, with different sets of network services for each of these two slices. In addition, as shown, irrespective of to which slice a data message is assigned, the data message is sent to VNF E for processing after completion of either slice 2525 or slice 2530. For example, irrespective of the type of data being sent over a connection, the tenant might want a single metering service to process all of its connections for billing purposes. In this case, irrespective of to which slice a data message is assigned, the slice selector (or service chaining module in the final datacenter in which the slice is implemented) sends the data message to the VM implementing VNF E. Other embodiments, however, do not allow such network services outside of the slices, as it becomes more difficult to control QoS parameters for all of the connections if these connections are all sent to the same VNF. In this case, separate instances of VNF E would be included within each of the slices 2525 and 2530.

When the provider slice selector 2505 assigns a data message to the second tenant VSN 2515, in this example the provider slice selector first sends the data message to an instance of the network service VNF A, then to the slice selector 2535 for the second tenant VSN 2515. This allows the provider to configure network services to apply to all data traffic sent to a particular tenant VSN (e.g., for billing purposes, to provide RAN or EPC functions, or for other purposes). Other embodiments, however, require that the lower-level slice selector is the first entity to which a data message is sent after the upper-level slice selector, concentrating all of the network services into the lowest layer of network slices.

The above examples illustrate two levels of slice selection—e.g., an MNO that owns infrastructure and one or more MVNOs that lease that infrastructure from the MNO. In many cases, an MVNO will also sub-lease their virtual infrastructure to one or more additional MVNOs, and a third level of slice selection is used. In this case, the MNO slice selector might assign data messages to tenant VSNs based on source network address analysis, with the first level of MVNO slice selector then assigning its data messages to sub-tenant VSNs based on a more fine-grained network address analysis (e.g., all source devices with IP addresses in a /24 subnet are assigned to a first level of tenant VSN, which is then sub-divided between source multiple /28 subnets). The third level of slice selection may then perform stateful slice selection based on deep packet inspection, such as that described above.

Figure 26:
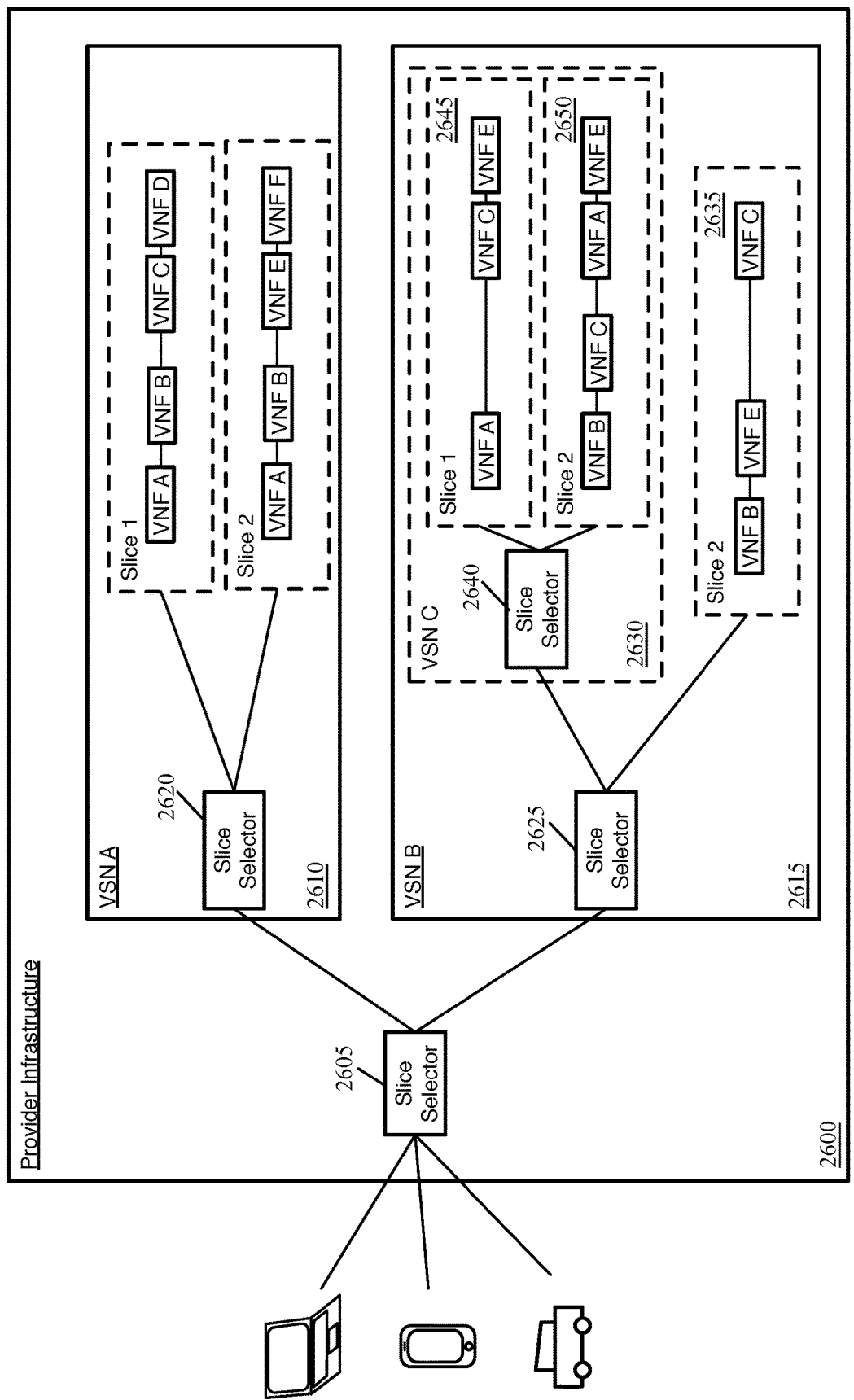
FIG. 26 conceptually illustrates an example of a hierarchical set of VSNs with three levels of slicing.

FIG. 26 conceptually illustrates an example of a hierarchical set of VSNs with three levels of slicing. As in the above examples, a provider infrastructure VSN 2600 has a slice selector 2605 that assigns data messages to two different tenant VSNs 2610 and 2615. The first tenant VSN 2610 has a slice selector 2620 that assigns data messages to two slices with different sets of network services.

The second tenant VSN 2615, on the other hand, has a slice selector 2625 that assigns data messages to either (i) a third-level VSN 2630 or (ii) a network slice 2635 with a set of VNFs that are part of the configuration for the VSN 2615. For instance, if the VSN 2615 is managed by a first MVNO, then the VSN 2630 might be managed by a second MVNO that leases a portion of the virtual infrastructure while the network slice 2635 is for data traffic to and from devices that subscribe to the first MVNO. The VSN 2630 has a third-level slice selector 2640 configured by the second MVNO that chooses between two slices 2645 and 2650 (e.g., in an application-aware manner, based on L2-L4 headers, or using other factors).

In addition, if the first MVNO was to perform application-aware slice selection, then the slice selector 2625 might choose between the VSN 2630 and multiple different network slices for the different applications. In this case, the slice selector 2625 might be configured to send data traffic that matches a particular set of source network addresses to the VSN 2630 and then slice data traffic for its other source network addresses based on the application layer data. In a flow-based forwarding element implementation of the slice selector 2625, the flow entry for the VSN 2630 (matching based on source address) would have a higher priority than the flow entries for the other network slices, so that data traffic for the second MVNO that otherwise matches the application-aware flow entries would not be sent to one of the network slices.

Other embodiments, however, do not allow a slice selector to choose between a VSN and a network slice that is not further subdivided. In this case, the slice selector 2625 would be configured to select between the VSN 2630 and another VSN, also configured by the first MVNO, with a slice selector that chooses between the slice 2635 and any other slices configured for the first MVNO.

While the above examples of VSNs that use slice selection are telecommunications provider networks (both for hierarchical slice selection as well as single-level slice selection), it should be understood that the virtual service networks can be configured for other types of networks as well. For instance, within datacenters or for networks that span across multiple datacenters, virtualization software (e.g., in the host computers that host the VMs or other endpoints of the networks) or VMs can be configured to implement slice selection for data messages sent by the network endpoints.

Figure 27:
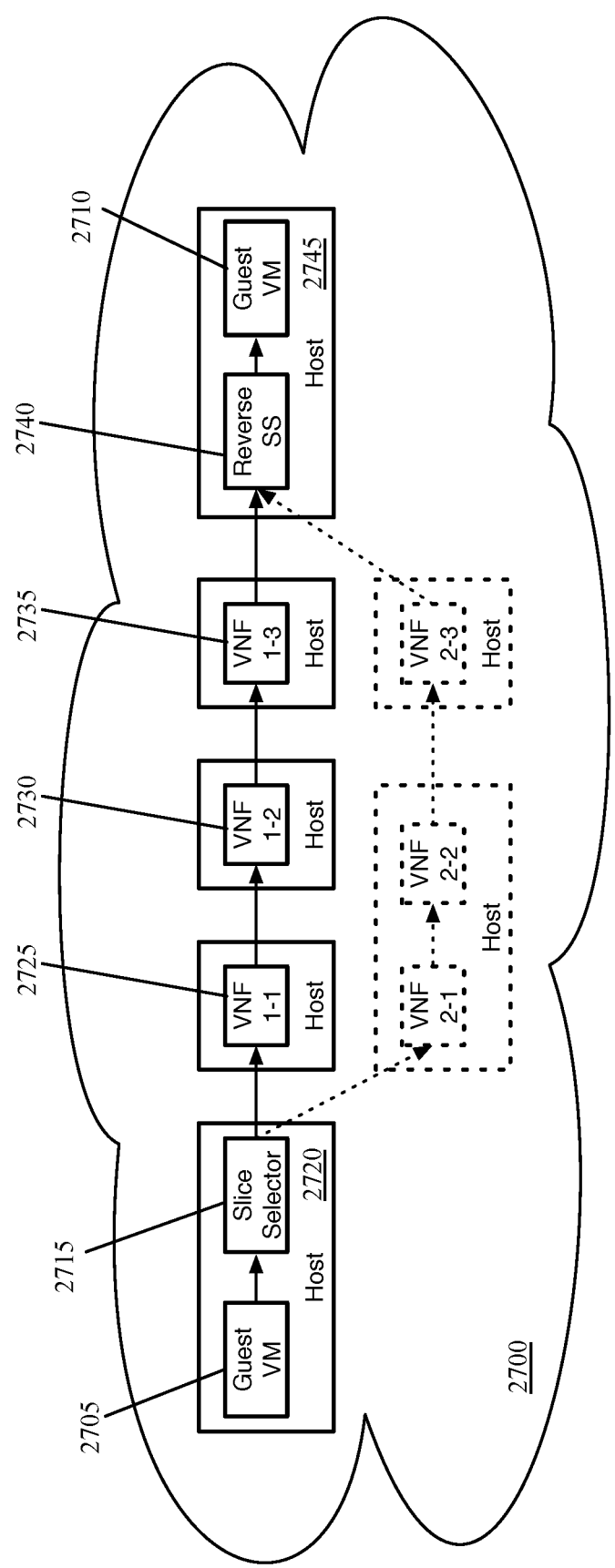
FIG. 27 conceptually illustrates the implementation of a VSN within a datacenter.

FIG. 27 conceptually illustrates the implementation of a VSN within a datacenter 2700. In different embodiments, this datacenter 2700 may be a public cloud (e.g., using slice selection within a virtual private cloud of a public datacenter) or a private datacenter (e.g., an on-premises datacenter). In the example, data traffic is sent from a first guest VM 2705 and a second guest VM 2710. In some embodiments, these two VMs 2705 and 2710 belong to the same logical network (e.g., they connect to the same logical switch, they connect to two different logical switches that are connected via one or more logical routers).

In some embodiments, the first guest VM 2705 transmits a data message that is processed by a slice selector 2715 operating in the same host computer 2720 as the guest VM 2705. This slice selector 2715 in some embodiments is implemented by a software forwarding element executing in the host computer (e.g., a software virtual switch executing in the virtualization software). In other embodiments, the slice selector is implemented as part of a service insertion layer between the guest VM 2705 and a software forwarding element (not shown). This service insertion layer, in some embodiments, uses characteristics of the data message (e.g., source and/or destination addresses, L5-L7 header information determined from deep packet inspection, or other factors) to assign the data message to a particular slice.

In the example, the data traffic is assigned to a first slice with three services implemented as VNFs 2725-2735 in three VMs on different host computers. At least one other network slice (i.e., a different ordered set of network services) is implemented separately within the datacenter (as shown by the dashed lines), such that different traffic from the first guest VM 2705 (including, in some cases, different traffic to the same second guest VM 2710) is processed by this different set of network services. In some embodiments with slice selectors and/or service chaining modules implemented on host computers with all of the guest VMs, data traffic from various different source VMs are sent along the same service path (i.e., to the same VNFs in the same order) from different origin host computers.

Some embodiments use a similar service chaining method as that described above for telecommunications service provider networks, with data messages returning to the slice selector 2715 after each service in the network slice completes its processing. In this case, the traffic does not follow a linear flow through the chain of services as shown in the figure, but rather repeatedly returns to the host computer 2720.

Other embodiments use distributed service chaining such that a forwarding element on the same host computer as the first VNF 2725 automatically forwards the data traffic to the second VNF 2730 rather than returning the data traffic to the slice selector 2715. Some such embodiments accomplish this by automatically forwarding traffic received from the interface to which one VNF connects to the next VNF in the service chain, while in other such embodiments the slice selector appends a tag or set of tags to the data messages that is used by forwarding elements along the service chain to forward the messages to the next VNF in the service chain.

When the data traffic is received at the host 2745 of the destination guest VM 2710, a reverse slice selector 2740 stores connection information for the traffic before providing the data to the guest VM 2710. The reverse slice selector 2740 is similar to the egress gateway in FIG. 2 in some embodiments, in that the reverse slice selector 2740 stores a connection to slice mapping (e.g., mapping a 5-tuple to the slice selected by the slice selector 2715). When the guest VM 2710 sends return traffic to the guest VM 2705, the reverse slice selector 2740 uses this stored slice mapping for the connection to assign that return traffic to the same slice.

In some embodiments, the slice selection and reverse slice selection functions are performed by the same component in the hosts 2720 and 2745 (e.g., a software forwarding element, the service insertion layer, or other component). The slice selector and reverse slice selector are distributed in such embodiments, with the component configured on each host computer (e.g., each host computer with a VM that attaches to the VSN) to perform both slice selection and reverse slice selection functions.

When a VM initiates a connection (i.e., acting as a client) and sends traffic for which there is no stored connection mapping, this component performs slice selection (using L2-L4 header fields, deep packet inspection, or other factors) and sends the traffic to the network services of the slice in the configured order (in this case, VNF 2725, then VNF 2730, then VNF 2735). When a host receives incoming traffic for a new connection (i.e., with the VM on that host acting as a server), the component acts as a reverse slice selector and stores the slice mapping data for the connection. When the VM returns traffic for a connection initiated elsewhere, this component acts as a reverse slice selector, using stored slice mapping data for the connection and sending the traffic to the network services of the selected slice in the reverse order (in this case, VNF 2735, then VNF 2730, then VNF 2735).

Figure 28:
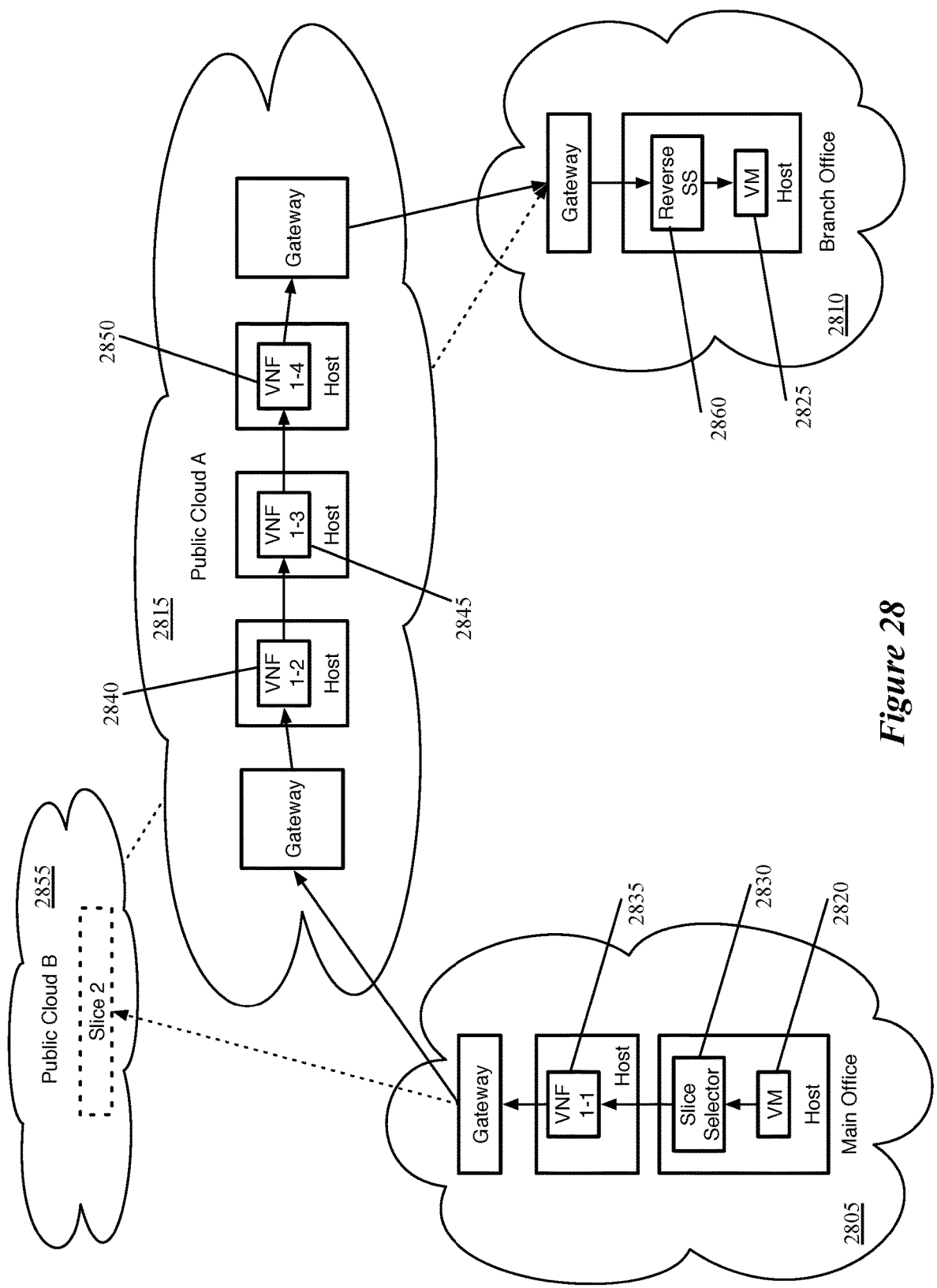
FIG. 28 conceptually illustrates the implementation of a VSN for processing WAN communications between two private enterprise datacenters through a public cloud.

FIG. 28 conceptually illustrates the implementation of a VSN for processing WAN communications between two private enterprise datacenters (i.e., a main office 2805 and a branch office 2810) through a public cloud 2815. While this example illustrates communications between a main office and a branch office, it should be understood that similar VSNs might also be configured to handle other WAN examples, such as communications between two branch offices, between a mobile user connecting to a corporate datacenter via VPN, or between any of the above endpoints and a software as a service (SaaS) provider datacenter. In addition, in some embodiments the VSNs are configured entirely within a network of private datacenters, rather than including one or more public datacenters as in this case.

In the example, data traffic is sent from a VM 2820 executing on a host computer in the main office 2805 to a VM 2825 executing on a host computer in the branch office 2810. As in the previous example of FIG. 27, a distributed slice selector 2830 is implemented on the same host computer as the source VM 2825. The distributed slice selector 2830 may be implemented by a software forwarding element executing on the host computer, by a service insertion layer between the VM and a software forwarding element, or by other components, as described above.

The data traffic from the VM 2820 is assigned to a first network slice with four network services implemented as VNFs. As shown, the first VNF 2835 is implemented in the main office datacenter 2805. For instance, some embodiments might use a firewall to filter data traffic within the initial datacenter before sending the data traffic through the WAN to other datacenters. After processing by the initial VNF 2835, the data traffic sent via WAN gateways (e.g., MPLS gateways, SD-WAN gateways) to the public cloud, where additional network services 2840-2850 for the selected network slice are implemented. After processing by the three network services 2840-2850, the data traffic is transmitted via another set of WAN gateways to the branch office, where the data is delivered to a host of the destination VM 2825. A reverse slice selector 2860 in this host (e.g., implemented by a software forwarding element, service insertion layer, or other component) stores the connection to slice mapping information for use in assigning return traffic to the same network slice.

In some embodiments, as described above, the slice selector 2830 handles service chaining (at least until the data traffic transmitted to another datacenter, at which point a service chaining module in that datacenter handles the service chaining). As such, the slice selector 2830 not only determines to which network slice a data message is assigned, but also determines the location (e.g., a VM, container, or physical device in the current datacenter, another datacenter) of the next network service in the selected network slice. For example, in the example shown in FIG. 28, the slice selector 2830 assigns the data message from the VM 2820 to the first network slice, sends the data message to the first VNF 2835, then receives the data message back after processing by the VNF. The slice selector then determines that the next network service is located in the public cloud 2815, and so transmits the data message to the WAN gateway so that the data message can be sent to the public cloud 2815. It should be noted that in the case of a distributed slice selector (e.g., with the slice selector and/or service chaining implemented in the service insertion layer, or with these functions implemented by software forwarding elements on each host), the data message is not actually returned to the slice selector on the host computer, but instead a service chaining module executing on the same host as the first VNF 2835 determines that the next service for the selected slice is located in the public cloud 2815 and send the data message to the public cloud 2815.

It should also be noted that in the example of FIG. 28, a second network slice (that is not selected for the illustrated data traffic) is at least partially implemented in a different public cloud 2855. That is, as shown by the dashed lines, if the slice selector 2830 assigns data traffic from the VM 2820 to the second network slice, then this traffic is sent via the WAN gateway to network services in the public cloud 2855 before being delivered to the branch office 2810.

Figure 29:
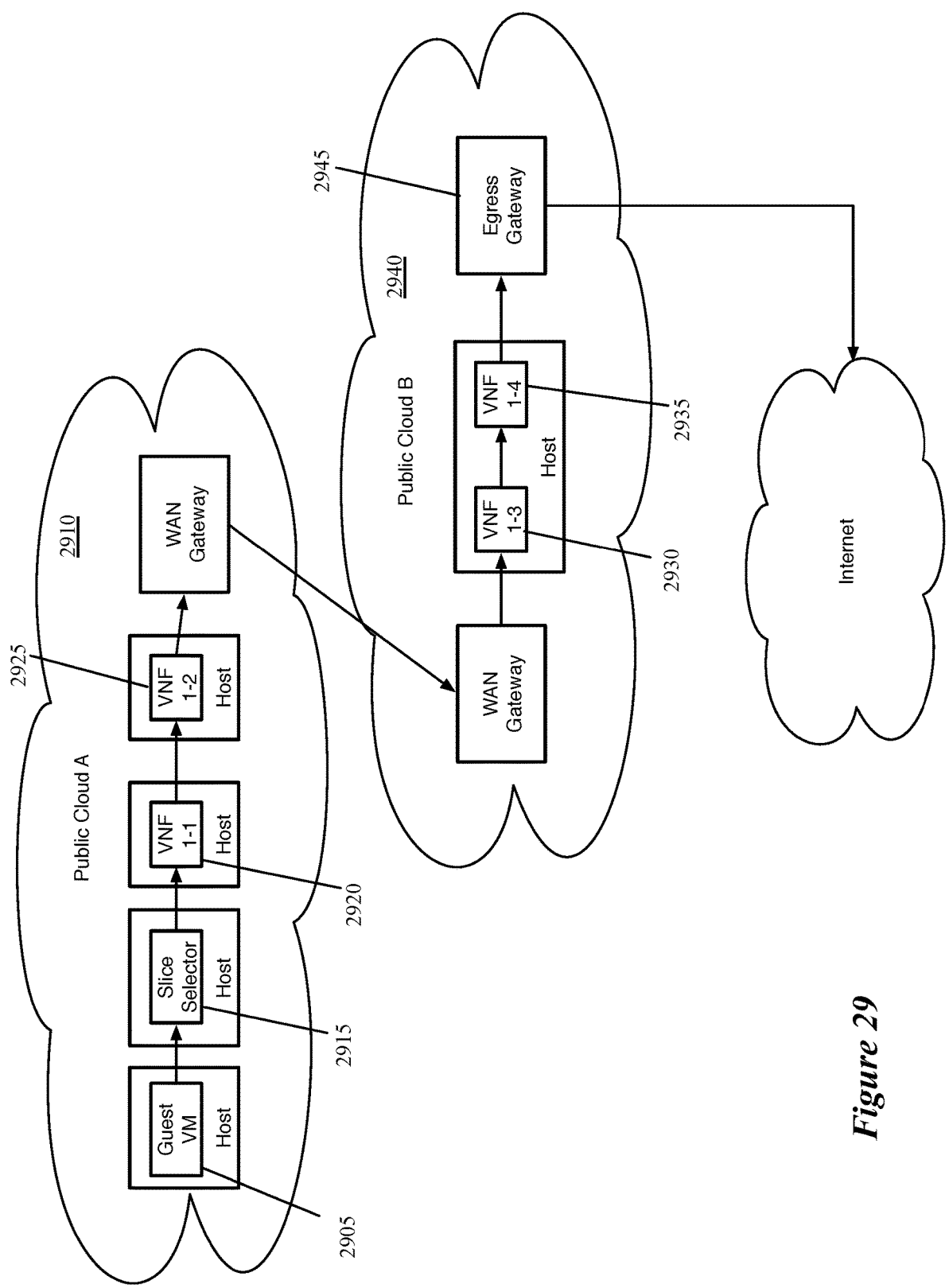
FIG. 29 conceptually illustrates that a VSN may also be implemented to handle communications within a public cloud or set of public clouds between guest VMs in the public cloud and public Internet traffic.

FIG. 29 conceptually illustrates that a VSN may also be implemented to handle communications within a public cloud or set of public clouds between guest VMs in the public cloud and public Internet traffic. In some cases, traffic between an endpoint device (e.g., a mobile device, an IoT device, a laptop or desktop computer) may be processed by a first VSN within the telecommunications service provider access network (as shown in the various figures above), pass through the Internet to a public cloud in which a destination web server is located, and be processed by a second VSN within the public cloud before reaching the web server. Similarly, return traffic would be processed by the second VSN (in the manner illustrated in FIG. 29), be routed through the Internet, and then be processed by the first VSN before delivery to the endpoint device.

As shown in the figure, a guest VM 2905 in a host computer in a first public cloud 2910 transmits a data message to a public Internet destination. This destination might be, e.g., a user endpoint device (e.g., with the VM 2905 acting as a server in response to a data request from the client device) or another destination in a public or private cloud. In this case, the data message is sent to a slice selector 2915 implemented on a different host computer from the VM 2905, which assigns the data message to a first network slice and transmits the data message to the first two network services 2920 and 2925 within the first datacenter. The slice selector 2915, in this example, is centralized (within the datacenter 2910) rather than distributed on all of the host computers that host guest VMs attached to the VSN. In some embodiments, the guest VM 2905 is configured to use the slice selector 2915 as its IP gateway, so that all traffic is initially sent to the slice selector 2915 for processing. Different embodiments may use a single slice selector for a datacenter (e.g., as a VM or a forwarding element executing in a VM) as shown in this figure, or a distributed slice selector as shown in FIGS. 27 and 28.

As described above, in different embodiments, the data message is either returned to the slice selector 2915 or distributed service chaining is used and the data message is passed directly from the VNF 2920 to the VNF 2925 (i.e., through forwarding elements on these host computers, but without returning to the host on which the slice selector 2915 is implemented).

Next, because the third and fourth network services 2930 and 2935 for the selected network slice are implemented on a host computer in a second public cloud 2940, the data message is transmitted through WAN gateways to this datacenter 2940. There, a service chaining module (or distributed service chaining layer) sends the data message to the network services 2930 and 2935, which are implemented on the same host computer in this case. Finally, after the network slice is completed, the data message is sent to the public Internet via an egress gateway 2945. This egress gateway operates similarly to the egress gateway 230 in some embodiments, storing connection to slice mapping state for use in assigning reverse direction traffic received from the Internet.

In some embodiments, the VSN is configured in one or more datacenters (e.g., as shown in FIGS. 27-29) in the same manner as shown above for the telecommunications service provider networks in FIG. 4. That is, an administrator accesses a top-level VSN manager/controller to provide a configuration for the slice selector, the various network slices and the implementation of their respective services, in which datacenter each network service should be implemented, how to connect the different datacenters, and other aspects of the configuration. The VSN controller uses multiple controllers in each of the datacenters to configure the VNFs (or other form factors for network services, if used), the slice selectors and/or service chaining modules (if needed), the forwarding elements that tunnel traffic within the datacenter, the WAN gateways for sending traffic between datacenters, and any other components.

Figure 30:
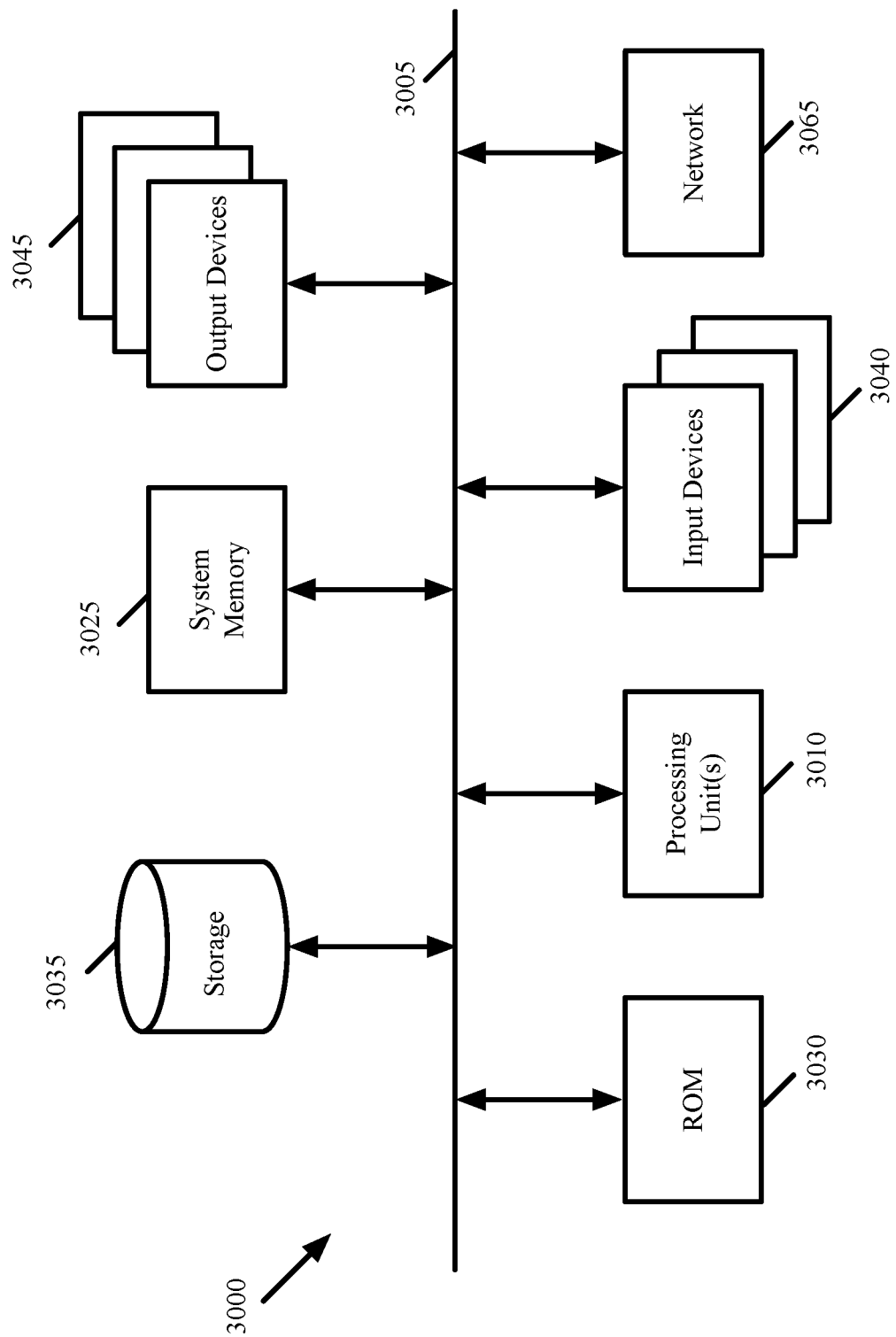
FIG. 30 conceptually illustrates an electronic system with which some embodiments of the invention are implemented.

FIG. 30 conceptually illustrates an electronic system 3000 with which some embodiments of the invention are implemented. The electronic system 3000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3000 includes a bus 3005, processing unit(s) 3010, a system memory 3025, a read-only memory 3030, a permanent storage device 3035, input devices 3040, and output devices 3045.

The bus 3005 collectively represents all system, peripheral, and chipset buses that communicatively connect the numerous internal devices of the electronic system 3000. For instance, the bus 3005 communicatively connects the processing unit(s) 3010 with the read-only memory 3030, the system memory 3025, and the permanent storage device 3035.

From these various memory units, the processing unit(s) 3010 retrieve instructions to execute and data to process in order to execute the processes of the invention. The processing unit(s) may be a single processor or a multi-core processor in different embodiments.

The read-only-memory (ROM) 3030 stores static data and instructions that are needed by the processing unit(s) 3010 and other modules of the electronic system. The permanent storage device 3035, on the other hand, is a read-and-write memory device. This device is a non-volatile memory unit that stores instructions and data even when the electronic system 3000 is off. Some embodiments of the invention use a mass-storage device (such as a magnetic or optical disk and its corresponding disk drive) as the permanent storage device 3035.

Other embodiments use a removable storage device (such as a floppy disk, flash drive, etc.) as the permanent storage device. Like the permanent storage device 3035, the system memory 3025 is a read-and-write memory device. However, unlike storage device 3035, the system memory is a volatile read-and-write memory, such a random-access memory. The system memory stores some of the instructions and data that the processor needs at runtime. In some embodiments, the invention's processes are stored in the system memory 3025, the permanent storage device 3035, and/or the read-only memory 3030. From these various memory units, the processing unit(s) 3010 retrieve instructions to execute and data to process in order to execute the processes of some embodiments.

The bus 3005 also connects to the input and output devices 3040 and 3045. The input devices enable the user to communicate information and select commands to the electronic system. The input devices 3040 include alphanumeric keyboards and pointing devices (also called "cursor control devices"). The output devices 3045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 30, bus 3005 also couples electronic system 3000 to a network 3065 through a network adapter (not shown). In this manner, the computer can be a part of a network of computers (such as a local area network ("LAN"), a wide area network ("WAN"), or an Intranet, or a network of networks, such as the Internet. Any or all components of electronic system 3000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given may be any type of DCNs, including physical hosts, VMs, non-VM containers, and hypervisor kernel network interface modules. In fact, the example networks might include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 11, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for establishing a plurality of virtual service networks over a plurality of datacenters, the method comprising:

configuring, for each virtual service network of the plurality of virtual service networks, a set of machines distributed across the plurality of datacenters to implement an ordered set of network services for the virtual service network; and configuring a first service network selector executing within the plurality of datacenters to receive a data message, select one of the plurality of virtual service networks for the data message based on analysis of information in layer 5-layer 7 (L5-L7) headers of the data message, determine a location within the plurality of datacenters for a first machine implementing a first network service of the ordered set of network services for the selected virtual service network, and transmit the data message to the first machine implementing the first network service; and configuring a second service network selector executing within the plurality of datacenters to receive the data message from the first machine implementing the first network service, determine the virtual service network selected by the first service network selector for the data message, determine a location within the plurality of datacenters for a second machine implementing a second network service of the ordered set of network services for the selected virtual service network, and transmit the data message to the second machine implementing the second network service.

2. The method of claim 1, wherein the plurality of datacenters comprises a plurality of public cloud datacenters.

3. The method of claim 1, wherein the plurality of datacenters comprises at least one public cloud datacenter and at least one private datacenter.

4. The method of claim 1, wherein the plurality of virtual service networks comprises at least (i) a first virtual service network comprising a first ordered set of network services implemented by a first set of machines operating in the plurality of datacenters and (ii) a second virtual service network comprising a second ordered set of network services implemented by a second set of machines operating in the plurality of datacenters.

5. The method of claim 1, wherein the method is executed by a virtual service network controller, wherein:
configuring a particular set of machines to implement the ordered set of network services for a particular virtual service network comprises providing configuration data for the particular set of machines to a first controller for instantiating at least one of virtual machines and containers on host computers in at least one of the datacenters; and
configuring the first and second service network selectors comprises providing configuration data for service network selection operations to a second controller for configuring service network selectors in at least one of the datacenters.

6. The method of claim 5, wherein providing the configuration data for (i) the set of machines to the first controller and (ii) the service network selection operations to the second controller comprises providing virtual service network policies to an agent that executes in a particular datacenter, wherein the agent translates the virtual service network policies into (i) data for the first controller to instantiate and configure the set of machines and (ii) data for the second controller to configure the service network selectors to perform the service network selection operations.

7. The method of claim 1, wherein (i) the data message is received at the first service network selector from an external endpoint device and (ii) after processing by the ordered set of network services for the selected virtual service network, the data message is transmitted from the datacenters to a public network.

8. The method of claim 7, wherein the first service network selector executes in a first datacenter and receives data messages from external endpoint devices located within a first geographic range, wherein additional service network selectors execute in other datacenters and receive data messages from external endpoint devices located within a second geographic range.

9. The method of claim 1, wherein the first service network selector executes on a particular host computer in a particular datacenter of the plurality of datacenters.

10. The method of claim 9, wherein the data message is received by the first service network selector from a data compute node that also executes on the particular host computer, wherein a set of additional service network selectors including the second service network selector execute on additional host computers in the particular datacenter.

11. The method of claim 10, wherein the first machine executing the first network service executes on an additional host computer in the particular datacenter, wherein the second service network selector executes on the additional host computer to determine the location within the plurality of datacenters for the second machine implementing the second network service of the ordered set of network services for the selected virtual service network and transmit the data message to the second machine implementing the second network service.

12. The method of claim 10, wherein the data compute node is a first data compute node that executes on a first host computer, wherein after processing by the ordered set of network services for the virtual service networks, the data message is transmitted to a second data compute node that executes on a second host computer in one of the datacenters.

13. The method of claim 12, wherein the first and second data compute nodes execute on host computers in two different private datacenters, wherein at least a subset of the network services execute on host computers in at least one public datacenter.

14. The method of claim 12, wherein:
a third service network selector executes on the second host computer; and
the third service network selector stores data regarding the data message to use in selecting the same virtual service network for a return data message from the second data compute node.

15. A non-transitory machine readable medium storing a program which when executed by at least one processing unit establishes a plurality of virtual service networks over a plurality of datacenters, the program comprising sets of instructions for:
configuring, for each virtual service network of the plurality of virtual service networks, a set of machines distributed across the plurality of datacenters to implement an ordered set of network services for the virtual service network; and
configuring a first service network selector executing within the plurality of datacenters to receive a data message, select one of the plurality of virtual service networks for the data message based on analysis of information in layer 5-layer 7 (L5-L7) headers of the data message, determine a location within the plurality of datacenters for a first machine implementing a first network service of the ordered set of network services for the selected virtual service network, and transmit the data message to the first machine implementing the first network service; and configuring a second service network selector executing within the plurality of datacenters to receive the data message from the first machine implementing the first network service, determine the virtual service network selected by the first service network selector for the data message, determine a location within the plurality of datacenters for a second machine implementing a second network service of the ordered set of network services for the selected virtual service network, and transmit the data message to the second machine implementing the second network service.

16. The non-transitory machine readable medium of claim 15, wherein the plurality of virtual service networks comprises at least (i) a first virtual service network comprising a first ordered set of network services implemented by a first set of machines operating in the plurality of datacenters and (ii) a second virtual service network comprising a second ordered set of network services implemented by a second set of machines operating in the plurality of datacenters.

17. The non-transitory machine readable medium of claim 15, wherein the program is a virtual service network controller, wherein:
  the set of instructions for configuring a particular set of machines to implement the ordered set of network services for a particular virtual service network comprises a set of instructions for providing configuration data for the particular set of machines to a first controller for instantiating virtual machines on host computers in at least one of the datacenters; and
  the set of instructions for configuring the first and second service network selectors comprises a set of instructions for providing configuration data for service network selection operations to a second controller for configuring service network selectors in at least one of the datacenters.

18. The non-transitory machine readable medium of claim 17, wherein the sets of instructions for providing the configuration data for (i) the set of machines to the first controller and (ii) the service network selection operations to the second controller comprises a set of instructions for providing virtual service network policies to an agent that executes in a particular datacenter, wherein the agent translates the virtual service network policies into (i) data for the first controller to instantiate and configure the set of machines and (ii) data for the second controller to configure the service network selectors to perform the service network selection operations.

19. The non-transitory machine readable medium of claim 15, wherein:
  the data message is received at the first service network selector from an external endpoint device;
  after processing by the ordered set of network services for the selected virtual service network, the data message is transmitted from the datacenters to a public network;
  the first service network selector executes in a first datacenter and receives data messages from external endpoint devices located within a first geographic range; and
  additional service network selectors execute in other datacenters and receive data messages from external endpoint devices located within a second geographic range.

20. The non-transitory machine readable medium of claim 15, wherein:
  the first service network selector executes on a particular host computer in a particular datacenter of the plurality of datacenters;
  the data message is received by the first service network selector from a data compute node that also executes on the particular host computer;
  a set of additional service network selectors including the second service network selector execute on additional host computers in the particular datacenter;
  the first machine executing the first network service executes on an additional host computer in the particular datacenter; and
  the second service network selector executes on the additional host computer to determine the location within the plurality of datacenters for the second machine implementing the second network service of the ordered set of network services for the selected virtual service network and transmit the data message to the second machine implementing the second network service.

21. A system comprising:
  a set of host computers operating in a plurality of datacenters; and
  a computing device executing a virtual service network controller to establish a plurality of virtual service networks over the plurality of datacenters, the virtual service network controller for:
    configuring, for each virtual service network of the plurality of virtual service networks, a set of machines executing on the host computers in the plurality of datacenters to implement an ordered set of network services for the virtual service network; and
    configuring a first service network selector executing on the host computers in the plurality of datacenters to receive a data message, select one of the plurality of virtual service networks for the data message based on analysis of information in layer 5-layer 7 (L5-L7) headers of the data message, determine a location within the plurality of datacenters for a first machine implementing a first network service of the ordered set of network services for the selected virtual service network, and transmit the data message to the first machine implementing the first network service; and
    configuring a second service network selector executing on the host computers in the plurality of datacenters to receive the data message from the first machine implementing the first network service, determine the virtual service network selected by the first service network selector for the data message, determine a location within the plurality of datacenters for a second machine implementing a second network service of the ordered set of network services for the selected virtual service network, and transmit the data message to the second machine implementing the second network service.

22. The system of claim 21, wherein the plurality of virtual service networks comprises at least (i) a first virtual service network comprising a first ordered set of network services implemented by a first set of machines executing on a first subset of the host computers in the plurality of datacenters and (ii) a second virtual service network comprising a second ordered set of network services implemented by a second set of machines executing on a second subset of the host computers in the plurality of datacenters.

23. The system of claim 21, wherein (i) the data message is received at the first service network selector from an external endpoint device and (ii) after processing by the ordered set of network services for the selected virtual service network, the data message is transmitted from the datacenters to a public network.

24. The method of claim 1, wherein the first service network selector and second service network selector are a same service network selector, wherein the first service network selector and first machine execute in a same datacenter.

25. The method of claim 1, wherein the first service network selector executes in a first datacenter of the plurality of datacenters, the first machine executes in a second datacenter of the plurality of datacenters, and the second service network selector executes in the second datacenter.

26. The method of claim 1 further comprising configuring a plurality of service network selectors, including the first and second service network selectors, to:
- receive a first set of data messages from source endpoints of the data messages and select virtual service networks from the plurality of virtual service networks for the data messages of the first set of data messages based on analysis of contents of the data messages of the first set of data messages; and
- receive a second set of data messages from machines implementing network services in the ordered sets of network services for virtual service networks and determine virtual service networks previously selected by the plurality of service network selectors for the data messages of the second set of data messages.

* * * * *